United States Patent [19]
Eto et al.

[11] Patent Number: 5,481,375
[45] Date of Patent: Jan. 2, 1996

[54] JOINT-PORTION PROCESSING DEVICE FOR IMAGE DATA IN AN IMAGE-FORMING APPARATUS

[75] Inventors: Koichi Eto, Yamatokoriyama; Masao Miyaza, Osaka; Kazuyuki Ohnishi, Yamatokoriyama; Akira Tamagaki, Kyoto, all of Japan

[73] Assignee: Sharp Kabushiki Kaisha, Osaka, Japan

[21] Appl. No.: 132,274

[22] Filed: Oct. 6, 1993

[30] Foreign Application Priority Data

| Oct. 8, 1992 | [JP] | Japan | 4-270269 |
| Oct. 12, 1992 | [JP] | Japan | 4-273039 |
| Oct. 12, 1992 | [JP] | Japan | 4-273050 |
| Nov. 27, 1992 | [JP] | Japan | 4-318975 |
| Jan. 26, 1993 | [JP] | Japan | 5-010807 |
| Mar. 25, 1993 | [JP] | Japan | 5-066889 |
| Apr. 19, 1993 | [JP] | Japan | 5-091562 |
| Jun. 16, 1993 | [JP] | Japan | 5-145240 |

[51] Int. Cl.$^6$ ............................................ H04N 1/387
[52] U.S. Cl. ................................. 358/450; 358/453
[58] Field of Search ............................ 358/450, 451, 358/452, 453, 443, 447, 448; 382/44, 45, 284; 395/135, 139; H04N 1/387

[56] References Cited

U.S. PATENT DOCUMENTS

| 4,272,756 | 6/1981 | Kakumoto et al. |
| 4,428,077 | 1/1984 | Shimada et al. ................... 382/44 |
| 4,819,083 | 4/1989 | Kawai et al. |
| 5,018,023 | 4/1991 | Kubota . |
| 5,018,026 | 5/1991 | Takada ............................ 358/423 |
| 5,222,158 | 6/1993 | Takasaki et al. ................. 382/44 |

FOREIGN PATENT DOCUMENTS

| 0163841 | 12/1985 | European Pat. Off. . |
| 0267456 | 5/1988 | European Pat. Off. . |
| 0451579 | 10/1991 | European Pat. Off. . |
| 0489173A | 6/1992 | European Pat. Off. . |
| 0508121 | 10/1992 | European Pat. Off. . |
| 56-33752 | 8/1981 | Japan . |
| 2079172 | 3/1990 | Japan . |
| 4-331567 | 11/1992 | Japan . |
| 2151106 | 7/1985 | United Kingdom . |
| 2178923 | 2/1987 | United Kingdom . |
| 2206011 | 12/1988 | United Kingdom . |
| 9210904 | 6/1992 | WIPO . |
| WO9312501 | 6/1993 | WIPO . |

OTHER PUBLICATIONS

Image processing apparatus, Eto et al, 1994.

"Computing Curvilinear Structure by Token-based Grouping" by J. Dolan and E. Riseman; Department of Computer Science, University of Mass., Amherst, Mass. 01003; pp. 264–270; Jun. 15, 1992.

"Line Connectivity Algorithms for an Asynchronous Pyramid Computer" by S. Edelman; Dept. of Applied Mathematics, The Weizmann Institute of Science, Rehovot 76100, Israel; Computer Vision, Graphics, and Image Processing 40 (1987) Nov., No. 2, Duluth, Minn.; pp. 169–187.

Primary Examiner—Scott A. Rogers
Assistant Examiner—Kim Yen Vu

[57] ABSTRACT

An image processing apparatus including a scanner unit for reading an image of an original document, a memory which, if the image is read by the scanner unit in a divided manner as a plurality of partial images, stores the read partial images as respective partial document data, and a joint-portion processing section for recognizing joints of the partial document data stored in the memory and for joining the partial document data according to the recognized joints.

10 Claims, 45 Drawing Sheets

FIG.5(a)   FIG.5(b)
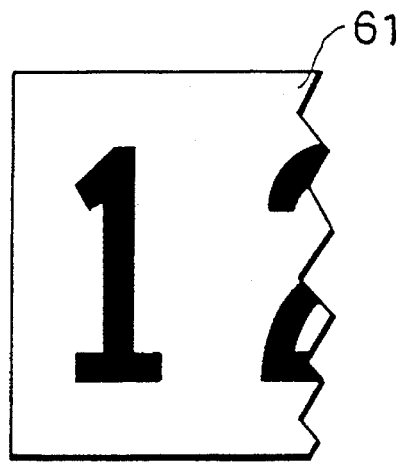
FIG.5(c)
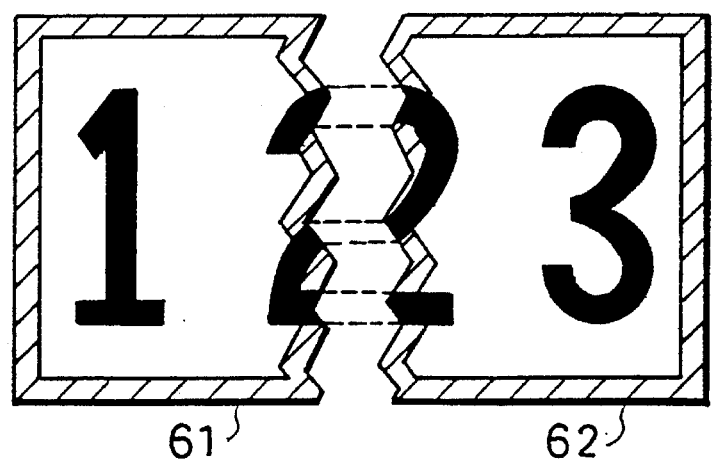
FIG.5(d)

71a    72a

77

GIVEN DATA → C M Y, min(C·M·Y)

JOINT-PORTION PROCESSING DEVICE FOR IMAGE DATA IN AN IMAGE-FORMING APPARATUS

BACKGROUND OF THE INVENTION

1. Field of the Invention

The present invention relates to image processing apparatuses, such as copying machines, scanners, facsimiles, and printers, which are capable of enlarging a read image and outputting the image onto a plurality of sheets of paper in a divided manner. It further relates to image processing apparatuses and which are also capable of automatically joining divided images together and forming a combined image on one sheet of paper or other materials.

2. Description of the Prior Art

In order to combine a plurality of images together and to record the combined image on one sheet of paper, an information recording apparatus, such as that disclosed in Japanese Examined Patent Publication No. 33752/1981 (Tokukoushou 56-33752), is employed. In this apparatus, image data for each page is stored as each independent data: for example, image data of 4 pages of A-4 size are combined together, and the reduced image can be copied on one sheet of paper of A-4 size.

However, in the above-mentioned apparatus, since the image data is stored as individual data for each page, and since there is no correlation between those individual data, positioning of images is not operable between pages.

Therefore, in the case of originals, such as a map, that can not be read by one scanning due to its large size or other reasons, in order to confirm the connections between images carried on the respective pages, it is necessary to reduce each of originals and copy the combined image on one sheet of paper. Conventionally, in this case, reduced copies are made page by page; the original of one sheet being formed by trimming and pasting them; and the original thus formed being again copied.

However, such images copied in the divided manner as described above are quite likely to have problems, such as lines that appear on the edges, overlapped images, loss of images, etc. Therefore, trimming these images, positioning them, etc. are troublesome and time consuming tasks. Moreover, in the above method, when reduced copies are made for the respective pages, it is difficult to determine the setting of a reduction rate while taking into consideration a finished state of the copy. Further, since slight errors are inevitable in the reduction rates for the respective pages, offsets might be produced at the joints due to the trimming and pasting tasks.

Further, in the case of joining torn pieces of an original, the conventional method is that the original of one sheet is formed by pasting the torn pieces together while paying attention to the shapes of the torn pieces and the joining portions of the images, and that the original thus joined together is again copied.

However, in such a case as to form the original of one sheet by pasting the torn pieces together, the pasting process, which has to be carried out while paying attention to the shapes of the torn pieces and the joining portions of the images, is troublesome and time consuming, thereby reducing the efficiency of the work. Moreover, since offsets are quite likely to appear at the joints, an image, which is obtained by copying the original thus pasted together, tends to have shadows at portions corresponding to the joints. This greatly reduces the resolution of the image.

Furthermore, in the case of obtaining an enlarged image by enlarging a small document such as a map, etc. by the use of, for example, a copying machine as an image processing apparatus provided with an enlarging function, if the image of the document is enlarged to a size that can not be covered by maximum-sized copy sheets available in the copying machine, the conventional method is that portions of the document image are copied onto a plurality of copy sheets in a divided manner at a desired rate of magnification, and then the resulting copied sheets are pasted together.

In this method, since it is difficult to tell the copiable region when the portions of the document image are copied onto a plurality of copy sheets, it is not easy to determine how to divide the document image. Further, troublesome tasks are required in removing the excessive overlapped portions when the resulting copied images are pasted together.

In order to improve the operability of the above method, there has been proposed another apparatus wherein, in the case when a document is copied in a predetermined rate of magnification, if the resulting copied image seems to become larger than copy sheets of the specified size, the document image is automatically divided into a plurality of images, and the divided document images are copied on individual copy sheets.

However, even in the above conventional apparatus, although it eliminates the need for conducting the copying operation while taking account of the dividing method of the document image, it merely divides the document image in a predetermined manner and delivers them on individual copy sheets. Troublesome and time consuming tasks are required in removing the excessive overlapped portions when the resulting copied images are pasted together and in positioning the divided documents. Additionally, there has been proposed still another apparatus, wherein upon copying a document image, the image position in relation to copy sheets is automatically shifted to form a margin having a specified width, that is, a binding margin. However, this apparatus also fails to solve the above problems.

SUMMARY OF THE INVENTION

It is an objective of the present invention to provide an image processing apparatus which is capable of joining a plurality of documents together without causing any adverse effects on the efficiency of work as well as automatically conducting a variable magnification operation on the combined image in accordance with the size of copy sheets.

It is another objective of the present invention to provide an image processing apparatus which is capable of joining together a plurality of torn pieces of an image accurately and efficiently without causing any offsets and shadows in the image at portions corresponding to the joints.

It is still another objective of the present invention to provide an image processing apparatus which is capable of improving the efficiency of work that is required for obtaining one image by pasting together images that have been released on a plurality of copy sheets in a divided manner.

In order to achieve the above objectives, the image processing apparatus of the present invention comprises: an input means for reading an image of a document; a storage means for storing a plurality of images that have been read by the input means as partial document data; and a joint-portion processing means for recognizing joints of the partial document data that have been stored in the storage means and for joining the respective partial document data.

With the above arrangement, in the case of using a document that has to be read by the input means in a divided manner due to, for example, its large size or other reasons, and forming a reduced image of the original image on a recording medium of a desired size by reducing the image of the document, the images that have been read in the divided manner are stored in the storage means as the respective document data. The document data stored in the storage means are then respectively subjected to a joint-recognizing operation and a positioning operation in the joint-portion processing means.

Therefore, in the case of forming a reduced image by joining together images that have been read in a divided manner and conducting a variable magnification operation on the image to a desired size, the present invention eliminates troublesome and time consuming tasks such as reducing divided portions of a document respectively, and trimming and sticking together the reduced portions to form one document, as well as eliminating the necessity of time consuming calculations on reduction rate, etc. Thus, it becomes possible to improve the efficiency of work, and to prevent offsets that would occur at the joints of the combined document. This ensures high quality in the images.

Moreover, in the case where the partial documents contain a lot of overlapped portions, if the partial documents are joined together after they have been respectively reduced, the joined image is prone to have margin portions. However, by the use of the arrangement of the present invention wherein the reducing operation is performed after having combined the partial document data together, it is possible to eliminate the negative effect on picture quality.

In the above-mentioned joint-portion processing means, the following means are provided to further improve the quality in the images.

That is, the joint-portion processing means is provided with a shifting means for shifting the respective document data, in the parallel or orthogonal direction with respect to a joint so as to make the respective data consistent with each other. It is alternatively provided with a rotative movement means for rotating one of the document data centered on a predetermined position such as its corner or other points so as to make the respective data consistent with each other. Therefore, even in a case where a corner of the divided document is not read or where the document data are read in a tilted manner, it is possible to reduce offsets that would occur at the joints of the combined document data.

Moreover, the joint-portion processing means is arranged to discriminate data-loss areas of the image in accordance with the positional relationship of the document data, to create compensating data based on images located at the ends of the document data that are to be joined, and to compensate for the data-loss area. Therefore, even in the case where, upon reading an image by the use of the input means, a portion of the image is not read, compensating data are created based on images located around the data-loss area so as to compensate for the data-loss area. This makes it possible to enhance the picture quality by eliminating shrinkage of images and unnatural appearances that would occur at the joints.

Moreover, in the case where the edge of a document is read as a line, the joint-portion processing means erases the line by discriminating it from the other images of the document. Therefore, it is possible to avoid the disadvantage of having extra lines at the joints of the image, thereby eliminating unnatural appearances at the joints.

Furthermore, the joint-portion processing means recognizes that an area, from a position determined as a joint in one of the document data to an end of the other of the document data situated on the former document data, is an overlapped portion of the image, and conducts a positioning operation after erasing the overlapped portion. Therefore, even in a case where upon reading, an overlapped portion is formed due to offsets of the image, the joint-portion processing means erases the overlapped portion by discriminating it from the other images of the document, thereby eliminating unnatural appearances at the joints.

The joint-portion processing means is also provided with an adjusting means for adjusting the density data so as to minimize differences between the density data of the document data upon conducting a joining operation. Therefore, it is possible to reduce changes in density that would occur at the joints when the respective document data are joined together, thereby reducing unnatural appearances at the joints.

Moreover, in the joint-portion processing means, sides having the document data, on which a joining operation is conducted with respect to the document data, are specified by the sequence of inputting the images and an instruction for changing into a new line that is given by inserting a predetermined document to be read. These specified sides give a basis on which the data are retrieved. The joints are recognized and positioning is conducted. Therefore, it becomes possible to perform the joining operation quickly and accurately without requiring excessive time for retrieving data or other processes even if complicated images are used, or even if a number of documents are read in the joining operation.

Furthermore, in the case of using torn and separated pieces of a document, the joint-portion processing means recognizes the shapes of the torn pieces of the document from the document data stored in the storage means, positions the document data so as to allow the torn pieces to be joined together, and erases data corresponding to shadows that would appear on the joints. Therefore, this makes it possible to improve the efficiency of work in joining the torn pieces of the document together. Further, since it is possible to prevent offsets and shadows that occur at the joints, the high quality in the image can be achieved.

Moreover, when a plurality of torn pieces of a document, which are arranged in the scanning direction of the input means, are successively scanned by the input means, these images of the torn pieces of the original are stored in the storage means as document data. Then, among the document data, by comparing the document data corresponding to the rear portion of a preceding document piece read earlier by the input means with the document data corresponding to the leading portion of the succeeding document piece read in the following scanning, the joint-portion processing means recognizes the shapes of the rear portion and the leading portion of the torn document pieces. Successively, positioning is made on the document data so that the torn document pieces are joined to each other based on the shapes of the rear portion and the leading portion, and data corresponding to shadows that would appear at the joints are erased.

Therefore, by arranging the torn pieces of a document in the scanning direction of the input means so that the torn edges to be joined are aligned face to face with each other, the process for finding out the torn edges to be joined can be simplified upon conducting the positioning of the document data so as to connect the torn pieces. This makes it possible to simplify the joining operation and to shorten the time of the operation.

When a plurality of torn pieces of a document are arranged with their corresponding torn edges placed face to face in accordance with the approximate original positional relationship before it was torn, the images of these torn pieces of the document are read by the input means and stored in the storage means as a series of document data. Then, in the joint-portion processing means, data of a shadow, which are located between the document data that seem to be consistent and which appear at the joint between the torn edges, are detected, and data located at both sides of the data of the shadow are recognized as the document data of the torn edges of the torn pieces. Further, the joint-portion processing means recognizes the shapes of the torn edges from the document data of these torn edges. Successively, positioning is made on the document data so that the torn document pieces are joined to each other, and the data corresponding to shadows that would appear at the joints are erased.

Therefore, by arranging a plurality of torn pieces of a document with their corresponding torn edges placed face to face in accordance with the approximate original positional relationship before it was torn, the process for finding out the torn edges to be joined can be simplified upon conducting the positioning of the document data so as to connect the torn pieces. This makes it possible to simplify the joining operation and to shorten the time of the operation.

Moreover, for example, in the case of reading images carried on two opened pages of a book or the like having a considerable thickness by the use of the input means, any shadows that appear in the document data are erased in the joint-portion processing means. Moreover, the document data, after having been subjected to the shadow-erasing operation, are retrieved for portions having coincident image information, and subject to a positioning operation. Then, the document data are compensated for any loss of data that is caused by the shadow-erasing operation, and the document data combined by the joining operation are subject to a variable magnification operation by the variable magnification means in accordance with the size of the recording medium whereon the combined image is formed.

Therefore, even if any shadows appear in the document data stored in the storage means due to the thickness of the book, the shadow-erasing operation and the compensating operation for the loss of data are executed on the document data, and the document data are joined together accurately.

Moreover, marks are put on the document data to determine approximate positions at which the joining operation is conducted in the images of the document data stored in the storage means. The joint-portion processing then means retrieves the document data for portions having coincident image information in accordance with the marks. The marks are given in the form of, for example, a line drawn in the proximity of a border between a necessary portion and an unnecessary portion on the image. Lines and marks indicating positions of features that are located in the positions at which the joining operation is conducted, and the positioning of the document data is then conducted.

Therefore, the above arrangement makes it possible to provide high-quality images without offsets or other problems caused at the joints. Further, in the case of conducting the joining operation on documents that have, for example, a space portion around the image or the same images that are formed on the edges of the two consecutive pages in an overlapped manner, if a retrieving process is conducted from the end of the image in order to detect portions having coincident image information, the storage capacity is used in a wasteful manner, the processing time is excessively prolonged, and the possibility of errors increases. However, by conducting the retrieving operation in accordance with the above-mentioned marks, it is possible to save the storage capacity and to shorten the retrieving time, etc., thereby ensuring accurate, quick operations.

Moreover, in order to achieve the aforementioned objectives, the image processing apparatus of the present invention is provided with an input means for reading an image of a document; a storage means for storing images that have been read by the input means as document data; a division-enlargement processing means for dividing and enlarging the image data stored in the storage means such that the divided image data are respectively made into independent image data; and a margin-portion creating section for adding to the image data that have been divided by the division-enlargement processing means additional image data for creating a pasting margin along one of the joint portions between the divided image data.

With the above arrangement, the image of a document that have been read by the input means are stored in the storage means as image data. In the division-enlargement processing means, the image data are divided, and also enlarged at a predetermined rate of magnification such that the divided image data are respectively made into independent image data. Then, in the margin-portion creating section, additional image data are added to the image data that have been divided by the division-enlargement processing means additional in order to create a pasting margin along one of the joint portions between the divided image data. The additional image data form, for example, colored pasting margins when seen after printed. Therefore, on the divided images of the document that are released from the image processing apparatus of the present invention, and formed on the individual copy sheets, there are clearly formed pasting margins along the joint portions of the divided images that are to be joined. This arrangement makes it possible to improve the efficiency of work in the case of pasting the divided images together to form one complete enlarged image of the original image.

For a fuller understanding of the nature and advantages of the invention, reference should be made to the ensuing detailed description taken in conjunction with the accompanying drawings.

BRIEF DESCRIPTION OF THE DRAWINGS

FIGS. 5(a) and 5(b) respectively show plan views of torn pieces of a document.

FIG. 5(c) is an explanatory drawing that shows document data stored in an image memory.

FIG. 5(d) is an explanatory drawing that shows a resulting image after the joining operation.

FIG. 32 is an explanatory drawing that shows a state where the overlapped portion of the document data has been compensated for.

DETAILED DESCRIPTION OF THE PREFERRED EMBODIMENTS

Referring to FIGS. 1 through 5, the following description will discuss one embodiment of the present invention.

Figure 2:
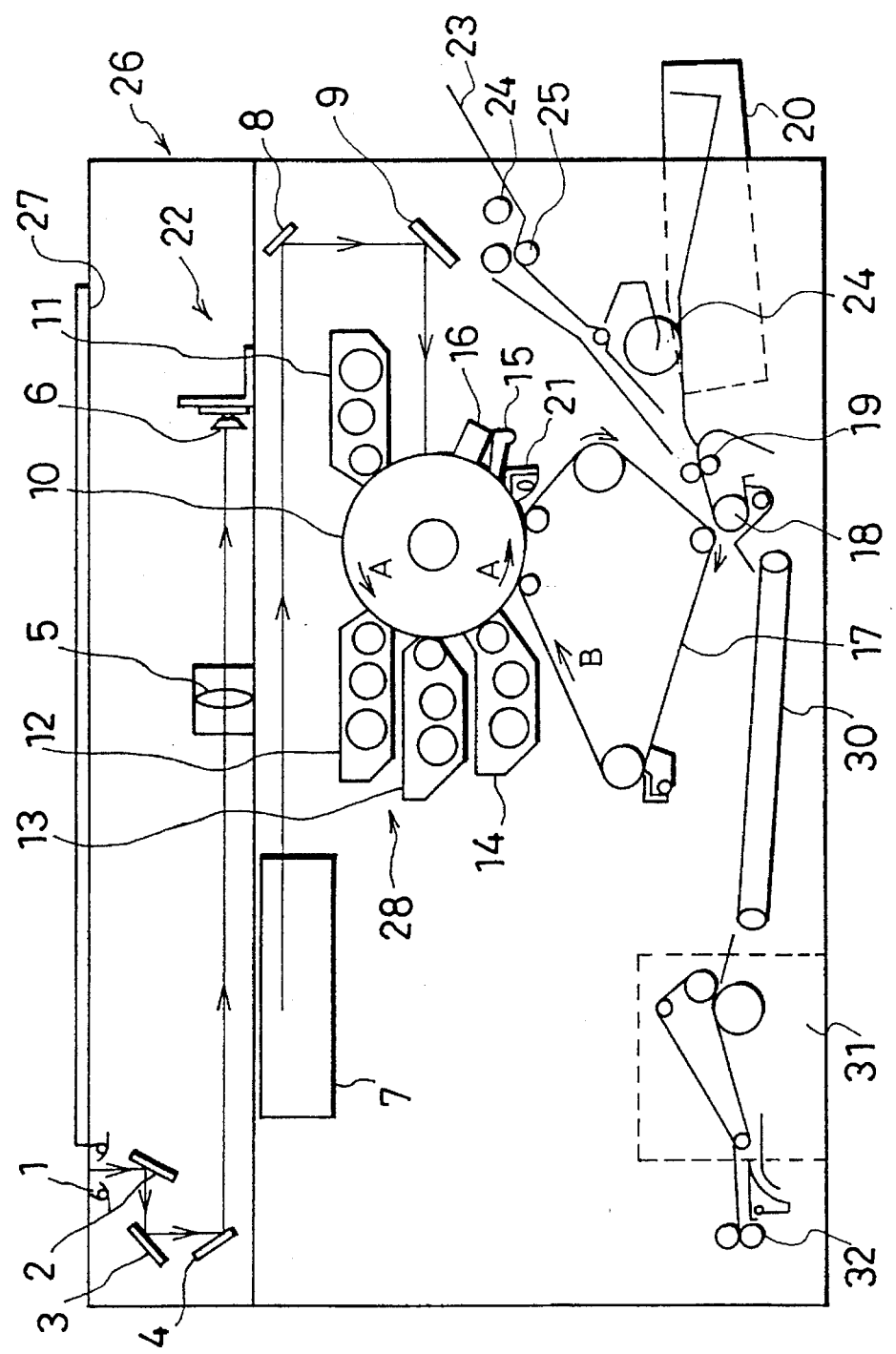
FIG. 2 is an explanatory drawing that schematically shows the construction of the digital copying machine of FIG. 1.

As illustrated in FIG. 2, a digital copying machine, which is installed in an image processing apparatus in accordance with the present embodiment, is provided with a document platen 27 made of a hard glass plate, etc. that is installed on the upper surface of a copying machine main body 26. Below the document platen 27 is disposed a scanner unit (input means) 22. The scanner unit 22 is constituted of: a lamp unit 1; mirrors 2, 3 and 4; a lens unit 5; and a CCD (Charge Coupled Device) sensor 6. A reflected light beam, which is obtained by irradiating a document (not shown) placed on the document platen 27 by the lamp unit 1, is directed to the light-receiving face of the CCD sensor 6 through the mirrors 2, 3 and 4 and the lens unit 5, and detected therein as electric signals.

A laser driver unit 7 is installed below the scanner unit 22. Image data of the document, which are detected by the CCD sensor 6 as the electric signals, are temporarily stored in an image memory (storage means) 43 installed in the image processing apparatus shown in FIG. 1, which will be described later. After having been subject to predetermined processing in the image processing apparatus, the image data are sent to the laser driver unit 7. The laser driver unit 7 has a semiconductor laser for projecting a laser beam in response to image data inputted thereto, a polygon mirror for diffracting the laser beam in a constant angular velocity, an f-θ lens for correcting the laser beam that has been diffracted in the constant angular velocity so that it is again diffracted in a constant angular velocity on a photoreceptor drum 10, and other devices.

A laser beam released from the laser driver unit 7 is reflected by the mirrors 8 and 9 that are disposed in the light path, and projected onto the photoreceptor drum 10, which is capable of rotating in the direction of arrow A as shown in FIG. 2, thereby forming an electrostatic latent image on the photoreceptor drum 10.

On the periphery of the photoreceptor drum 10, are disposed a charger 16 for charging the photoreceptor drum 10 so as to impart a predetermined voltage to its surface prior to an exposure executed by laser driver unit 7. Further, from the charger 16 along the rotation direction of the photoreceptor drum 10, are installed in the following order: a developing device 28 for forming a toner image by supplying toner to the electrostatic latent image on the photoreceptor drum 10; a transferring belt 17 whereto the toner image on the photoreceptor drum 10 is temporarily transferred; a cleaning device 21 for removing residual toner from the photoreceptor drum 10; an electrostatic eliminating lamp 15 for eliminating residual static electricity from the photoreceptor drum 10 prior to the next charging operation, etc.

The developing device 28 includes a black developer vessel 11, a yellow developer vessel 12, a magenta developer vessel 13, and cyan developer vessel 14, and those developer vessels 11 through 14 respectively house toners having corresponding colors. The transferring belt 17, which is provided in the form of an endless belt, is installed so as to move in the direction of arrow B in the drawing, and one portion of the transferring belt 17 is pressed against the photoreceptor drum 10 such that the toner image on the photoreceptor drum 10 is transferred thereonto.

On the paper-feeding side with respect to the transferring belt 17, are installed a resist roller 19 for supplying copy sheets to the transferring belt 17 at predetermined intervals, a feeding cassette 20 for housing copy sheets, and a feeding tray 23 on which copy sheets are placed. Further, a feeding roller 24 for transporting copy sheets, a transporting roller 25, etc. are installed in the proximity of the feeding cassette 20 and the feeding tray 23. Below the transferring belt 17, is installed a transferring roller 18 which presses a copy sheet sent thereto from the resist roller 19 against the transferring belt 17, and allows the toner image on the transferring belt 17 to be transferred onto the copy sheet.

On the paper-discharging side with respect to the transferring belt 17, are installed a conveyer belt 30 for conveying the copy sheet bearing the toner image, a fixing device 31 for fusing the toner image onto the copy sheet by heat, a discharge roller 32 for discharging the sheet of copy paper after the fusing operation out of the apparatus.

In the above arrangement, a color-copy (3 color copy) operation is carried out in the following sequence. First, the charger 16 uniformly charges the surface of the photoreceptor drum 10, and the scanner unit 22 executes the first scanning. The image data (R.G.B) detected by the CCD sensor 6 are processed in the image processing section, and are released from the laser driver unit 7 as a laser beam representative of yellow data. The surface of the photoreceptor drum 10 is exposed by the laser beam, and an electrostatic latent image for yellow-use is formed on the exposed portion of the photoreceptor drum 10. Then, yellow toner is supplied to the electrostatic latent image within the image region from the yellow developer vessel 12, and a yellow toner image is thus formed.

Next, the yellow toner image is transferred onto the transferring belt 17 that is pressed against the photoreceptor drum 10. At this time, although some toner that has not been consumed in the transferring process remains on the surface of the photoreceptor drum 10, the residual toner is scraped off by the cleaning device 21. Moreover, the electrostatic eliminating lamp 15 eliminates the residual charge on the surface of the photoreceptor drum 10.

After completion of the above processes, the charger 16 again charges the surface of the photoreceptor drum 10 uniformly, and the scanner unit 22 executes the second scanning. The image data are processed in the image processing section, and are released as a laser beam representative of magenta data. The surface of the photoreceptor drum 10 is exposed by the laser beam, and an electrostatic latent image for magenta-use is formed on the exposed portion of the photoreceptor drum 10. Then, magenta toner is supplied to the electrostatic latent image, and a magenta toner image is thus formed. Thereafter, this toner image is transferred onto the transferring belt 17 so as to be superimposed on the former yellow toner image. After the cleaning device 21 and the electrostatic eliminating lamp 15 have carried out the same processes as described earlier, the charger 16 again charges the surface of the photoreceptor drum 10 uniformly, and the scanner unit 22 executes the third scanning. An electrostatic latent image for cyan-use is formed by exposing the photoreceptor drum 10 with a laser beam representative of cyan data. Then, cyan toner is supplied to the electrostatic latent image from the cyan developer vessel 14, and a cyan toner image is thus formed. Thereafter, this cyan toner image is transferred onto the transferring belt 17 so as to be finally superimposed on the former toner images.

A complete toner image on the transferring belt 17, which has been formed by superimposing three toner images, is transferred onto a copy sheet, and the complete toner image is fused onto the copy sheet by heat, and then the copy sheet is discharged out of the apparatus by the discharge roller 32.

The sequence of processes described above is a sequence for carrying out a three-color copying operation. In the case of a four-color copying operation, a process using black toner in the black developer vessel 11 is added to the above-mentioned sequence. In the case of a mono-color copying operation, black toner is supplied to the electrostatic latent image from the black developer vessel 11, and the black toner image thus formed is transferred onto a copy sheet through the transferring belt 17.

Figure 1:
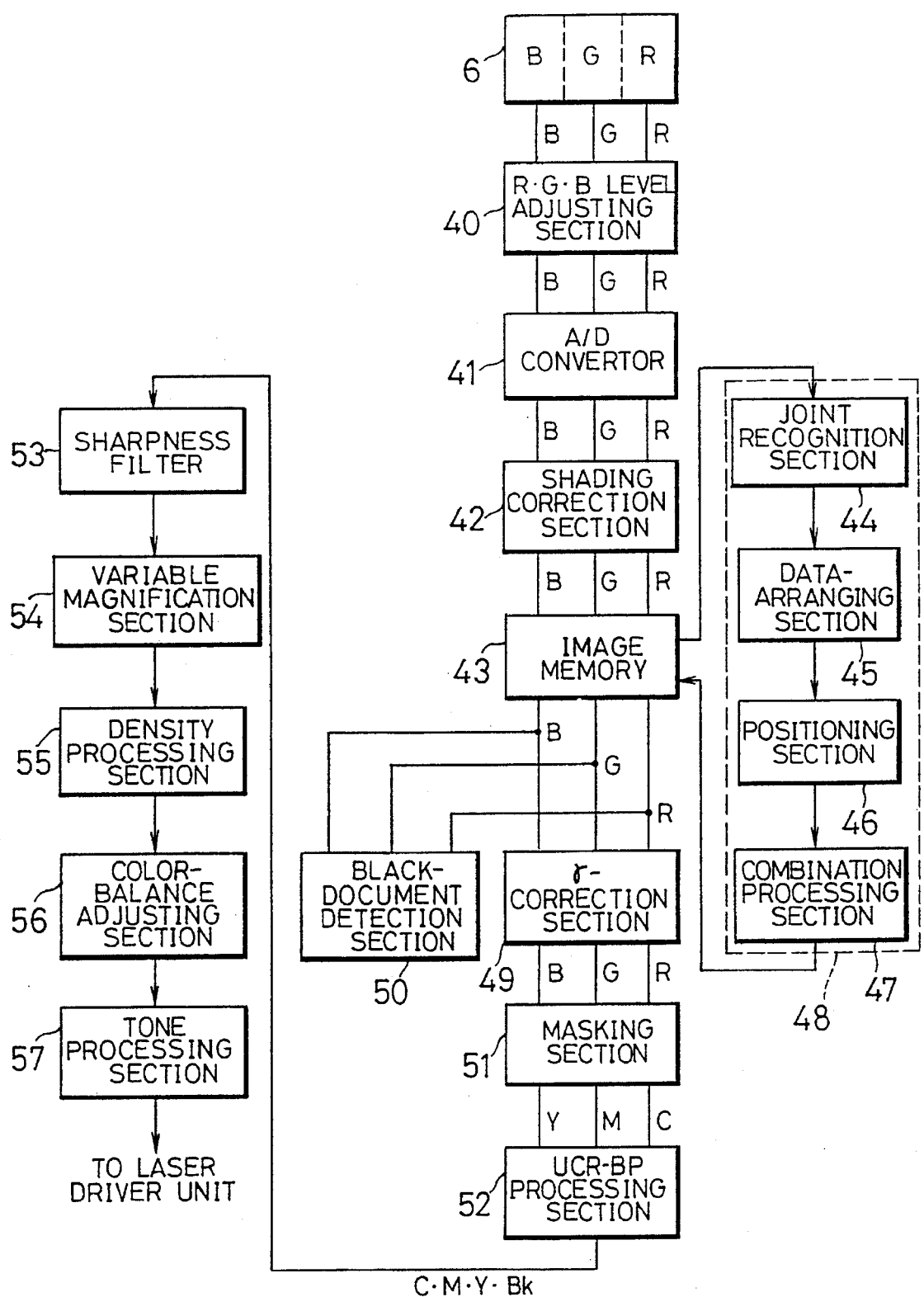
FIG. 1 is a block diagram showing a construction of an image processing system that is installed in a digital copying machine of the present invention.

Referring to FIG. 1, the following description will discuss the construction, functions, etc. of the image processing section for suitably processing the image data read by the CCD sensor 6 and for releasing the data to laser driver unit 7.

As shown in FIG. 1, the image processing section, which executes color reproduction according to documents and joint-portion processing on images read from divided or broken documents, is constituted of a RGB level-adjusting section 40, an A/D convertor 41, a shading correction section 42, an image memory 43, a joint-portion processing section (joint-portion processing means) 48, a γ correction section 49, a black-document detection section 50, a masking section 51, a UCR(Under Color Removal)-BP(Black Print) processing section 52, a sharpness filter 53, a variable magnification section (variable magnification means) 54, a density processing section 55, a color-balance adjusting section 56, tone processing section 57, etc.

In the image processing section, analog signals, that is, document data of R, G, B obtained from the CCD sensors 6, are compensated for their dispersions between R, G, B due to the respective CCD sensors, and are then converted into digital signals in the A/D convertor 41. Thereafter, the document data are subject to a shading correction for correcting variations in sensitivity of the CCD sensor for each picture element, unevenness in brightness of the lens, etc. in the shading correction section 42, and are temporarily stored in the image memory 43.

In this case, if a joining mode, which will be described later, is specified, a plurality of documents that are to be joined for their images are successively scanned, and those images are separately stored in the image memory 43 as respective document data. The document data are sent from the image memory 43 to the joint-portion processing section 48.

The joint-portion processing section 48 includes a joint recognition section 44, a data-arranging section 45, a positioning section (shifting means) 46, and a combination processing section 47. The document data inputted to the joint-portion processing section 48 are first sent to the joint recognition section 44 where the joints of the documents are recognized, and are then sent to the data-arranging section 45 where the corresponding joints are arranged face to face with each other. Successively, the subsequent data are sent to the positioning section 46 where positioning is made so that images located at joints have a consistency, and are then sent to the combination processing section 47 where they are combined together. After completion of the processing in the joint-portion processing section 48, the data of the documents are again inputted to the image memory 43. Here, as to the sequence of the operations in the above joint-portion processing, its detailed explanation will be given later.

Together with data released from the black-document detection section 50 for making a discrimination between mono-color copy and color copy, the data of the documents released from the image memory 43 are inputted to the γ-correction section 49 where a γ-correction is executed so as to adjust contrast and brightness.

The γ-correction is carried out so that the output signal from the CCD sensor and the output density of a printer or the like are corrected in tone to have a linear relationship. In other words, if the RGB data obtained from the CCD sensor are released to the printer or the like without being subject to the correction, the dark portions of the document are reproduced as by far darker portions due to the fact that the dot diameter of the printer is normally greater than that of the theoretical value. Therefore, it is necessary to make a compensation for the data so that dark portions become brighter. This correction is the γ-correction, which is also referred to as "tone correction".

In the masking section 51, the data of R, G, B, which have been subject to the γ-correction, are converted into data of C, M, Y (Cyan, Magenta, Yellow) by executing suitable calculations. In the UCR-BP processing section 52, the C, M, Y data of the document are subject to the UCR processing for removing grey components from toners of three colors, C, M, Y, and for replacing them with black toner, as well as subject to the BP processing for adding black toner to the toners of three colors. Thus, $B_K$ (black) data are added to the C, M, Y data of the document.

The UCR (Under Color Removal) is a method by which superimposed portions of C, M, Y, that is, black-colored portions, are replaced with black toner so that the toners of respective colors C, M, Y are reduced in their amounts of use. In general, the rate of replacement by black toner is 30–40 percent at present. The following advantages are obtained through the above processing: It becomes easier to adjust "Gray Balance". The reproducible range of shadow portions is expanded. Black portions are preferably reproduced. It becomes possible to reduce the total amount of toner.

The sharpness filter 53 emphasizes the sharpness of the $C \cdot M \cdot Y \cdot B_K$ data of the document. Further, the variable magnification section 54 and the density processing section 55 execute suitable processing on the subsequent data so as to impart a specified size and density to the image. The color-balance adjusting section 56 and the tone processing section 57 respectively execute the balance adjustments and tone processing on the respective colors, and the subsequent data are inputted to the laser driver unit 7. Thereafter, an electrostatic latent image is formed on the photoreceptor drum 10 by the laser beam released from the laser driver unit 7, and the aforementioned processes are successively carried out, thereby producing a copied image on a copy sheet.

Referring to the flow chart of FIG. 3, an explanation will be given of the sequence of the operations that are carried out in the joint-portion processing of the data of a plurality of documents.

Firstly, a joining mode is selected through an operation panel, not shown, (S1), and when a plurality of documents are scanned (S2), data read through the scanner unit 22 provided with the CCD sensors 6 are stored in the image memory 43 (S3).

Successively, joints in the respective images of read data of the documents are detected (S4). In other words, image information corresponding to predetermined lines of data from the surrounding edge of each document or from the end of each image is retrieved so as to recognize peculiar lines and characters, and comparison is made between respective portions of document data according to the recognized peculiar lines and characters in order to find similar portions to form a joint. Then, at S5, a judgement is made as to whether or not joints are present, thereby discriminating the presence or absence of detection of joints. If there is no detection of joints, that is, if no coincidence is found in the features and shapes in any portions between the respective document data, a warning display indicating "NO" is given to inform that no joining process is operable (S6), thereby stopping the operation.

In contrast, if there is a detection of a joint at S5, the judgement is made as "YES", and the data of documents are arranged in the data-arranging section 45 so that corresponding sides having image data to form a joint are aligned face to face with each other (S7). Next, positioning is carried out in the positioning section such that the best-suited position of the image data is found by checking the consistency of the data while shifting the data of one document in the main scanning direction or in the sub scanning direction, with the image data of the other document maintained in a fixed state (S8). Thereafter, in the combination-processing section 47, the data of the documents are combined together (S9), and subject to a shadow-erasing operation, thus forming data of one complete document. This operation is carried out in the combination-processing section.

Next, at S10, a judgement is made as to whether or not the size of copy sheets for use in printing the document data is specified. If the size of the copy sheets is not specified, the judgement is made as "NO", thereby selecting copy sheets having the largest size among the copy sheets that are set in the digital copying machine (S11), and a variable magnification operation is carried out to form reduced document data in accordance with the copy sheets having the largest size (S12). In contrast, if the size of the copy sheets is specified, the judgement is made as "YES" at S10, and a variable magnification operation is carried out in accordance with the size of copy sheets that has been specified (S12). After completion of the variable magnification operation, conversion of the coordinates is executed on the document data according to the longitudinal feeding or the lateral feeding of the copy sheets, if necessary, and the subsequent data are released to the laser driver unit 7, thereby carrying out copying operations of the combined image on copy sheets (S13). The steps, S10 and S11, are carried out in the combination-processing section 47, and the step S12 is carried out in the variable magnification section 54.

Explanations of the above processing are given in detail hereinbelow by exemplifying two cases wherein a map carried on consecutive two pages are joined together and a plurality of torn pieces of a document are joined together. In the case when two pages of image data 58 and 59 of a map are respectively stored in the image memory 43, as is shown in FIG. 4(a), image information corresponding to predetermined lines of data from the end of each image of the document data 58, 59 (indicated by regions having slanting lines) is retrieved so as to recognize peculiar lines and characters. Then, comparison is made between respective pages of the document data 58 and 59 according to the recognized peculiar lines and characters so as to find similar portions to form a joint.

Then, as illustrated in FIG. 4(b), the pages of the document data 58 and 59 are arranged so that corresponding sides having image data to form a joint are aligned face to face with each other, and with one of the pages of the document data 58 maintained in a fixed state, the best-suited position of the image data where the portions of the image are suitably joined together is found by checking the consistency of the data while shifting the other page of the document data 59 in the main scanning direction or in the sub scanning direction, as is indicated by alternate long and two short dashes lines in FIG. 4(b). Thus, the images on the pages are combined together to form document data to be copied on one sheet. Thereafter, a variable magnification operation is carried out in accordance with the size of copy sheets for use in copying, and conversion of the coordinates is executed, if necessary, thereby producing a reduced copy 60 as shown in FIG. 4(c).

Further, for example, as is shown in FIGS. 5(a) and 5(b), in the case when two images of torn pieces 61 and 62 of a document are respectively read by the scanner unit 22, document data 61 and 62 are stored in the image memory 43 as shown in FIG. 5(c). When a joining operation is conducted on the document data 61 and 62, data corresponding to predetermined lines from the periphery of each image (indicated by regions having slanting lines) are first retrieved so as to extract peculiar lines and characters, and their shapes are recognized. Then, while searching for coincidence of the shapes, portions at which the extracted features become coincident with each other are detected.

When a joint is detected, the document data are arranged so that corresponding sides having image data to form the joint are aligned face to face with each other, and positioning is made so that the features and shapes become coincident with each other. Thereafter, the document data are combined together, and at this time data corresponding to a shadow that appears at the joint are erased, and a compensating operation for the loss of data caused by the erasing operation is carried out so as not to result in any unnatural appearance. After having been combined together, the subsequent document data are subject to a variable magnification operation in accordance with the specified size of copy sheets and a conversion on the coordinates, if necessary, and are released to the laser driver unit 7. These operations result in a reduced copy 63 as shown in FIG. 5(d).

Further, the digital copying machine of the present embodiment is provided with a function by which, if a plurality of combinations are found in the positioning the document data that has been conducted by comparing the extracted features and shapes of the images, each combination may be combined and reduced so as to make a sample copy on one sheet. With such a function, the operator can select a desired combination from the samples of the combinations. This results in a more accurate joining operation.

As described above, in the digital copying machine of the present embodiment, when consecutive images carried on a plurality of pages, such as images of a map, are combined together to form a copy on one sheet, those pages are respectively read by the scanner unit 22, and stored in the image memory 43. Joints of the respective pages are detected, and automatically joined together. The processed data are subject to a variable magnification so as to have a specified size, and are used to form a complete copied image. Therefore, different from the aforementioned conventional method, which has required time consuming calculations on reduction rate, etc. and troublesome tasks, such as, trimming and sticking together reduced pages, the present embodiment makes it possible to improve the efficiency of work, and to prevent occurrences of offsets at the joints of the combined document. Since it is no longer necessary to repeatedly make copies, wasteful use of toner, copy sheets, etc. can be prevented.

Further, as described above, in the digital copying machine of the present embodiment, images on torn pieces of a document are read by the scanner unit 22 for each piece, and stored in the image memory 43 as respective document data. The positioning of the document data is carried out by recognizing the joints and shapes of the document data thus stored. Therefore, troublesome tasks, such as finding the coincident portions of the images and shapes between the torn pieces and pasting them together skillfully, are no longer needed, and the torn pieces of the document are automatically combined accurately to produce a completely combined image; this results in an improvement in the efficiency of operation. Further, since the digital copying machine of the present embodiment also has a function by which shadows, which occur at portions corresponding to joints, are erased, it is possible to ensure high-quality in the subsequent combined images.

Referring to the flow chart of FIG. 6, an explanation will be given below on another example of the sequence of the joining operations that are carried out on the above-mentioned document data.

Firstly, the joining mode is selected through an operation panel, not shown, (S21), and when some documents are scanned (S22), data read through the CCD sensor 6 are stored in the image memory 43 (S23). Such scanning processes of the documents and storing processes of the document data (S22 and S23) are repeated as many times as the number of images that are to be joined together until it is determined at S24 that the reading operation of the documents has been completed.

After completion of the reading of the documents, when a joining operation is instructed (S25), features on the documents are extracted by retrieving data corresponding to predetermined lines from the edge of the document data stored and recognizing peculiar lines, characters, etc. (S26) thereon.

Then, a check is made to see if the data forming joints coincide with each other by comparing the features extracted from the respective data (S27). The steps S26 and S27 are carried out in the joint recognition section 44. The document data are arranged so as to align the coincided joints face to face with each other (S28), and positioning is carried out so as to get the images smoothly joined together. These steps are carried out in the data-arranging section 46 and the positioning section 46. Such processes as the extraction of the features of the documents (S26), the judgement on the coincidence of the data (S27), and the arrangement of the document data (S28) are repeated in the above-mentioned order until it is determined at S29 that the processing of all the data has been completed. In contrast, if the judgement is "NO" at S27, the document data are not arranged, and the sequence proceeds to S29. Here, if there are any sides having no coincidence of data during the above processes, a flag indicating "no coincidence" is set, thereby executing the joining operation on the rest of the sides.

After completion of all the data processing, a compensating operation for loss of data is conducted on the sides for which the flag of "no coincidence" has been set (S30). Then, at S31, a judgement is made as to whether or not the compensating operation for loss of data has been completed, and if the compensating operation has been completed, a judgement is successively made as to whether or not the joining operation has been completed, that is, whether or not all the document data stored are combined into an image of one sheet (S33). In contrast, if it is determined that the compensating operation for loss of data has not completed at S31 or the joining operation has not been completed at S33, a warning display indicating "NO" is given to inform that no joining process is operable (S32), thereby stopping the operation.

After determination of the completion of the joining operation at S33, a judgement is then made as to whether or not the size of copy sheets whereon the combined image is formed is specified (S34). If the size of the copy sheets is not specified, copy sheets having the largest size among the copy sheets that are set in the digital copying machine are selected (S35), and a variable magnification operation is carried out in accordance with the copy sheets having the largest size (S36). In contrast, if the size of the copy sheets is specified, a variable magnification operation is carried out in accordance with the size of copy sheets that has been specified. Further, conversion of the coordinates is executed on the document data according to the longitudinal feeding or the lateral feeding of the copy sheets, if necessary (S37), and the subsequent data are released to the laser driver unit 7, thereby carrying out copying operations of the combined image on copy sheets (S38).

Figure 7:
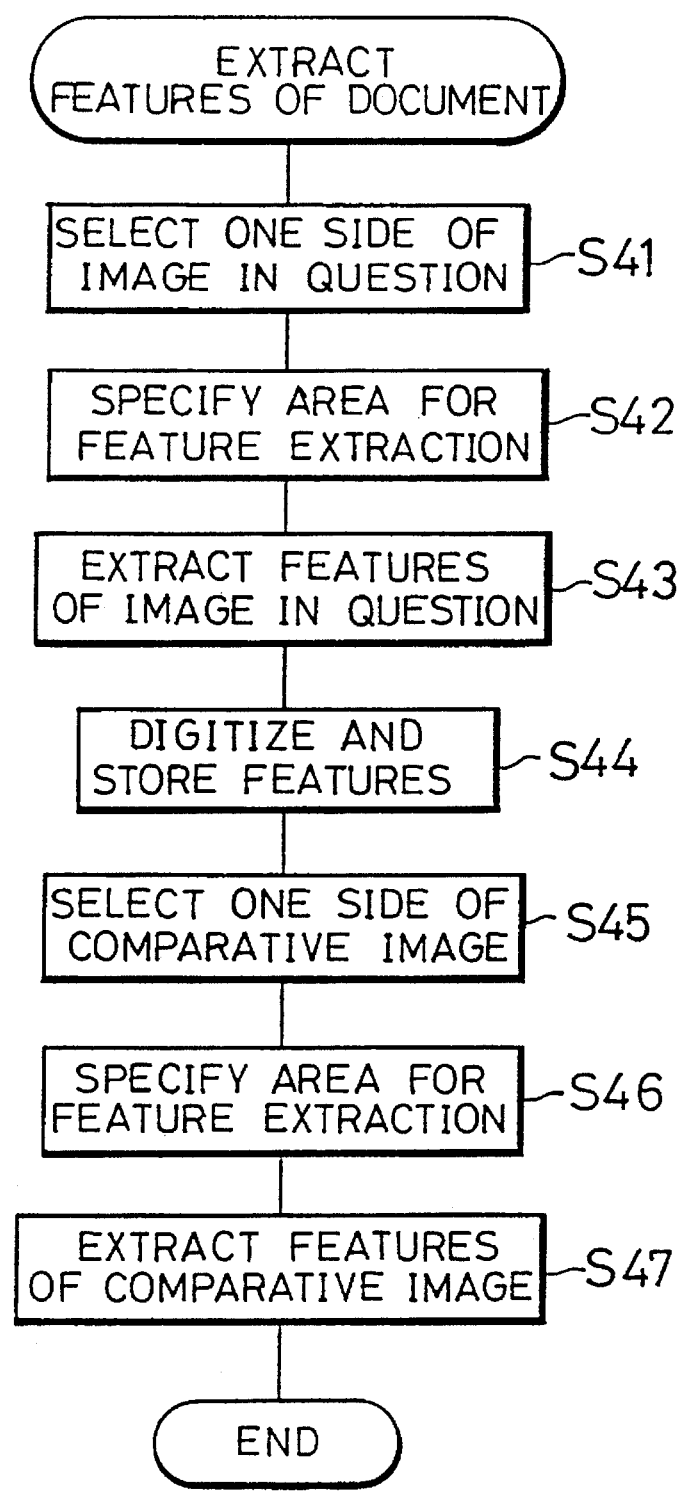
FIG. 7 is a flow chart showing the sequence of processes that are carried out during a feature extraction of documents in the joining operation.

Referring to a flow chart in FIG. 7, an explanation will be given hereinbelow on the extraction of features on the documents in the above-mentioned joining operation.

Firstly, one side of an image in question is selected (S41), and an area corresponding to predetermined lines from the end of the selected side, for example, corresponding to several tens of lines inward from the end, is specified (S42). Then, a selection is made to find a best-suited method for making the features clear among methods using the arrangement, pattern, and color tone of the data depending on the image in question, and features that are present within the feature-extraction area are extracted (S43), thereby storing the extracted features by digitizing them (S44).

Successively, one side of a comparative image, which is to be joined to the image in question, is selected (45), and an area from which features are extracted is specified in the same manner as described in the image in question (S46). Then, the features of the comparative image are extracted in the same manner as described in the feature-extraction of the image in question (S47).

Figure 8:
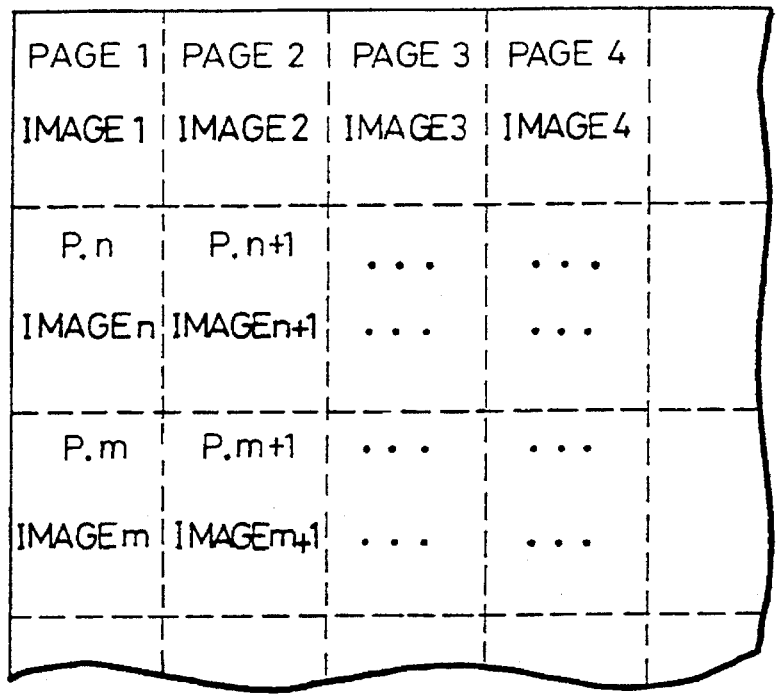
FIG. 8 is an explanatory drawing that shows the positions of document data in the image memory.
Figure 9:
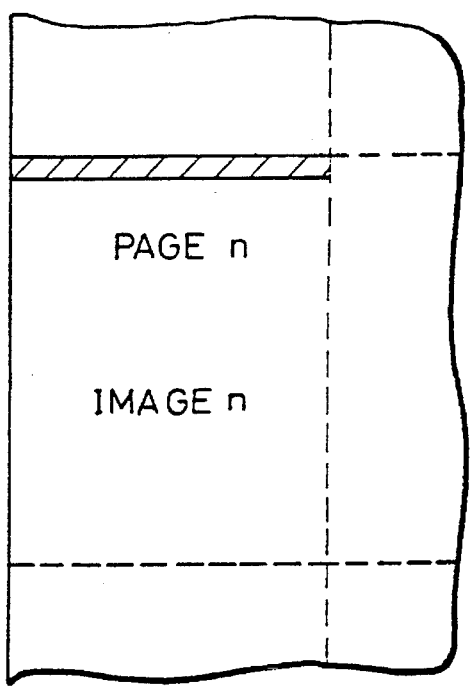
FIG. 9 is an explanatory drawing that shows retrieving areas of the document data stored in the image memory.

Additionally, in the image memory 43, after detecting the size of a document to be read in accordance with the controlling for the normal image reading, storing, copying, etc., an address space is provided in the memory. As shown in FIG. 8, document data are stored therein at a rate of one image per page. Therefore, as shown in FIG. 9, each end of a document (for example, indicated by an area having slanting lines in FIG. 9) can be clearly indicated by an address on the memory, and the feature-extraction area can be specified in accordance with the area.

Figure 10:
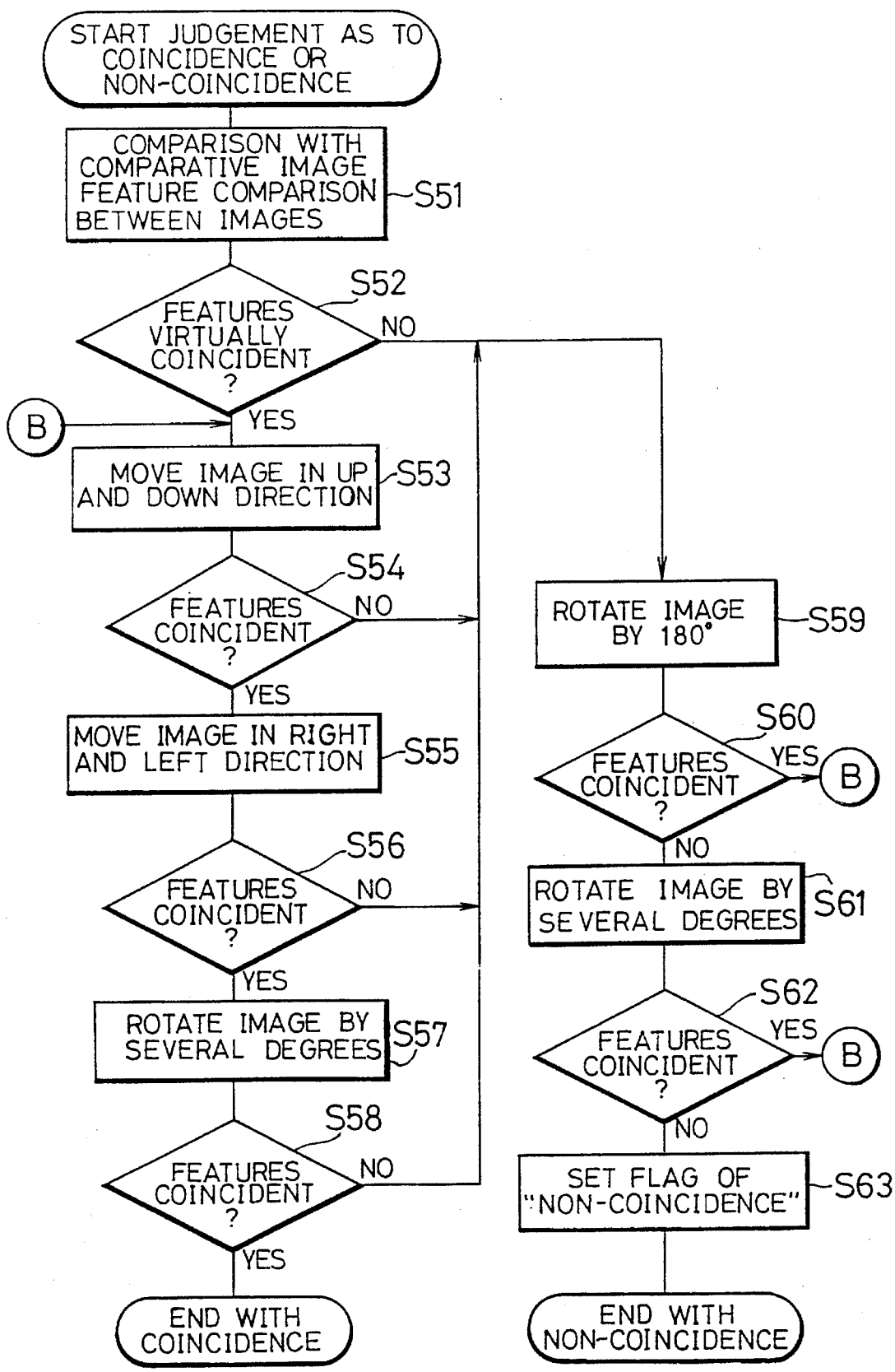
FIG. 10 is a flow chart showing the sequence of processes that are carried out during a decision on coincidence or non-coincidence of the document data in the joining operation.

As described above, after extracting respective features from the image in question and the comparative image, a judgement is made as to the coincidence or non-coincidence of the data by comparing the feature extracted from the comparative image with the feature of the image in question that have been stored earlier, as is shown in the flow chart of FIG. 10.

Firstly, a feature extracted from the image in question is roughly compared with a feature extracted from the comparative image (S51), and a judgement is made as to whether or not the features compared with each other coincide with each other within a range of a predetermined approximation (S52). If the features almost coincide with each other, the document data are arranged so that the sides having the extracted features are aligned face to face with each other, and positioning is performed in the image memory 43 so that the arrangement, pattern, color tone, etc. of the data are well suited. In other words, the images are compensated for their offsets caused when they are read by shifting one of the images in an up and down direction and in a right and left direction (S53 and S55), and also compensated for their tilts caused by the tilts of the documents when they are read by rotating one of the images by several degrees (S57).

Moreover, if it is determined that no coincidence is found between the features when the features are roughly compared, or when one of the images is shifted in an up and down direction and in a right and left direction, or when one of the images is rotated (S52, S54, S56, and S58), a judgement is again made as to whether or not the features coincide with each other (S60) after one of the images is rotated by 180° (S59). If it is determined at S60 that no coincidence is found between the features, one of the images is rotated by several degrees (S61), and even after the rotations, if it is determined that no coincidence is found between the features (S62), a flag indicating "no coincidence" is set (S63).

More specifically, since the documents have a rectangular shape in most cases, their image might be read upside down in an up and down direction. Therefore, even if no coincidence is found between the images in their stored states, the coincidence is again confirmed in the image memory 43 by rotating one of the images by 180°. Further, taking account of the case when upon reading, the document is set in a slightly tilted state, even if no coincidence is found between the images after making the 180° rotation, the features are again compared by rotating one of the images by several degrees.

In contrast, if it is determined at S60 and S62 that the features coincide with each other, the sequence proceeds to S53, and the shift of the images in an up and down direction and in a right and left direction, the rotation of the images, etc. are performed as described earlier so that the arrangement, pattern, color tone, etc. of the data are well suited, thus making the positioning of the images.

Figure 11:
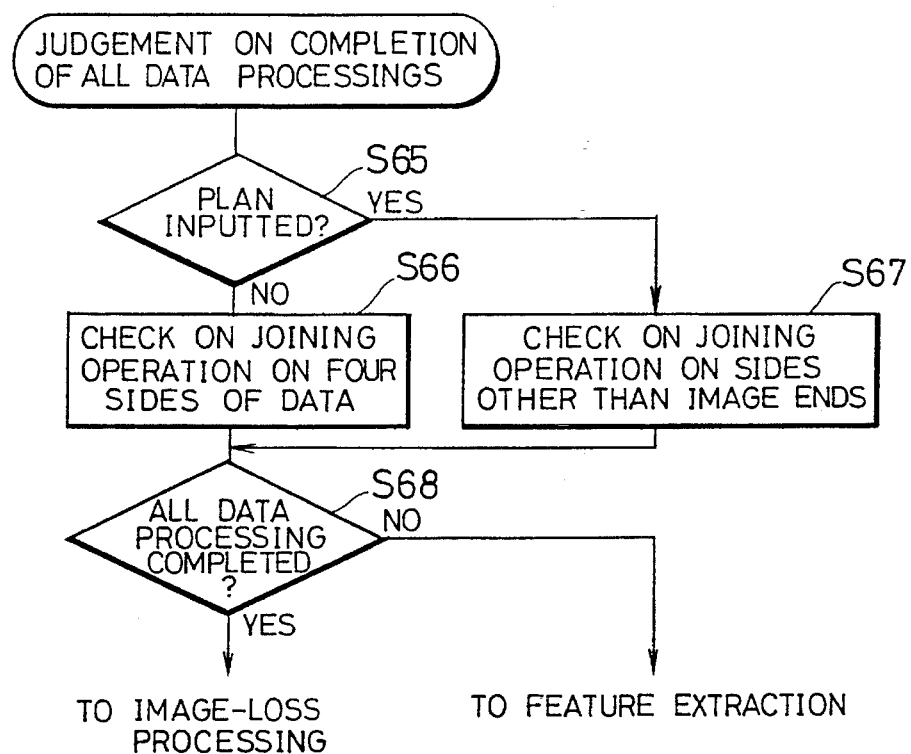
FIG. 11 is a flow chart showing the sequence of processes that are carried out during a judgement as to the completion of all the data processing in the joining operation.

Next, referring to the flow chart of FIG. 11, an explanation will be given in detail concerning the judgement on the completion of all the data processing.

If a plan for the joining operation is preliminarily inputted through a certain method upon reading images or other occasions, it is determined at S65 that there is an inputted plan. In this case, since the sides forming the ends of images are preliminarily known and since the joining operation is not carried out on the sides merely including the ends of images, a judgement is made as to whether or not all the data processing has been completed (S68), by making a check to see if the joining operation is being carried out on the other sides (S67).

In contrast, if document data are randomly inputted, that is, if no plan for the joining operation is specified, the judgement is made as "NO" at S65. Therefore, a judgement is made as to whether or not all the data processing has been completed (S68), by making a check to see if the joining operation is being carried out on the four sides in the data (S66). Additionally, in this case where the document data are randomly inputted, it is determined that the sides on which no coincidence of the features is found are sides merely forming the ends of images, and the joining operation is successively carried out on the other sides.

Figure 12:
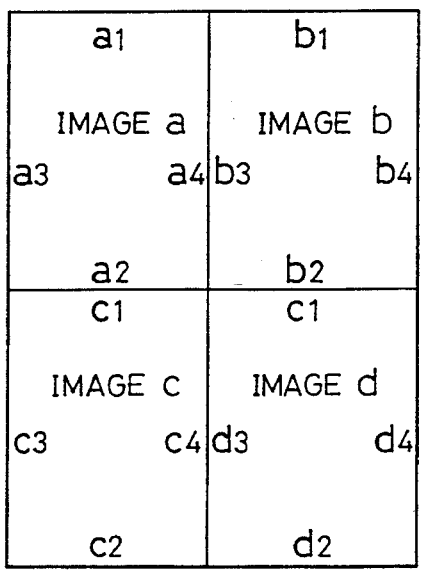
FIG. 12 is an explanatory drawing that shows the positions of images in the case of executing the joining operations on four images.

Here, referring to FIG. 12, an explanation will be given on this in detail. For example, if four images a through d are randomly inputted as document data, judgements as to the coincidence or non-coincidence of the data are made twelve times in the total number: [4 (sheets)×4 (times)−4 (sides, where the coincidence is found)=12]. As a result, the joining operation is carried out on each of the pairs of sides $a_4$ and $b_3$, $b_2$ and $d_1$, $a_2$ and $c_1$, as well as $c_4$ and $d_3$, while flags for indicating "no coincidence" are set for the other eight sides merely including the ends of images ($a_1$, $a_3$, $b_1$, $b_4$, $c_2$, $c_3$, $d_2$ and $d_4$).

Figure 13A:
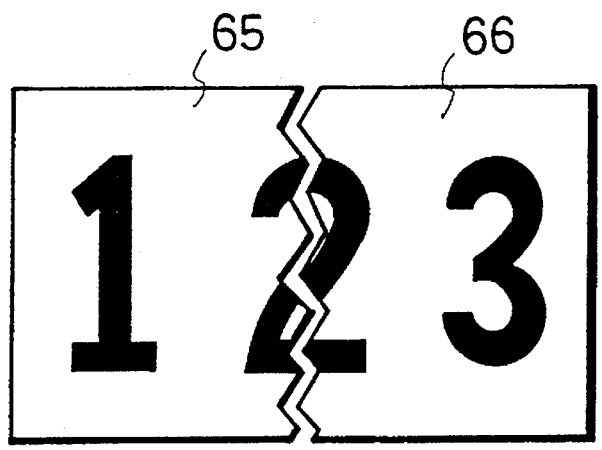
FIG. 13(a) is a plan view showing torn pieces of a document.
Figure 13B:
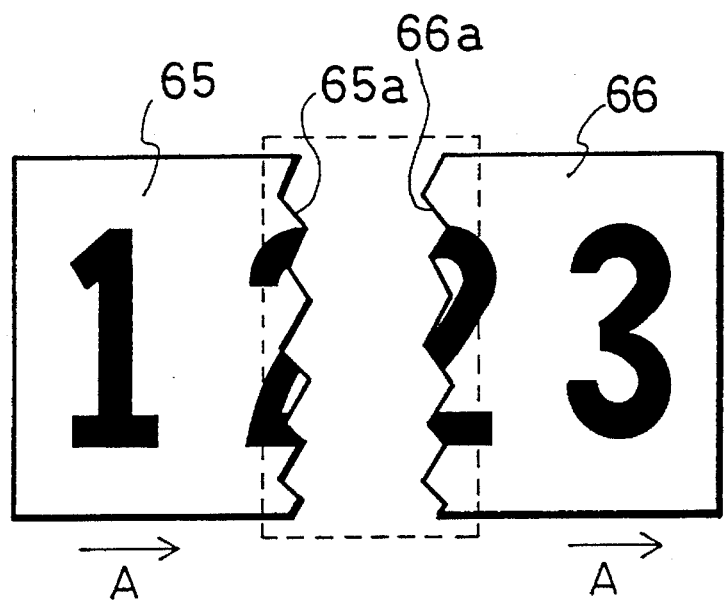
FIG. 13(b) is an explanatory drawing that show the positions of the torn pieces of the document on the document platen and scanning direction of the document.

Additionally, in the case of joining torn pieces of a document 65 and 66, shown in FIG. 13(a), by using the above-mentioned joining operation, the torn pieces are placed onto the document platen 27 with the torn end 65a and 66a aligned face to face with each other in accordance with the positional relationship before it is torn, as shown in FIG. 13(b), and the pieces of the document 65 and 66 are scanned by the scanner unit 22, for example, in the direction of arrow A. This arrangement makes it possible to perform a quick joining operation.

In this case, during the aforementioned feature-extracting process on the images, the torn end 65a at the rear end of the document piece 65 and the torn end 66a at the leading end of the document piece 66 are recognized as portions to be joined together. Thus, upon selecting one side of the image in question at S41, the rear side of the document piece 65, which has been scanned earlier, is first selected. Further, upon selecting one side of the comparative image at S45, the leading side of the document piece 66, which has been scanned later, is selected. Thereafter, the feature-extracting is carried out on the other sides in the same manner.

Moreover, at S51 shown in FIG. 10, comparison is first made between the features of the data representative of the rear side of the document piece, scanned earlier, and those of the data representative of the leading side of the document piece, scanned later, and if necessary, comparison is made between the features of the data representative of the other sides of the document pieces. In such a process, where the pieces of the document 65 and 66 are placed as shown in FIG. 13(b), comparison is first made between the features of the sides that are supposed to be coincident with each other. Therefore, it becomes possible to easily compare the features of the other sides with each other, thereby providing a quick operation.

Furthermore, if a plan for the joining operation is preliminarily inputted through a certain method, that is, if it has already determined that the joining operation is carried out only between the torn ends 65a and 66a of the documents pieces 65 and 66, it is determined at S65 that there is an inputted plan. In this case, since the sides forming the joining ends of the images are already determined and since the joining operation is not carried out on the sides merely including the ends of images, a judgement is made as to whether or not all the data processing has been completed. This is done by making a check to see if the joining operation is being carried out on the other sides at S66.

Figure 14:
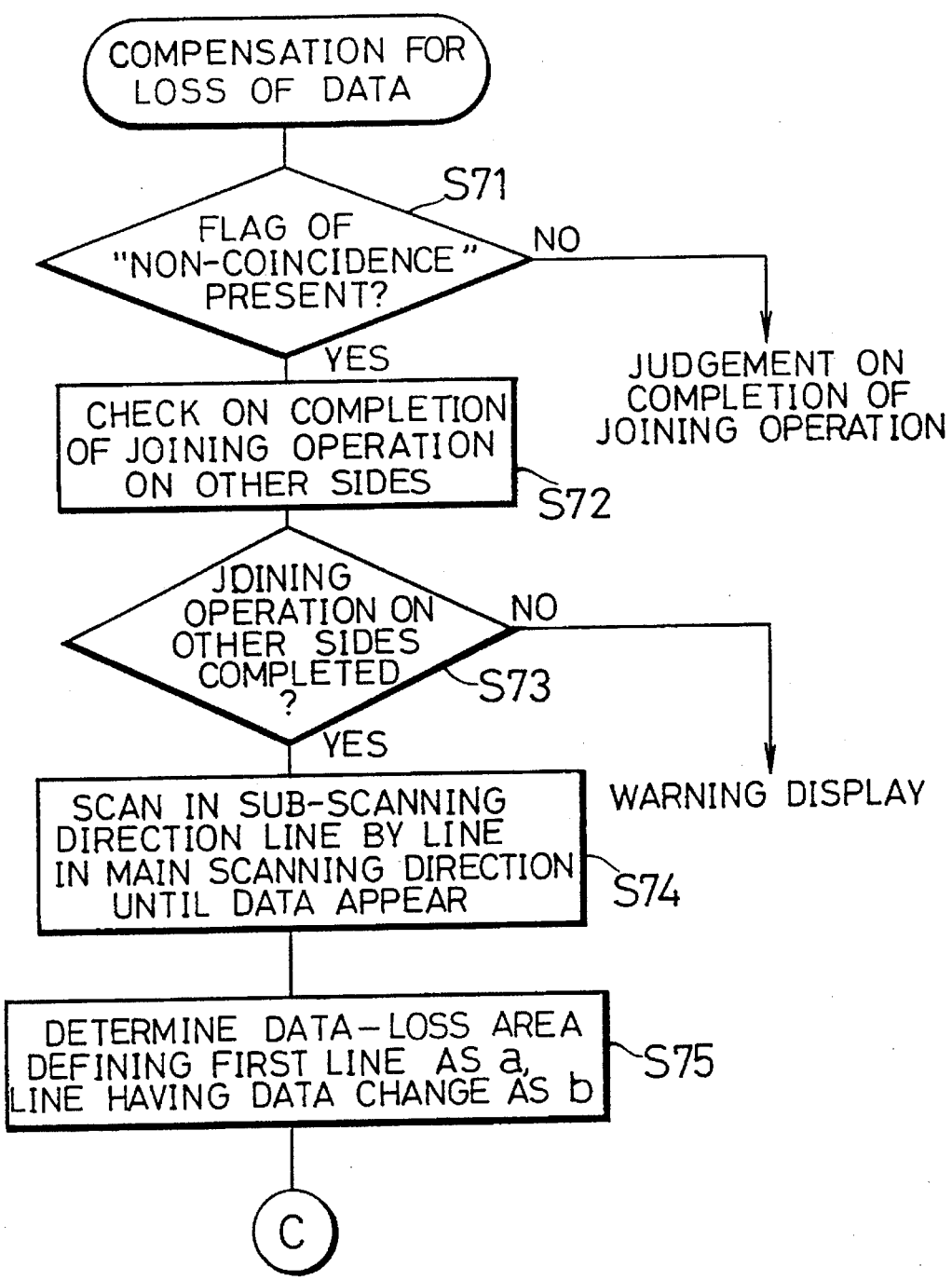
FIG. 14 is a flow chart showing the sequence of processes that are carried out during a compensation for loss of data in the joining operation.

After completion of all the data processing as described above, if any flags for indicating "no coincidence" are found at any portions other than the ends of images, a compensating operation for the loss of data is carried out. As to the compensating operation for the loss of data, an explanation will be given with reference to the flow chart of FIG. 14.

Firstly, a judgement is made as to the presence or absence of the flags for indicating "no coincidence" (S71), and if no flags are found, the sequence proceeds to the step for determining the completion of the joining operation without executing the compensating operation for the loss of data. In contrast, if the flags for indicating "no coincidence" are found, a check is made to see if the joining operation has been completed on each of the other sides (S72). More specifically, if the joining operation is not applicable due to a certain problem, the flag for indicating "no coincidence" is set. Therefore, in order to make a judgement as to whether the cause of the setting of the flag lies in an error in setting the document, which interrupts the images from being joined into one image, or lies in a loss of the image occurred during the reading process of the document, a check is made to see if the joining operation has been completed on each of the other sides.

If it is determined at S73 that the joining operation has not been completed on the other sides, it is determined that the setting of the flag is caused by an error in setting the document, and a warning display indicating that no joining operation is possible is given. In contrast, if it is determined at S73 that the joining operation has been completed on each of the other sides, it is determined that the setting of the flag is caused by a loss of the image, and a check is initiated on the data-loss area in order to conduct a compensating operation for the loss of data.

In other words, taking account of the joining operation carried out on the rest of the sides except the side on which the loss of image is supposed to exist, the check is made to determine the data-loss area assuming that the position of the image having the data-loss has already been determined in relation to the other images. Firstly, a side to be joined to the side having the data-loss is defined as a first line, and scanning in the sub-scanning direction is executed line by line in the main scanning direction until any change appears in the data (S74). Thus, the data-loss area is determined by defining the first line as a as well as defining the line at which a change in the data has first appeared as b (S75).

Figure 15:
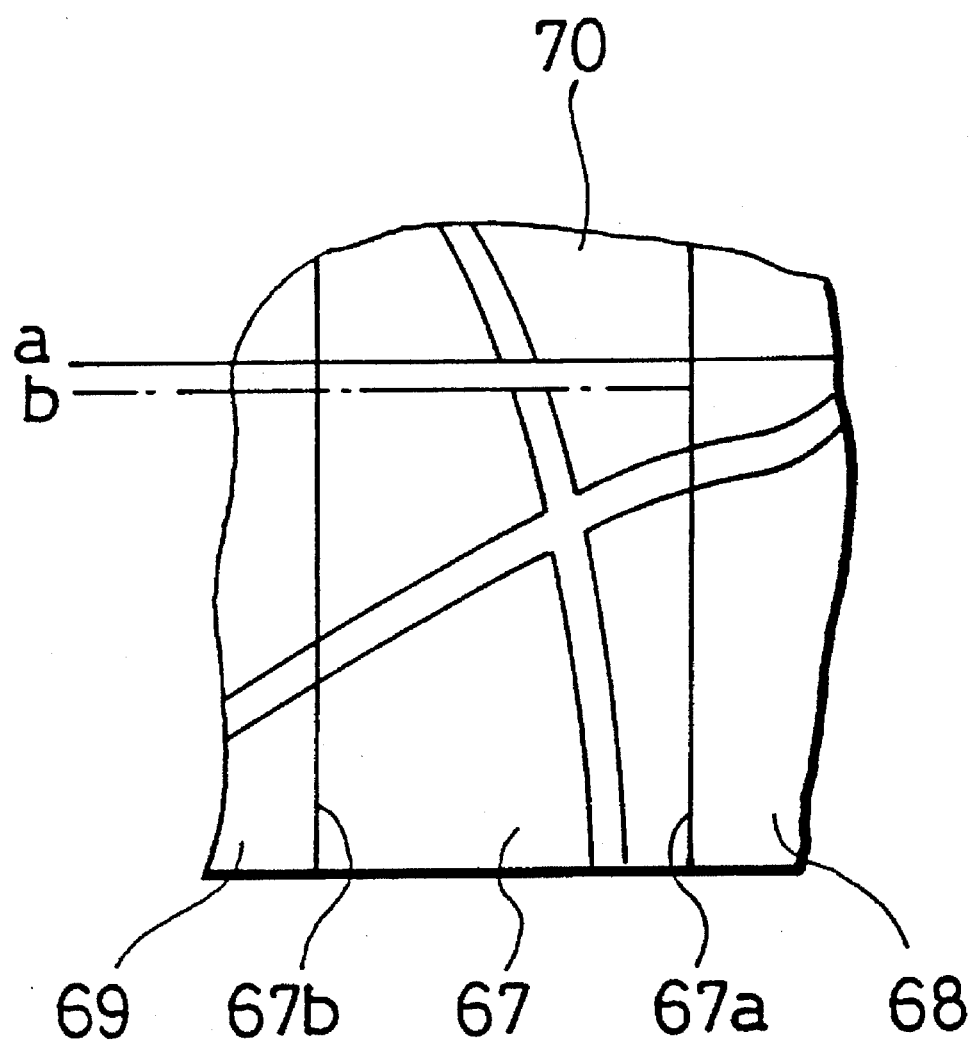
FIG. 15 is an explanatory drawing that shows document data in question for the compensation for loss of data.

For example, if images shown in FIG. 15 are stored in the image memory 43 as document data, and if document data 67 containing a loss of data have been determined in their position in relation to document data 70 as well as having been positioned in relation to other document data 68 and 69 in accordance with sides 67a and 67b having no data-loss, the start line for scanning is given by a (the end of the document data 70) and the line at which a change in the data has first appeared is indicated by b; therefore, it is determined that the data-loss area of the image corresponds to an area between the lines a and b.

Figure 16:
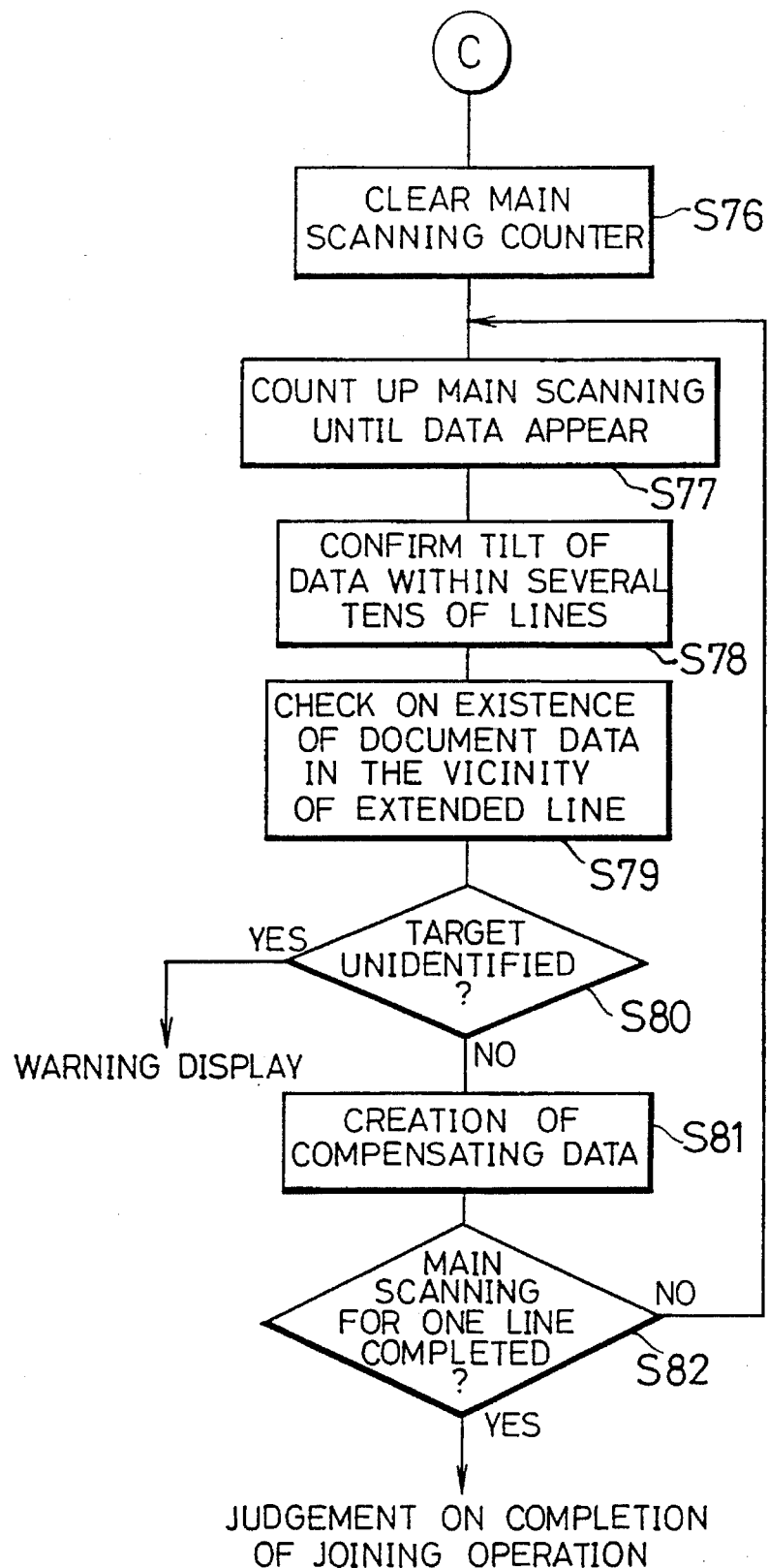
FIG. 16 is a flow chart showing the sequence of processes that are carried out during a compensation for loss of data in the joining operation.

Next, referring to the flow chart of FIG. 16, an explanation will be given on the creating operation of compensating data for compensating for the data-loss of the images that have been determined as described above.

Firstly, the main scanning counter is initialized (S76), and the main scanning counter counts up to a line where data first appear in the area on which the above judgement has been made, on one of the document data (S77). Thus, data, for example, corresponding to several tens of lines are retrieved, and a check is made to see the tilt thereof (S78). Successively, a check is made to see if any data of the other document data are present in the vicinity of an extended line from the data that have been confirmed on the tilt thereof (S79). If no data are present, it is determined that no target is identified (S80), a warning display indicating that no joining operation is possible is given.

In contrast, if data are present in the vicinity of the extended line, the judgement is made as "NO" at S80, and compensating data for the data-loss area are created so as to connect the document data (S81). The above-mentioned steps (S77 through S81) are carried out for one line in the main scanning direction, and if it is determined at S82 that the creation of the data has been completed for the one line in the main scanning direction, the sequence proceeds to the steps for determining the completion of the joining operation.

Figure 17:
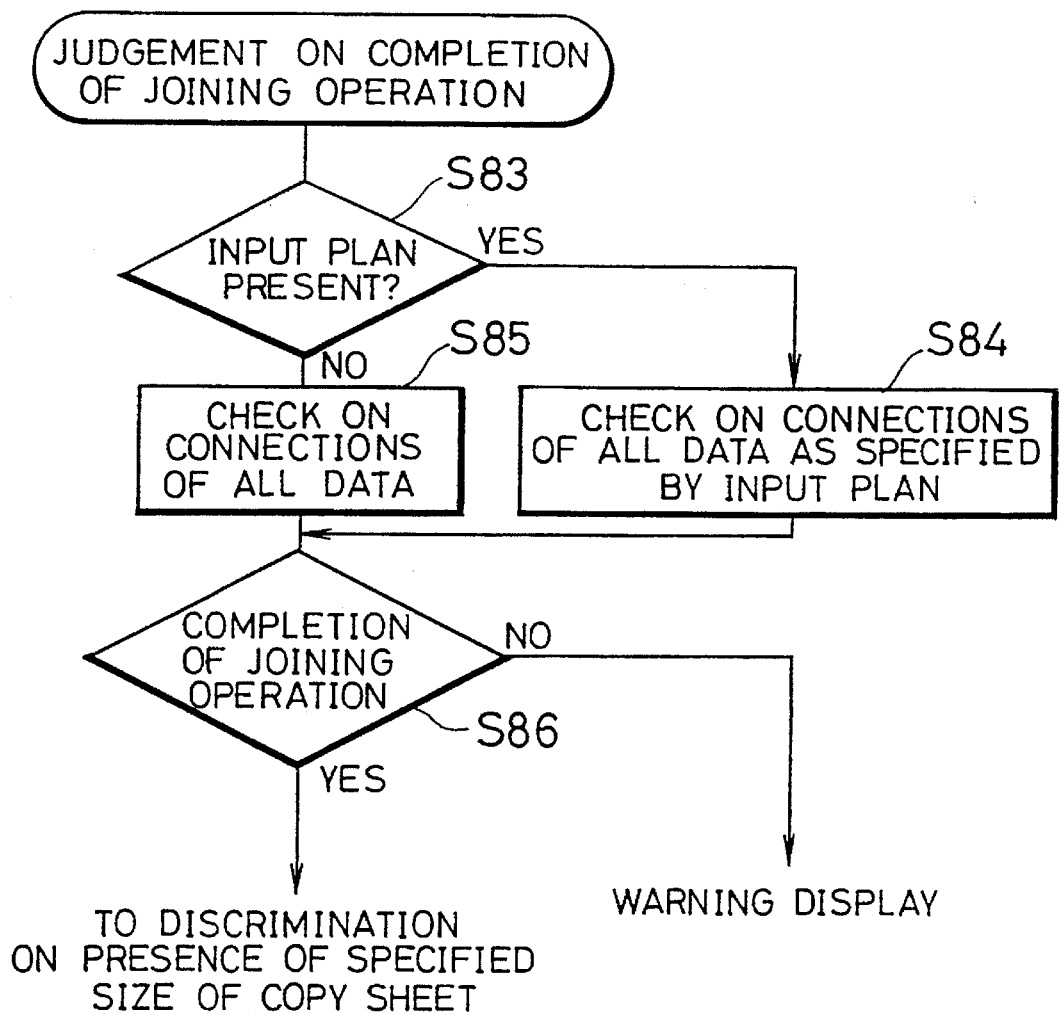
FIG. 17 is a flow chart showing the sequence of processes that are carried out during a judgement as to the completion of all the data processing in the joining operation.

In the decision on the completion of the joining operation, as shown in the flow chart of FIG. 17, if a plan for the joining operation is preliminarily inputted, it is determined at S81 that there is an inputted plan, and according to the plan, a check is made to see if all the data are joined together to form one image in the manner as instructed (S82). In contrast, if no plan is specified, a check is made to see if all the data are joined together (S83). Then, if it is not determined at S84 that the joining operation has been completed, a warning display indicating that no operation is possible is given, while if it is determined that the joining operation has been completed, the sequence proceeds to the steps for checking to see if the size of copy sheets has been specified. Thereafter, the aforementioned operations, such as the mark-erasing operation, variable magnification operation, coordinates-converting operation, etc., are carried out, thereby copying the combined image.

As described above, in the digital copying machine of the present embodiment, images on torn pieces of a document are automatically combined together to form an accurate copy of the original document. Further, since shadows, which occur at portions corresponding to joints, are erased, it is possible to ensure high-quality in the subsequent combined image.

Moreover, as to torn pieces of a document that are placed on the document platen 27 with their torn ends aligned face to face with each other so as to be successively scanned, assuming that the rear edge of the torn piece that has been scanned earlier is joined to the leading edge of the torn piece that has been scanned later, a judgement is first made as to the coincidence or non-coincidence of the rear edge and the leading edge. This makes it easier to make judgements as to the coincidence or non-coincidence of the rest of the edges of the torn pieces. Further, if the rear edge coincides with the leading edge, this also makes it unnecessary to arrange the data by the use of the conversion of the coordinates, or other procedures, because only the necessary process is a positioning on the data corresponding to the portions in question. Therefore, this arrangement simplifies the joining operation as well as shortening the time of the operation. Furthermore, if the joining operation is conducted on, for example, only two torn pieces of a document that are to be joined together at their leading and rear edges, only the necessary processes are a judgement as to the coincidence or non-coincidence that is conducted according to the feature-extraction on these leading and rear edges and a positioning of the data in question, thereby making it possible to further simplify the joining operation as well as further shortening the time of the operation.

Referring to FIGS. 1 and 2 as well as FIGS. 6 through 12, and FIGS. 14 through 20, the following description will discuss another embodiment of the present invention. Here, for convenience of explanation, those members that have the same functions and that are described in the aforementioned embodiments are indicated by the same reference numerals and the description thereof is omitted.

As with the digital copying machine described in the aforementioned embodiments, a digital copying machine of the present embodiment, as one example of image forming apparatuses, has a structure shown in FIG. 2. Further, the digital copying machine is provided with an image processing section, which has a construction as shown in FIG. 1. The digital copying machine of the present embodiment is effective when it is used for executing a joining operation on documents such as those having a margin around the edge of an image or having the same images formed in an overlapped manner on the edges of the consecutive pages so as to make clear the connection between the divided portions of an image, for example, in images of a map or the like. More specifically, in the case where there is a margin or there are overlapped images, when data are successively retrieved from the edge of each document in order to detect a joint, it takes a long time for retrieving until data having specific features are found. In order to solve this problem, the digital copying machine of the present embodiment is provided with an arrangement wherein marks having a predetermined color is put on documents, and by using the marks, the joining operation is carried out quickly and accurately on such documents as described above.

Figure 18:
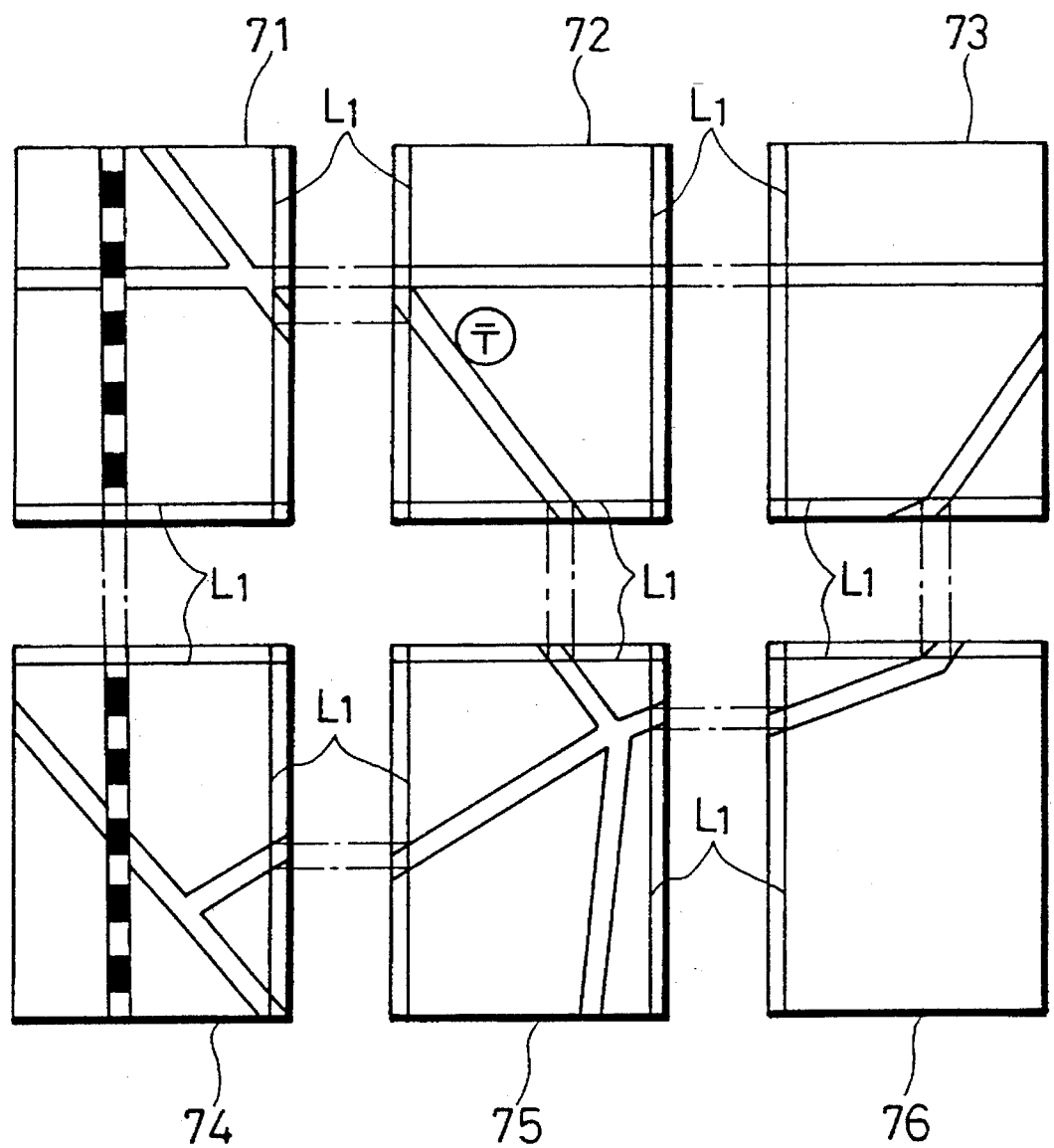
FIG. 18 is an explanatory drawing that shows joining lines drawn on documents to be joined together.
Figure 19:
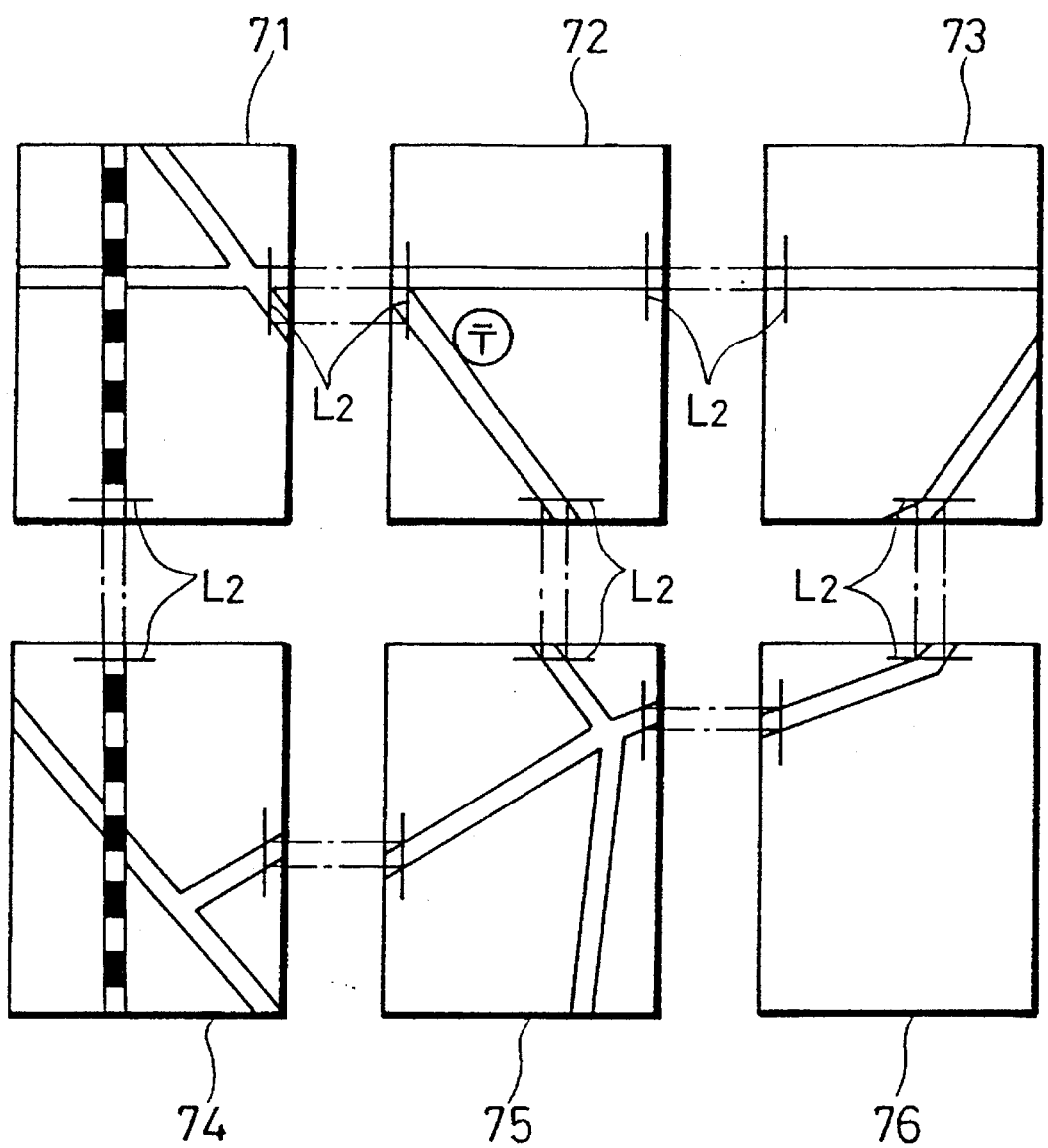
FIG. 19 is an explanatory drawing that shows feature-indicating lines drawn on documents to be joined together.
Figure 20:
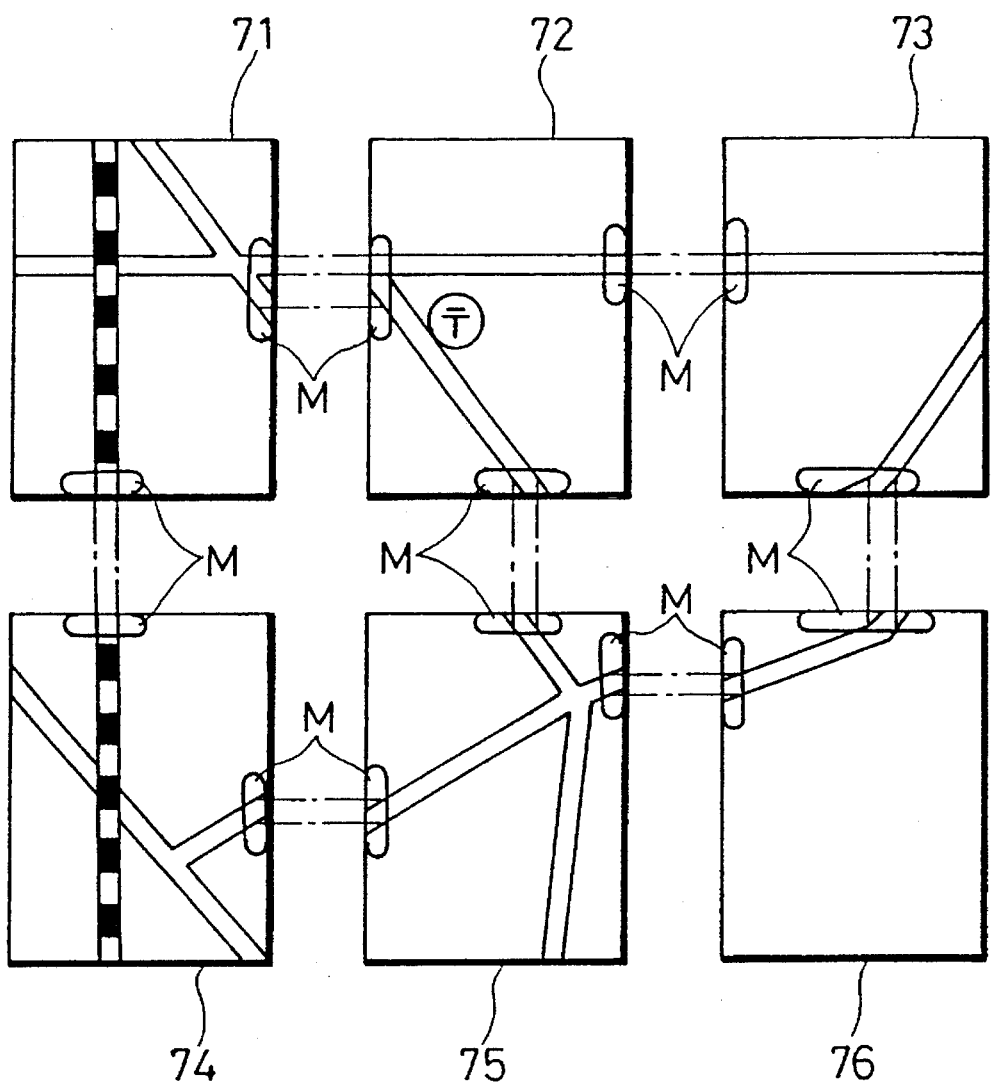
FIG. 20 is an explanatory drawing that shows enclosing marks drawn on documents to be joined together.

For example, those marks preliminarily put on the document include: joining lines $L_1$ which indicate approximate borders for distinguishing necessary portions from unnecessary portions, that is, approximate positions at which respective images are joined together, as are shown in FIG. 18; feature-indicating lines $L_2$ which indicate positions of features that coincide with positions at which respective images are joined together, as are shown in FIG. 19; and enclosing marks M which indicate positions of features that coincide with positions at which respective images are joined together by enclosing the features, as are shown in FIG. 20. These marks are selectively used depending on images which are subject to the operation in question.

In the present digital copying machine, in order to form an image of one sheet by joining together images of a map that are successively carried on a plurality of pages and that have overlapped portions therein, marks as described above are preliminarily put in the vicinity of edges of respective documents 71 through 76 by using a pen in a predetermined color. The marks thus provided are recognized as having a drop color, and erased after completion of the joining operation in the present digital copying machine.

Figure 6:
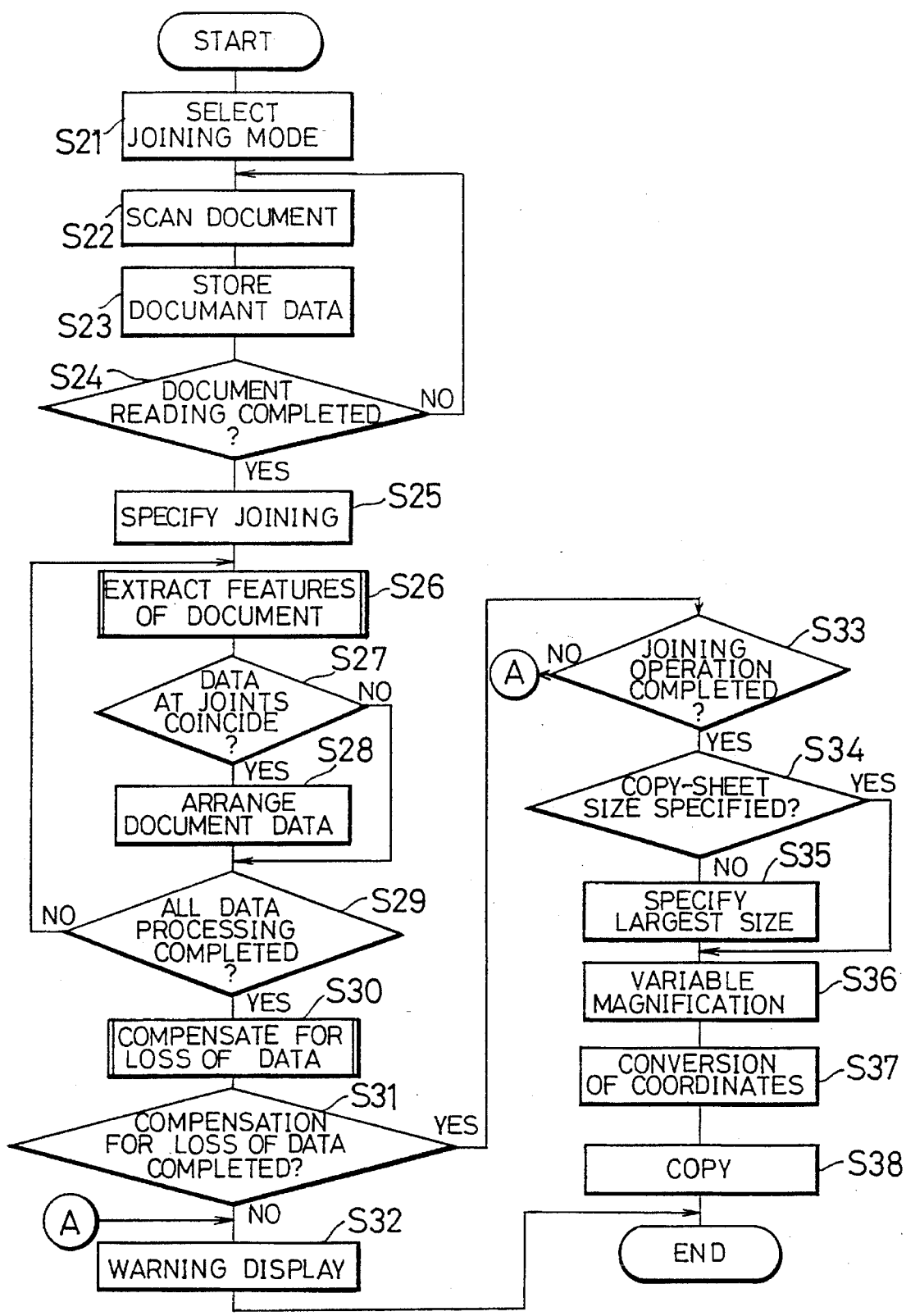
FIG. 6 is a flow chart showing the sequence of processes that are carried out during a joining operation of the document data.

The sequence of operations for joining these images read in the divided manner to form an image on one sheet is almost the same as that described in the aforementioned embodiment by reference to the flow chart of FIG. 6. However, in the extraction of the features from the documents at S26, if the marks are preliminarily put on the documents, the feature-extraction is carried out in accordance with the marks, and conducted only on the sides having the marks.

Further, in specifying the feature-extraction area at S42, if the marks are preliminarily put on the documents, the selection of the sides and the specifying of the feature-extraction area are carried out in accordance with the marks.

More specifically, if joining lines $L_1$ are provided as shown in FIG. 18, the sides having these joining lines $L_1$ are selected, and several tens of lines located before and after each joining line $L_1$ are specified as the feature-extraction area. Further, if feature-indicating lines $L_2$ are provided as shown in FIG. 19, the sides having these feature-indicating lines $L_2$ are selected, and an area including the vicinity of each feature-indicating line $L_2$ is specified as the feature-extraction area. Moreover, if enclosing marks M are provided as shown in FIG. 20, the sides having these enclosing marks M are selected, and each enclosing mark M is specified as the feature-extraction area.

Thus, upon selecting one side from the sides of the comparative image at S45, if the mark is provided, the side having the mark is selected.

As described above, in the digital copying machine of the present embodiment, if marks are preliminarily put on documents, features of the documents are extracted in accordance with the marks. Therefore, sides having no marks are not identified as sides in question since they are merely recognized as sides merely including ends of images. Further, the feature-extraction areas are specified in accordance with the marks with respect to the sides having the marks. Therefore, in comparison with the case where the feature-extracting is started from each end with respect to all the sides of the document data, the memory capacity can be saved and the processing time required for extracting the features can be shortened. In particular, in the case where the feature-indicating lines $L_2$ of FIG. 18 and the enclosing marks M of FIG. 19 are put as the marks, since these marks also indicate the position of features forming joints, the feature-extraction area can be specified by merely using the surrounding portions of the feature-indicating lines $L_2$ and the areas enclosed by the enclosing marks M. This makes it possible to save memory capacity to a great extent.

Also in the judgement as to the coincidence or non-coincidence of the data (see FIG. 10), if the marks are preliminarily put on the documents, the feature-extraction is made only on the sides having the marks. Therefore, the processing time required for the judgement as to the coincidence or non-coincidence of the data can be shortened, thereby making it possible to perform the positioning of the documents more quickly and accurately.

Figure 21:
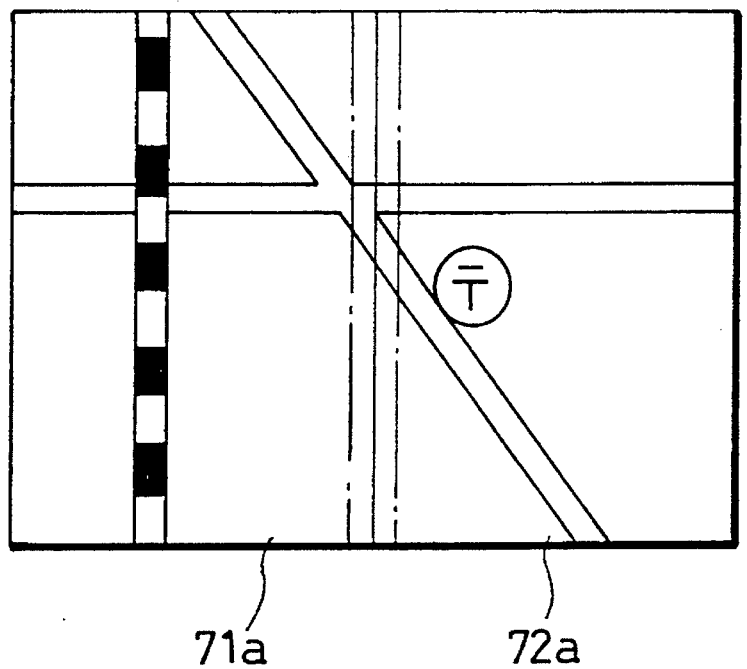
FIG. 21 is an explanatory drawing that shows document data that were positioned by the joining operation.

For example, as shown in FIG. 21, the coincidence of data is determined between document data 71a and 72a, and after positioning is performed, the area having the overlapped image (indicated by the area sandwiched by alternate long and short dashes lines) is removed, thereby allowing the images of the document data 71a and 72a to be smoothly joined.

Further, in the judgement on the completion of all the data processing, upon reading the image or other occasions, if it is possible to clearly distinguish sides to be joined together from those merely including the ends of images through the presence and absence of the aforementioned marks, it is determined at S65 that there is an inputted plan.

Figure 22:
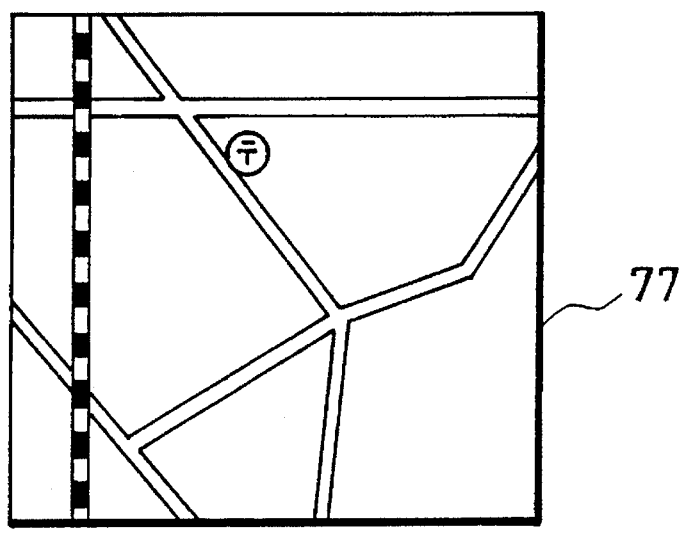
FIG. 22 is an explanatory drawing that shows a copy obtained by the joining operation.

Therefore, after successively reading documents whereon various marks as shown in FIG. 18, FIG. 19 or FIG. 20 are put, the joining operation is carried out in such a manner that a copy 77 as shown in FIG. 22 can be obtained.

Additionally, in the above joining operation that is carried out on the documents having the marks, since the marks thus provided are recognized as having a drop color, an image from which the marks have been erased is formed on the resulting copy.

As described above, in the digital copying machine of the present embodiment, in accordance with the marks that have been preliminarily put on the documents, the feature-extraction is carried out and the positioning of the images is carried out, thereby producing a combined image on one copy sheet. Therefore, it is possible to save the memory capacity and to carry out the operation quickly and accurately.

Additionally, in the present embodiment, the explanation has been given by exemplifying the case where the joining operation is carried out on pages of a map, etc. in the form of a book whereon overlapped images are formed at the vicinity of the edges of the consecutive pages. However, the joining operation of the present embodiment may be applied to documents, each having margins surrounding an image. Also, in this case, the joining line $L_1$ is preliminarily put along the border between the margin and the image, or the feature-indicating line $L_2$ or the enclosing mark M is provided so as to indicate features that are located in the vicinity of the border between the margin and the image. Thus, it becomes possible to save the memory capacity and to carry out the operation quickly and accurately.

Referring to FIGS. 2, 3, 6, 10, 23 and 24, still another embodiment of the present invention will be discussed hereinbelow.

Figure 3:
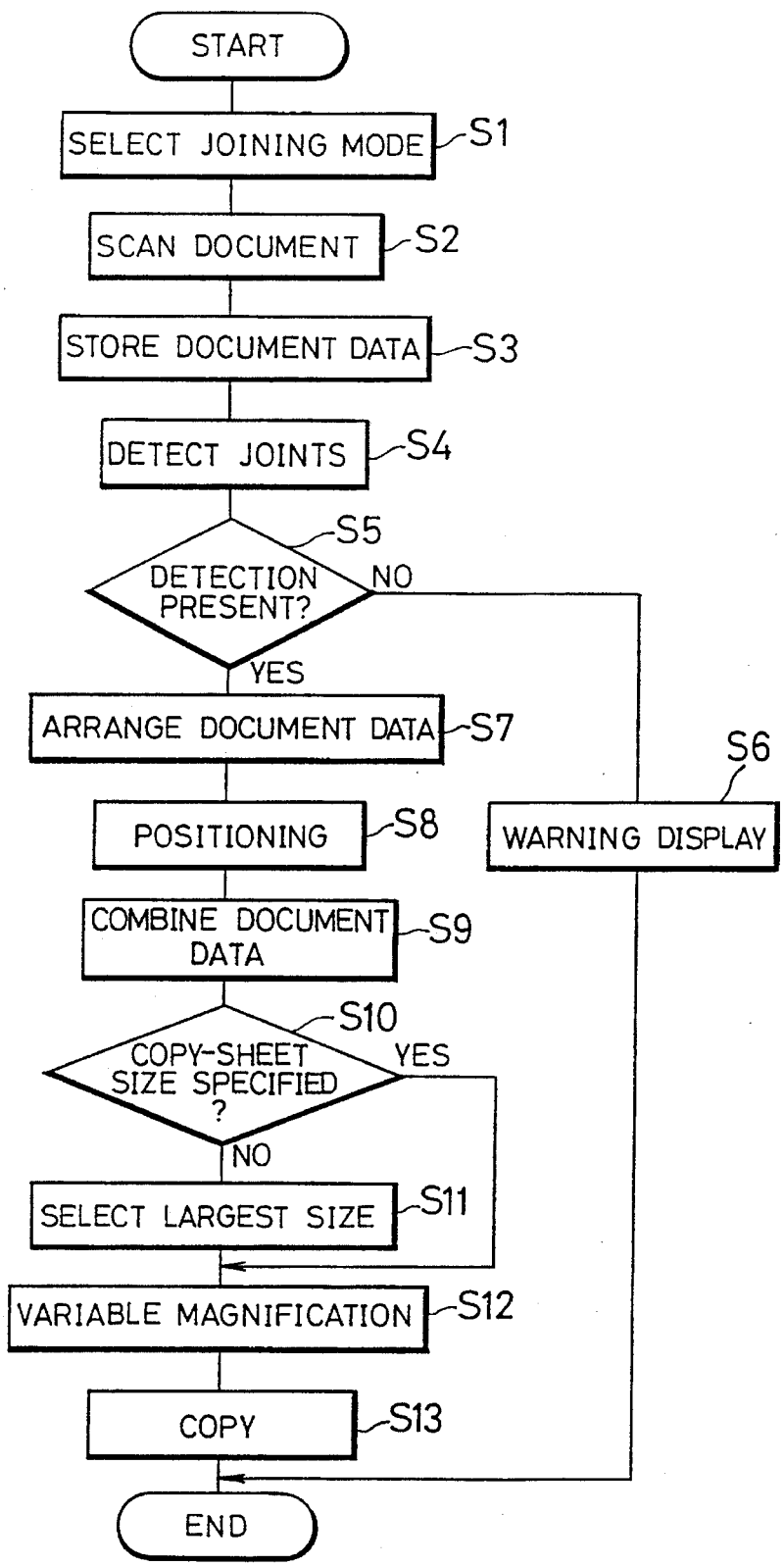
FIG. 3 is a flow chart showing the sequence of processes that are carried out during a joining operation of document data in the digital copying machine of FIG. 1.
Figure 4:
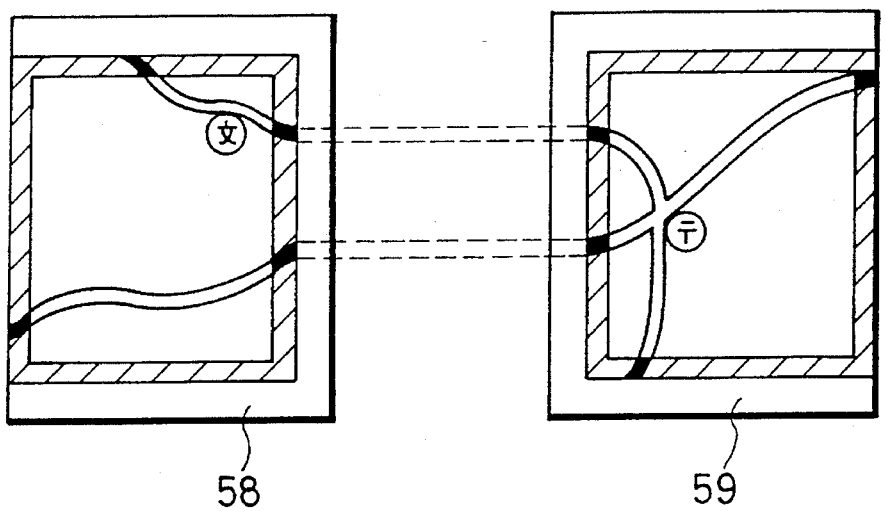
FIG. 4(a) is an explanatory drawing that indicates retrieving areas of document data.
FIG. 4(b) is an explanatory drawing that shows a positioning operation of the document data.
FIG. 4(c) is an explanatory drawing that shows a resulting image obtained after the document data shown in FIG. 4(a) have been subject to a combining operation and a variable magnification operation.
Figure 4:
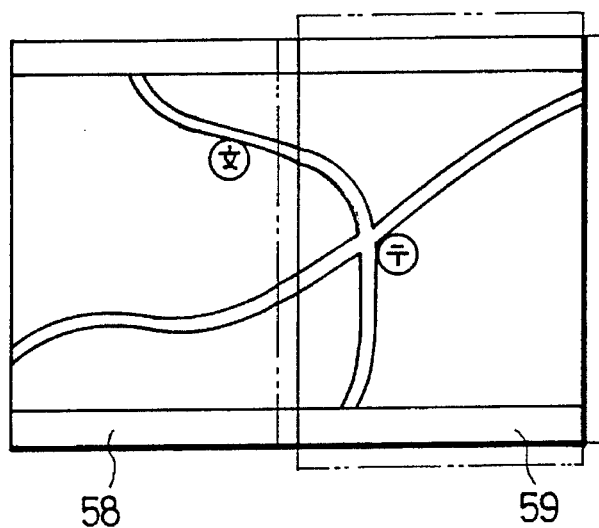
Figure 4:
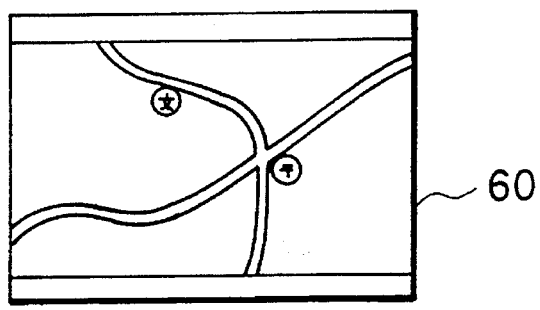
Figure 23A:
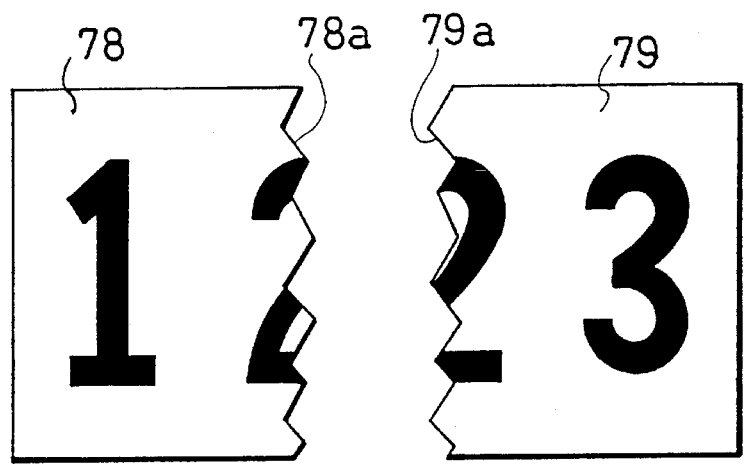
FIG. 23(a) is a plan view showing torn pieces of a document.
Figure 24:
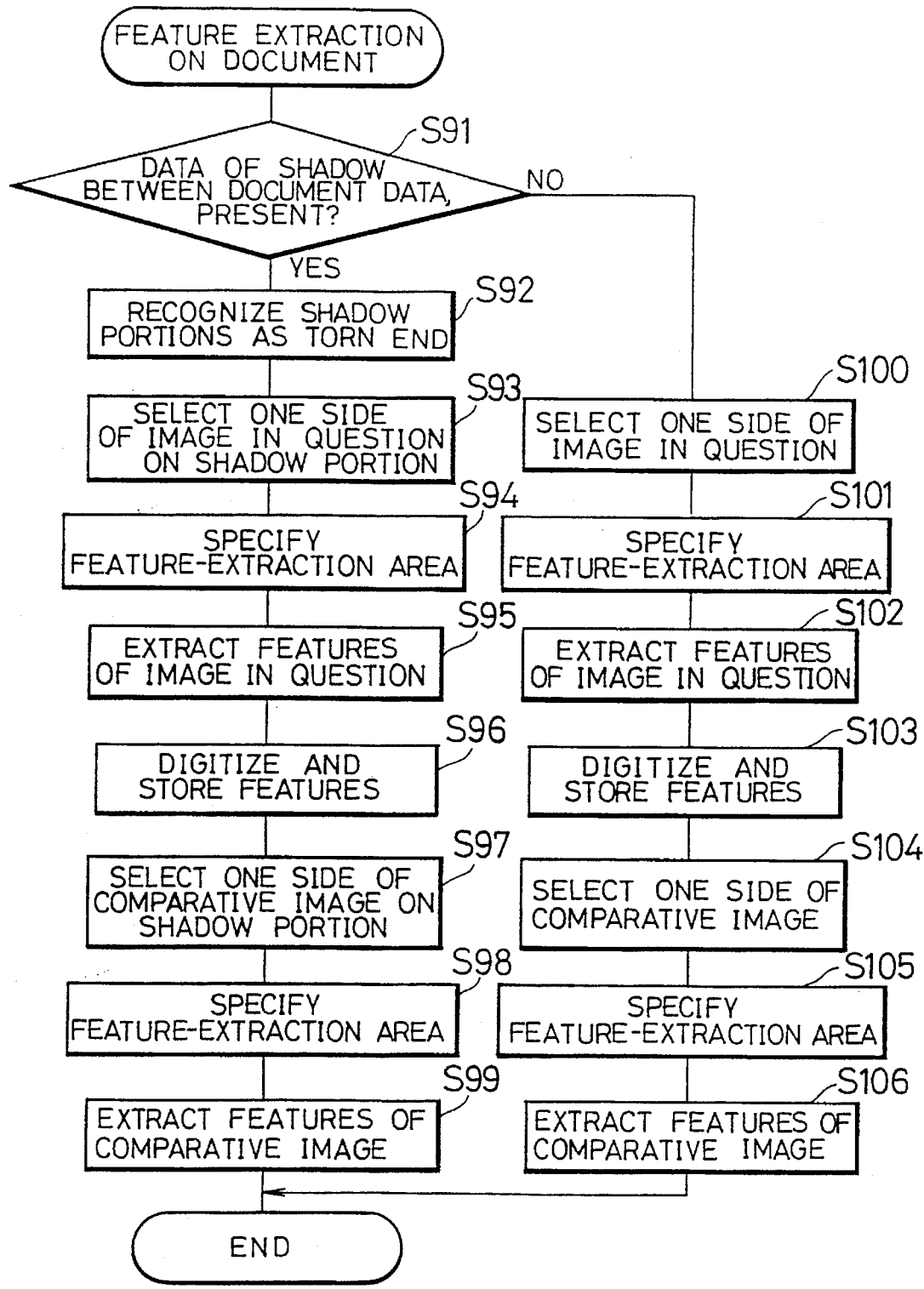
FIG. 24 is a flow chart showing the sequence of processes that are carried out during a feature-extraction of the torn pieces of the document in the joining operation.

The digital copying machine of the present embodiment has a construction shown in FIG. 2, and is provided with the capability to perform the steps shown in FIG. 3. The digital copying machine is designed to perform a quick joining operation when used in the case where torn pieces of a document 78 and 79, shown in FIG. 23(a), are placed on the document platen 27 with their torn ends 78a and 79a aligned face to face with each other in accordance with the positional relationship before it is torn, as shown in FIG. 23(a), and the pieces of the document 78 and 79 are scanned by the scanner unit 22. In this case, the basic operation of the joint-portion processing section is the same as that shown in the flow chart of FIG. 6; yet, the feature-extracting operation of the document at S27 of FIG. 6 is shown in FIG. 24. An explanation of these operations is given below.

Figure 23B:
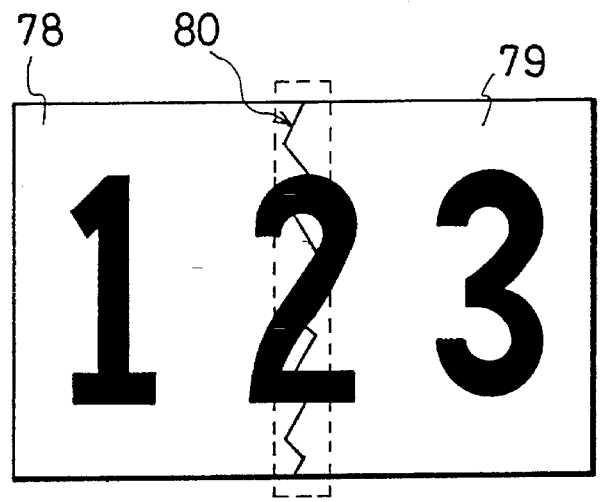
FIG. 23(b) is an explanatory drawing that shows the positions of the torn pieces of the document on the document platen and scanning direction of the document.
Figure 23C:
FIG. 23(c) is an explanatory drawing that shows an image released from the digital copying machine after the joining operation.

Firstly, the document data stored in the image memory 43 are retrieved, and a judgement is made as to whether or not data representative of a shadow are present between any portions of the document data that seem to be consistent (S91). In this case, if the document pieces 78 and 79 are placed with their torn ends 78a and 79a in contact with each other in accordance with the original positional relationship before it is torn, for example, as shown in FIG. 23(b), a shadow 80 is present along this contact portion. Therefore, since data representative of a shadow are present between portions of the document data that seem to be consistent, the judgement is "Yes" at S91, and the shadow portion is recognized as a torn end (S92).

Next, one predetermined image is defined as an image in question, while the other image that is to be joined to this is defined as a comparative image. Thus, one side corresponding to the shadow portion of the image in question, that is, one side corresponding to the torn end, is selected (S93), and an area corresponding to predetermined lines inward from the end of the selected side is specified (S94). Then, features are extracted in this area (S95), and the extracted features are stored by digitizing them (S96). Next, one side corresponding to the shadow portion of the comparative image that matches the one side of the image in question is selected (S97), and an area from which features are extracted is specified in the same manner (S98), thereby extracting the features of this image (S99). Here, the above-mentioned steps S93 through S99 correspond to the steps S41 through S47 that have been shown in FIG. 7.

In contrast, at S91, if no data representative of a shadow are present between any portions of the document data, that is, if the document pieces 78 and 79 are not placed in the state as shown in FIG. 23(b), but placed unintentionally in a scattered manner, one side of the image in question is selected (S100), and its feature-extracting area is specified (S101). The features of the selected side are extracted by retrieving this area (S102), and the extracted features are stored by digitizing them (S103). Successively, one side of the comparative image is selected (S104); its feature-extracting area is specified (S105); and the features of the selected side are extracted (S106).

Next, at S27 of FIG. 6, which is the same as the judging operation as to coincidence or non-coincidence in FIG. 10, a judgement is first made as to the coincidence or non-coincidence of the corresponding torn ends that have been detected by the data of shadow. The processes that are carried out following S28 and thereafter, shown in FIG. 6, are the same as those described in the aforementioned embodiment, and the erasing operation for the data of shadow is carried out in the processes S28 and thereafter.

As described above, also in the digital copying machine of the present embodiment, images on torn pieces of a document are automatically combined together to form an accurate copy of the original document. Further, since shadows, which occur at portions corresponding to joints, are erased, it is possible to ensure high-quality in the subsequent combined image.

Moreover, as to torn pieces of a document that are placed on the document platen 27 with their torn ends in contact with each other in accordance with the original positional relationship before it is torn, data of a shadow located between portions of document data previously read are recognized as torn ends of the document, and a judgement is first made as to the coincidence or non-coincidence of the corresponding torn ends. This arrangement makes it possible to shorten the time of the judging operation. Further, if the torn ends coincide with each other, this makes it unnecessary to arrange the data by the use of the conversion of the coordinates, or other procedures, because only the necessary process is a positioning on the data corresponding to the portions in question. Therefore, this arrangement simplifies the joining operation as well as shortening the time of the operation. Furthermore, since the torn pieces of a document are placed on the document platen 27 with all their torn ends properly in contact with one another, it is certain that the joining operation is not required for the ends of the torn document pieces other than the torn ends. Therefore, in the case where this fact has been inputted to the joint-portion processing section 48, only the necessary processes are a judgement as to the coincidence non-coincidence that is conducted according to the feature-extraction on the corresponding torn ends and a positioning of the data in question, thereby making it possible to further simplify the joining operation as well as further shortening the time of the operation.

Figure 25:
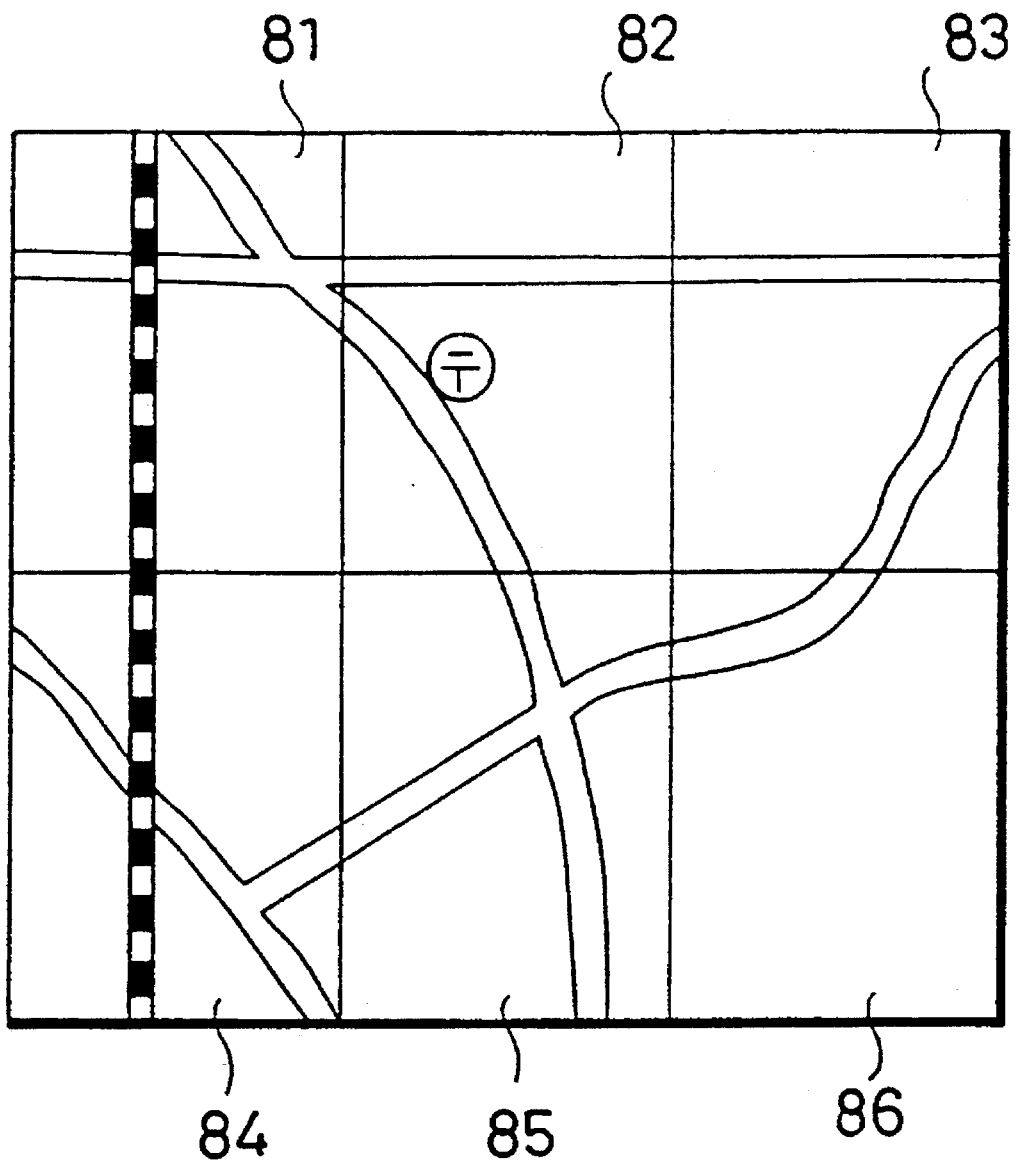
FIG. 25 is an explanatory drawing that shows a document on which the joining operation is conducted.

The above-mentioned joining operation will be explained more specifically by reference to a case where images of six pieces of a document 81 through 86, for example as shown in FIG. 25, are scanned by the scanner unit 22, and stored in the image memory 43.

Figure 26A:
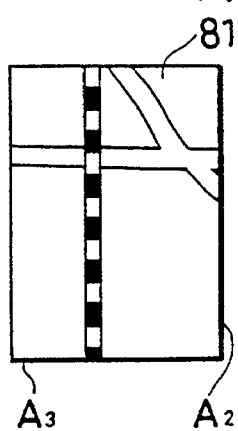
FIGS. 26(a) through 26(g) are explanatory drawings that respectively show an input sequence for images that specifies the positional relationship between document data in the joining operation.
Figure 26B:
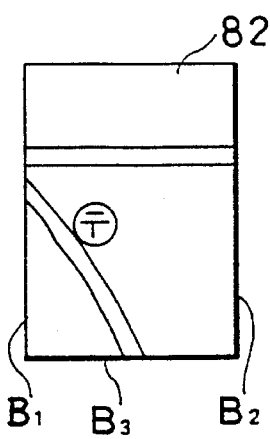
Figure 26C:
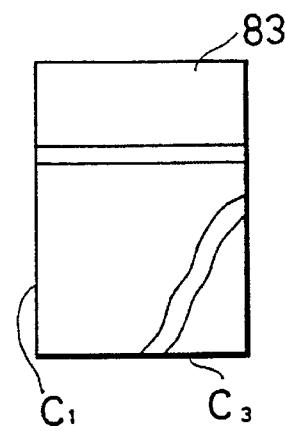
Figure 26D:
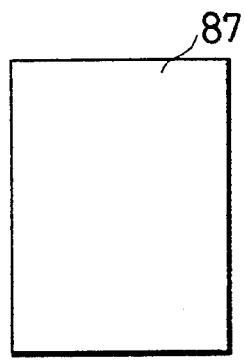
Figure 26E:
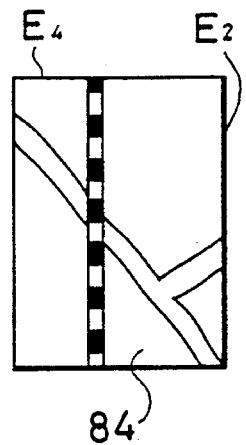
Figure 26F:
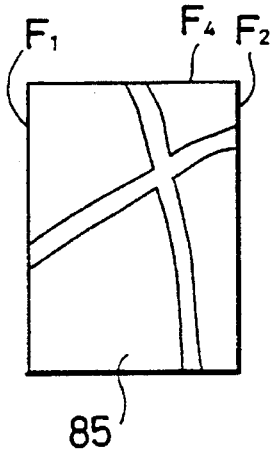
Figure 26G:
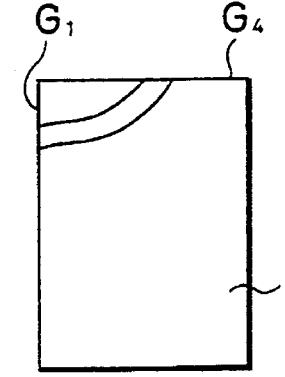

In the case where the above-mentioned input plan is specified, upon reading images, the document pieces are successively scanned in the order to be joined, and in order to specify a change into a new line in the image memory 43, a specific document, such as a sheet of white paper, is read prior to the document after which the line change is made. In other words, beginning with the document piece 81 shown in FIG. 26(a), the scanning of the images are successively conducted on the document piece 82, shown in FIG. 26(b), and on the document piece 83, shown in FIG. 26(c). Here, in order to specify a change into a new line, a sheet of white paper 87, shown in FIG. 26(d), is scanned. Thereafter, the document piece 84, the document piece 85, and the document piece 86, which are respectively shown in FIG. 26(e), FIG. 26(f) and FIG. 26(g), are successively scanned in this order.

With this arrangement, the joining operations are respectively conducted on side $A_2$ of the document piece 81 and side $B_1$ of the document piece 82 as well as on side $B_2$ of the document piece 82 and side $C_1$ of the document piece 83. As to the document pieces 84 through 86 that have been inputted after the sheet of white paper 87, since the instruction for changing into a new line is given, they are arranged in the lower row under the document pieces 81 through 83 in the image memory 43. Therefore, the joining operations are respectively conducted on side $A_3$ of the document piece 81 and side $E_4$ of the document piece 84, on side $B_3$ of the document piece 82 and side $F_4$ of the document piece 85, as well as on side $C_3$ of the document piece 83 and side $G_4$ of the document piece 86. Further, the joining operations are also conducted on side $E_2$ of the document piece 84 and side $F_1$ of the document piece 85 as well as on side $F_2$ of the document piece 85 and side $G_1$ of the document piece 86 in accordance with the order inputted.

In the case where document pieces are inputted at random regardless of the order of their joining operations, as the number of the document pieces increases, or as the images become more complicated, the time of the operations is prolonged, and the number of errors increases. However, with the above arrangement wherein sides to be joined are preliminarily specified upon reading the images by the use of the input order and the instruction using sheets of white paper, it becomes possible to perform the operations quickly and accurately, even if a number of document pieces are joined one after another.

Figure 27A:
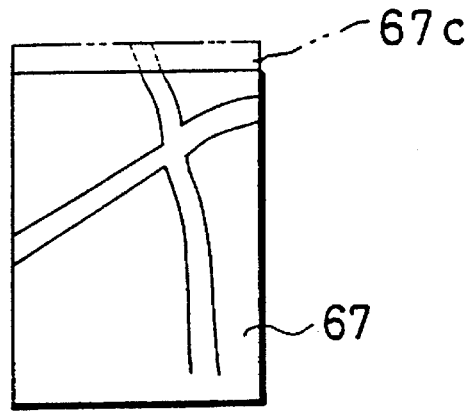
FIG. 27(a) is an explanatory drawing that shows document data having a loss of data for which a compensating operation is conducted.

Moreover, in an image of document data read by the scanner unit 22, a data-loss portion 67c is quite likely to exist at the end of the image on the document data 67, as shown FIG. 27(a), due to an offset or other reasons caused when the document piece is placed on the document platen 27. In such a side having the data-loss portion 67c, the joining operation is not carried out, and a flag indicating "non-coincidence of data" is set. However, even in the case where there is a side at which the flag indicating "non-coincidence" is set, if coincidence of data is confirmed at predetermined points in the document data or if coincidence of data is confirmed by a level beyond a predetermined amount, the positioning of the document data 67 is carried out in relation to the other sides having no data-loss portion. Therefore, in accordance with the positioning, compensation for data is executed on an area between lines a and b, which is determined as a data-loss area in the manner as described earlier.

Figure 27B:
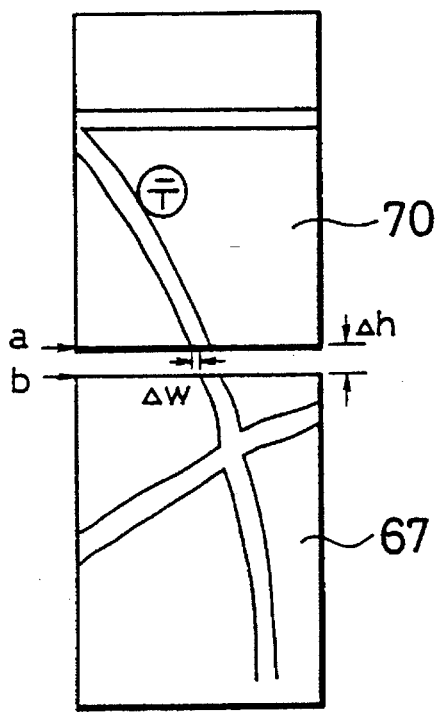
FIG. 27(b) is an explanatory drawing that shows a distance and an offset between document data.
Figure 27C:
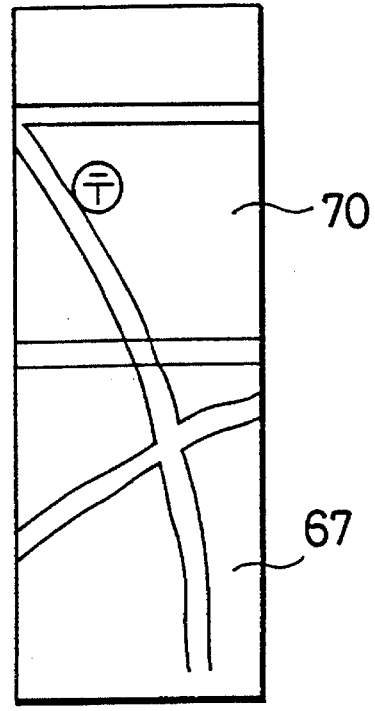
FIG. 27(c) is an explanatory drawing that shows document data after having been subject to the compensating for loss of data.

More specifically, as illustrated in FIG. 27(b), a compensating-data creating process is carried out so that images are smoothly joined together between the lines a and b having a distance $\Delta h$ by compensating for an offset $\Delta w$ between the images in the document data 67 and the document data 70. Thus, compensated data as shown in FIG. 27(c) is created, thereby carrying out the compensating operation for the loss of data.

Additionally, in such a compensating-data creation, the same process is carried out not only in an up and down direction with respect to the above-mentioned lines a and b, but also in a right and left direction.

Figure 28:
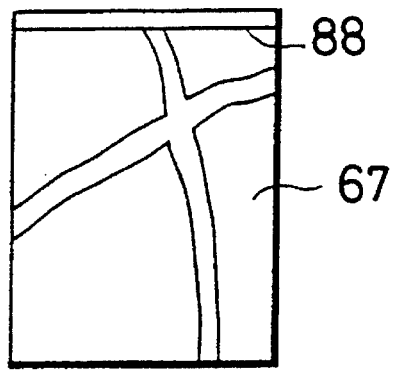
FIG. 28 is an explanatory drawing that shows a line caused by the edge of a document in the document data stored in the image memory.

Moreover, as illustrated in FIG. 28, a line 88 is quite likely to appear at a portion corresponding to the edge of the document in the document data 67 stored in the image memory 43. Therefore, the digital copying machine in the present invention is provided with a function for recognizing such a line 88 when the document data 67 are inputted to the image memory 43 and for erasing the line 88 caused by the edge of the document.

Figure 29:
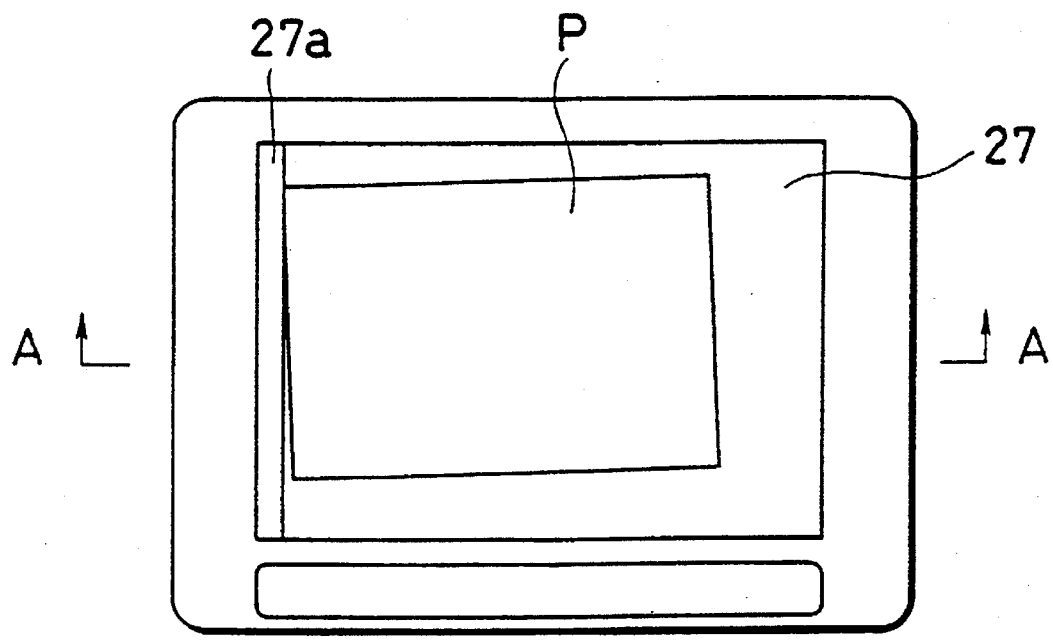
FIG. 29 is a plan view indicating a document platen that is installed in the digital copying machine.
Figure 30A:
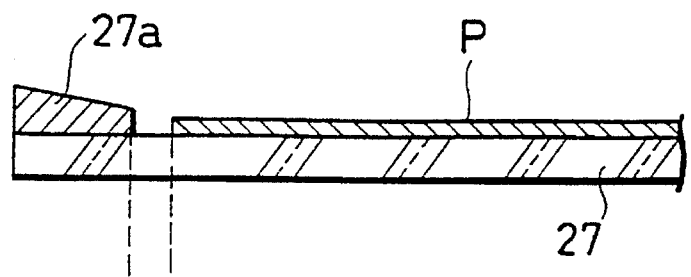
FIG. 30(a) is a sectional view taken along the line A—A of the document platen of FIG. 29.
Figure 30B:
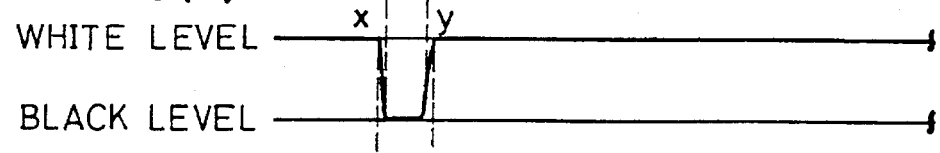
FIG. 30(b) is an explanatory drawing that shows black and white levels that are detected depending on the position of the document shown in FIG. 30(a).
Figure 30C:
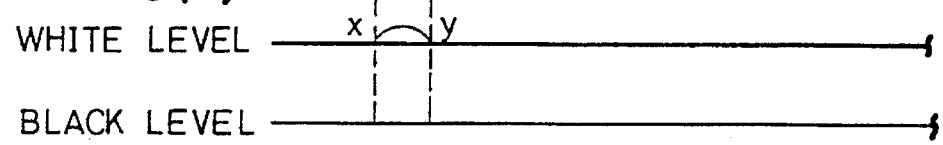
FIG. 30(c) is an explanatory drawing that shows black and white levels after the edge of the document has been erased.

An explanation will be given on a method for discriminating a line caused by the edge of a document P from its image, for example, by reference to a case where the document P is placed along a document guide 27a that is installed on the document platen 27, as illustrated in FIG. 29. Assuming that the document P is set with its edge facing the document guide 27a as illustrated in FIG. 30(a), a portion corresponding to the document guide 27a has a white level, and the next portion corresponding to the edge of the document P has a black level, and then the image area of the document is scanned, as illustrated in FIG. 27(b). Therefore, an area located between a changing point (x) from the first white level to the black level and the next changing point (y) at which the white level is recovered is determined to be an edge of the document, and the edge is erased by replacing the area between x and y with the while level, as illustrated in FIG. 30(c).

Further, as illustrated in FIG. 29, there is a possibility that the document P may be set with a slight offset from the document guide 27a; this causes the edge of the document P to tilt with respect to the main scanning direction, that is, to become unparallel to the main scanning direction. Therefore, the discriminating process for the edge of the document by the use of the level changes is carried out for each dot, line by line in the main scanning direction.

Here, in the above explanation, the explanation has been given on the case where the image area starts with a white level; yet, also in the case where the image area starts with a black level, one portion of the image is erased. Therefore, the above-mentioned compensating process is carried out in the main scanning direction, thereby compensating for the loss of data.

In the case where all the edge of the document starts with a black level, the edge-erasing process is operable by preliminarily determining an area corresponding to predetermined lines from the end of the document data as an edge portion of the document. Here, the above-mentioned lines are determined depending on a design of an optical system in the digital copying machine, the thickness of a copy sheet, or other factors, and they are changeable through a simulation setting.

Furthermore, in the document data stored in the image memory 43, there is also a possibility that upon reading images, the images are inputted with some overlapped portions. For this reason, the digital copying machine in the present embodiment is provided with a function for recognizing the overlapped portions and for compensating for them. In other words, upon conducting the aforementioned feature-extracting operation on document pieces, if, as a result of search conducted on data corresponding to predetermined lines, coincidence of data is found not at the end of the document data, but inside the document data, an area corresponding to lines located outside from the line of the data coincidence is determined as an overlapped portion of the images.

Figure 31:
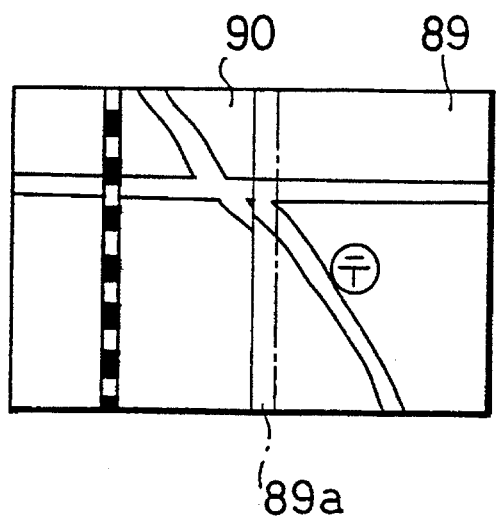
FIG. 31 is an explanatory drawing that shows a case where an overlapped portion appears in the document data stored in the image memory.
Figure 32:
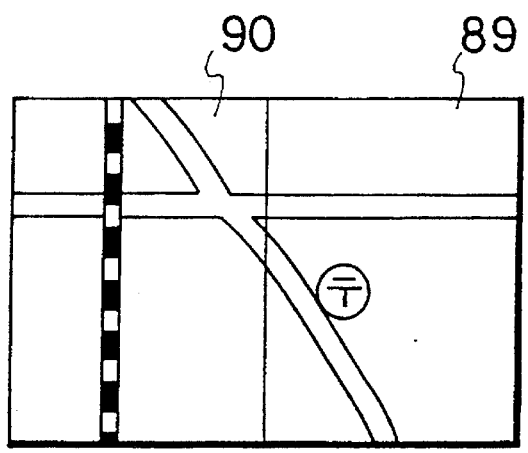

For example, as illustrated in FIG. 31, if there is an overlapped portion between document data 89 and 90, a line in FIG. 31 (indicated by an alternate long and short dashes line) of the document data 89 becomes coincident with the line of the data at the end of the document data 90; therefore, an area 89a located outside the line is determined to be an overlapped portion. Then, this overlapped portion of the images is erased, and as illustrated in FIG. 32, positioning is carried out by shifting one of the document data so that the data corresponding to the line in the document data 89 coincide with the data at the end of the document data 90. Here, due to this compensating process for the overlapped portion, a loss of the image appears at the side opposite to the side having been subject to the compensation in the document data. Therefore, the aforementioned compensating operation is carried out on the loss of data, thereby compensating for the loss of data.

Figure 33:
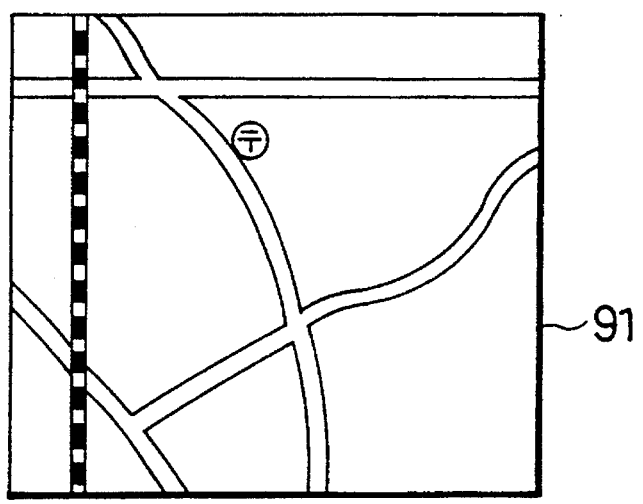
FIG. 33 is an explanatory drawing that shows a copy obtained by the joining operation.

As described above, by suitably performing, on demand, compensating processes for loss of data and overlapped portions of images, erasing process for lines corresponding to the edge of a document, or other processes with respect to document data stored in the image memory 43, a copy 91 with no problems seen at its joined portions can be obtained as shown in FIG. 33. Further, by inserting a sheet of white paper for specifying a change into a new line during image reading, it becomes possible to perform the joining operation quickly and accurately even if complicated images are used, or even if a number of documents are read. Moreover, merely by specifying the size of copy sheets to be used for copying the combined image, a variable magnification operation is automatically conducted, thereby eliminating the need for troublesome calculations.

Referring to FIGS. 1 and 2 as well as FIGS. 34 through 38, the following description will discuss another embodiment of the present invention. Here, for convenience of explanation, those members that have the same functions and that are described in embodiment 1 are indicated by the same reference numerals and the description thereof is omitted. Further, as with the digital copying machine described in Embodiment 1, a digital copying machine of the present embodiment has a structure shown in FIG. 2, and an image processing section, which is installed in the digital copying machine, has a construction as shown in FIG. 1.

Figure 34:
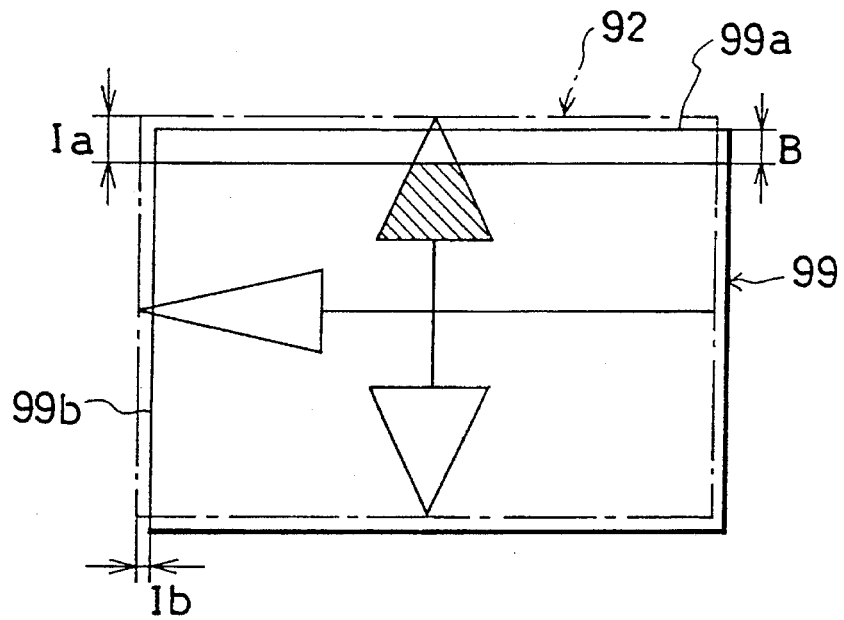
FIG. 34 is an explanatory drawing that shows a void area and an image loss that appear on a copy sheet after copying.

In the above-mentioned digital copying machine, it is arranged that a void area B and image losses Ia and Ib are formed along the side portion 99a and the leading portion 99b of a copy sheet 99 as shown in FIG. 34. These areas are provided in order to improve the picture quality, and their function is to prevent lines and stains located along the edge of a document from being copied on a copy sheet.

As to the side portion 99a on the copy sheet 99, the void area B, which is a space portion free from adhesion of toner on a copy sheet 99, is formed by erasing portions of a latent image located at the side edge of the circumferential surface of the photoreceptor drum 10 by the use of a void lamp (not shown) so as not to make toner contact with a region on the copy sheet 99, with which separation claws (not shown), which separate the copy sheet 99 from the transferring belt 17 (see FIG. 2) after a toner image having been transferred thereonto, come into contact. Further, in some cases, a void area is formed at the leading portion 99b of the copy sheet 99 due to a blank lamp (not shown) that is used for eliminating charge at non-image region depending on its timing of turning-on.

On the other hand, the image losses Ia and Ib, which are formed through the timing of scanning start and the on-timing of a resist roller, represent portions at which the image has not been copied at the edge of the copy sheet 99 due to an offset between the image forming positions of the document 92 and the copy sheet 99. The side image loss Ia includes a portion of the void area B.

Therefore, in the case when one sheet of a document is made by trimming and sticking together copied sheets bearing divided portions of the image of the document, if the image has any loss of image due to the void area B and the image losses Ia and Ib, there arise problems that joined portions of the divided images look unnatural and the combined image becomes shrunk.

In the case of the aforementioned embodiments, since a joining processing of divided document data read by the image processing section is carried out before the formation of the latent image on the photoreceptor drum 10, it is possible to avoid loss of the image due to irradiation by the void lamp, etc. Therefore, in comparison with the conventional case where one sheet of a document is made by trimming and sticking together divided portions of the image, the occurrence of data-loss at the joint portions can be reduced.

However, even in this case, there is a possibility that the loss of data might occur in the document data read by the scanner unit 22 due to offsets of the timing of scanning start, etc. Therefore, it is impossible to completely prevent the problems that joined portions of the divided images look unnatural and the combined image becomes shrunk.

In order to solve the above problems, the digital copying machine of the present embodiment is provided with a function by which even if there is any loss of data in the document data read by the scanner unit 22, the loss of data would be compensated for, and the picture quality is thus improved.

Next, referring to FIGS. 35 through 38, an explanation of the joining processing of images with the compensation for loss of data will be given in detail hereinbelow. Here, as to the sequence of the operations from reading document data by the scanner unit 22 to releasing the processed document data to the laser driver unit 7, the same operations as the aforementioned embodiments are carried out except for the compensation processing on the loss of data.

Figure 35:
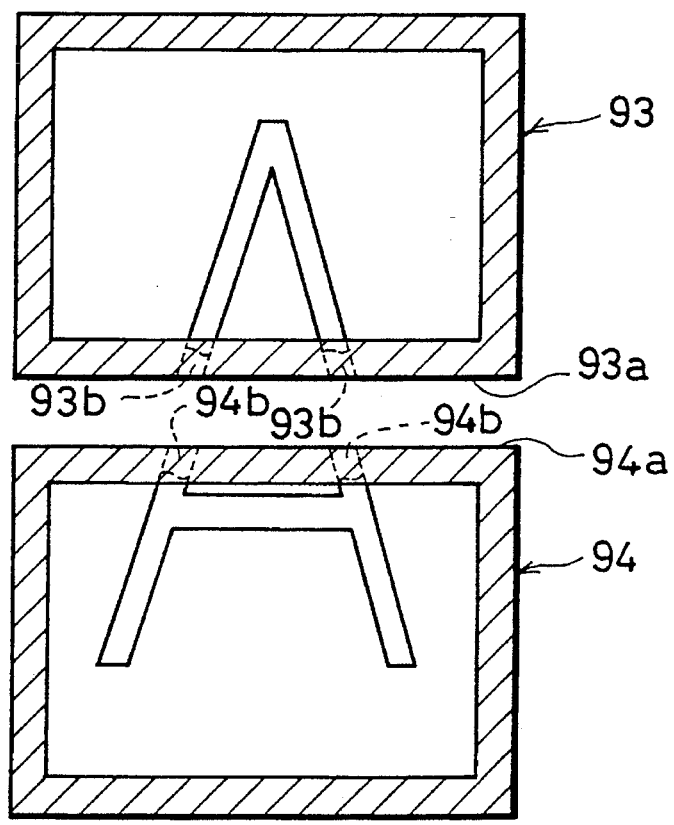
FIG. 35 is an explanatory drawing that shows retrieving areas for image data at joints in the document data.

Suppose that two portions of image data 93 and 94, for example, shown in FIG. 35, are stored in the image memory 43 (see FIG. 1) installed in the image processing section, and that there are data-loss portions 93b and 94b of the image on the sides 93a and 94a that form joining edges of the image data 93 and 94.

As to these two portions of image data 93 and 94, data corresponding to predetermined lines along the edge of each portion of data 93, 94 (indicated by regions having slanting lines) are retrieved so as to check out the presence or absence of image data, and joints of the image are thus recognized. Then, the document data are arranged so that the sides 93a and 94a having the joints of the image are aligned face to face with each other. Here, the predetermined lines that are subject to the retrieving are set to a range that exceeds the data-loss portions of the image.

Figure 36:
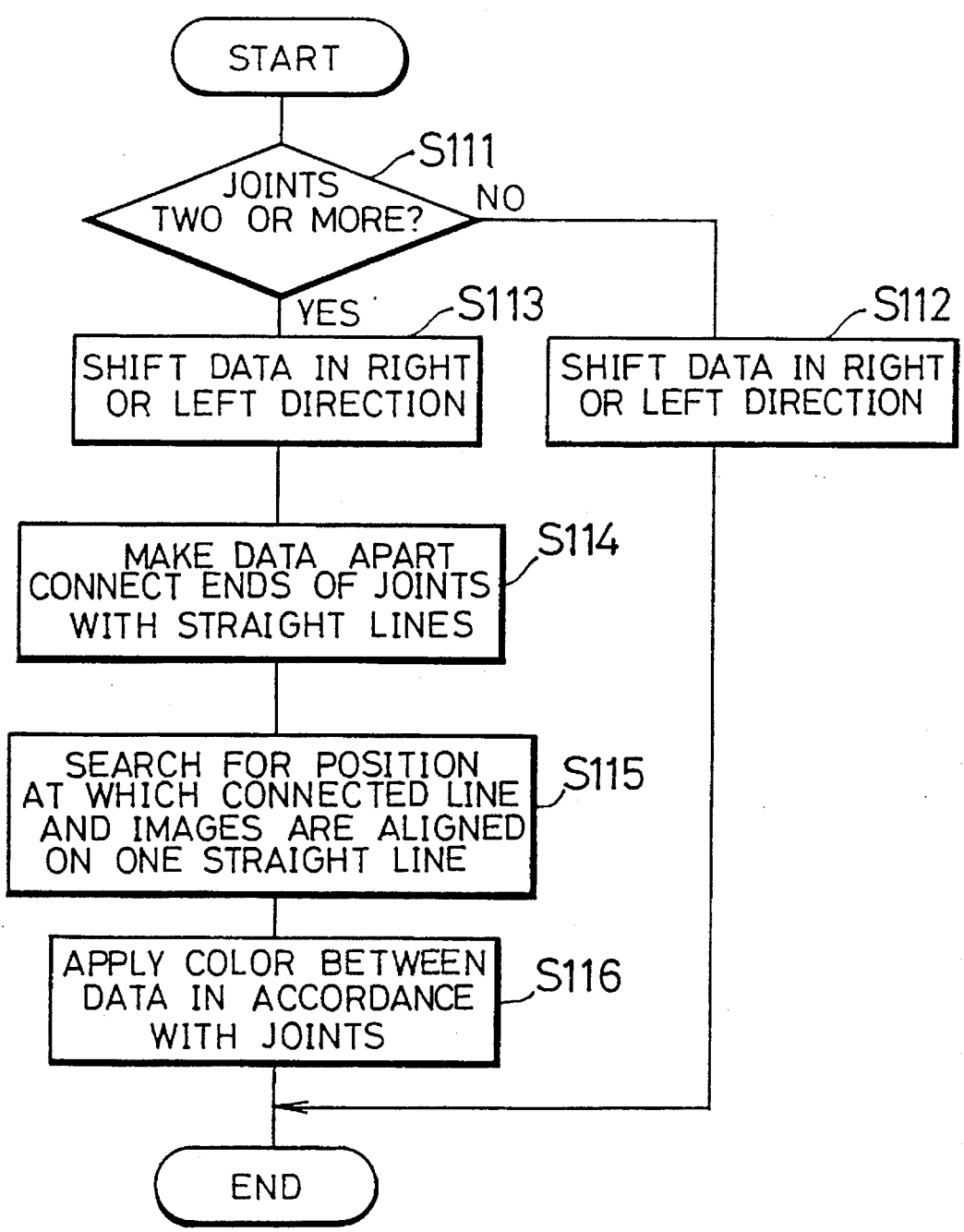
FIG. 36 is a flow chart showing the sequence of processes that are carried out when compensating for the loss of the images at the joints.

Thereafter, as shown by a flow chart in FIG. 36, a detection is made as to how many joints there are along the sides having the image data, and at S111, a judgement is made as to whether or not there are two or more of those joints.

Figure 37A:
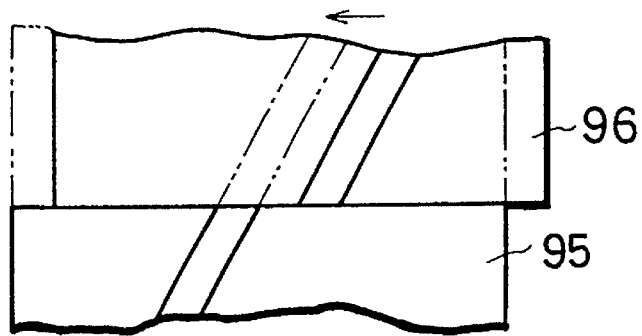
FIG. 37(a) and FIG. 37(b) are explanatory drawings that show a joining operation of images when there is one joint.
Figure 37B:
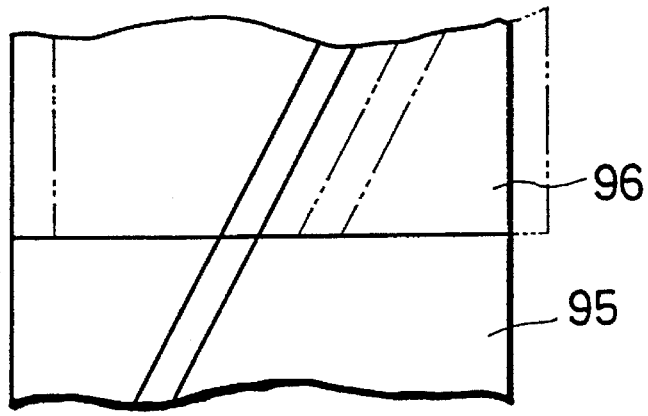

If there is one joint, the judgement is made as "NO" at S111, and a positioning is executed by shifting the data in a right and left direction (S112). In other words, as shown in FIGS. 37(a) and 37(b), with one portion of the document data 95 maintained in a fixed state, the other portion of the document data 96 is shifted in a right and left direction, thereby searching for the best-suited position for the joint.

If there are two or more joints along the sides having the image data, the judgement is made as "YES" at S111, as shown in FIG. 36. Then, a positioning is executed by shifting one portion of the document data in parallel with the joints, that is, in a right and left direction in the drawing, while the other portion of the document data is maintained in a fixed state (S113). Thus, after finding a position where offsets of the image data at the joints become virtually equivalent, the shifting of the document data in the right and left direction is fixed at the position.

The above-mentioned position where the offsets become virtually equivalent is found as follows: distances between predetermined positions of the joints on the image data, for example, distances between the ends of the joints on the image data, are successively detected; the distances between the portions of the document data are compared with each other, for example, in sequential order beginning with the nearest ones; and a search is made so as to find a position where the offsets of the compared distances on the image data between the portions of the document data become equivalent to each other.

Next, with one portion of the document data maintained in a fixed state, the other portion of the document data is shifted in a virtually perpendicular direction to the joints, for example, in a departing direction in the drawing. Thus, the distance between the portions of the document data is widened, and the corresponding edges of the ends of the image data at the joints are connected by a straight line, that is, hypothetical lines are extended from the corresponding edges of the ends along the edges (S114).

Then, a search is made so as to find a position where the connected line and the image are aligned in one straight line, that is, so as to find a position where the hypothetical lines become virtually coincident with each other (S115), and the corresponding color is applied between the both portions of the document data in accordance with the joints. In other words, the compensating operation for the loss of data is completed by applying the corresponding color so as to maintain the consistency of the image data between the hypothetical lines (S116).

Figure 38A:
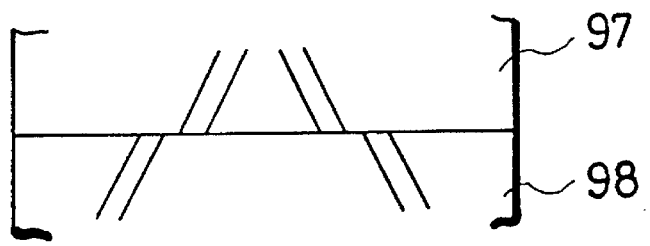
FIGS. 38(a) through 38(d) are explanatory drawings that show a joining operation of images when there are two or more joints.
Figure 38B:
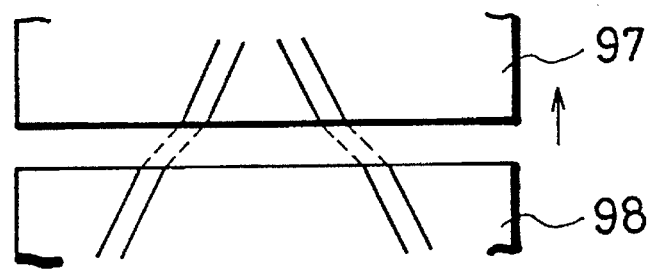

Referring to, for example, FIG. 38(a), a detailed explanation of the above processing is given below. Suppose that the position of the portions of the document data 97 and 98 are determined in its right and left directions by making equivalent the offsets of the positions of the corresponding joints in the portions of the document data 97 and 98. While the distance between the portions of the data is being widened by shifting the portion of the document data 97 away from the portion of the document data 98, the corresponding ends of the joints are connected by straight lines or the like (indicated by broken lines in the drawing), as is illustrated in FIG. 38(b).

Figure 38C:
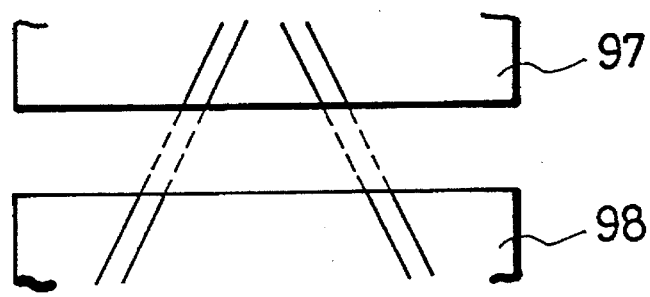

Then, as illustrated in FIG. 38(c), a search is made so as to find a position where the straight lines connecting to the corresponding ends of each joint coincide with the image on the portions of the document data 97 and 98, that is, so as to find a position where the above straight lines and straight lines on the image of the portions of the document data 97 and 98 are aligned in respective straight lines.

Figure 38D:
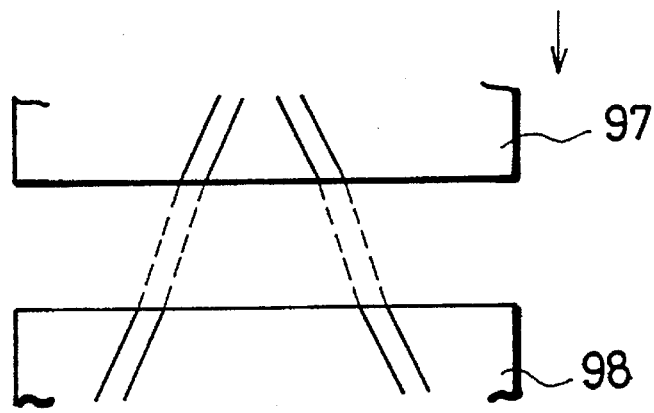

Here, as illustrated in FIG. 38(d), if the portion of the document data 97 is shifted too far away from the portion of the document data 98 to pass by the position at which the coincidence of the straight lines is made, the portion of the document data 97 is shifted closer to the portion of the document data 98, thereby finding the best-suited position.

After completion of the compensating operation for the loss of data, the document data is subject to the variable magnification processing, the density processing, etc. as have been described in Embodiment 1, and is released to the laser driver unit 7 so as to form a combined image on one copy sheet.

As described above, in the present embodiment, even if any loss of data appears in an image upon reading the data of documents, the function for compensating the loss of data is provided therein to solve the problem. A combining operation is carried out by detecting the joints of the documents, and the combined image is formed by executing a variable magnification operation to a desired size of copy sheet; therefore, as with the advantages of the aforementioned embodiments, it is possible to improve the efficiency of work by eliminating extra jobs, and it is also possible to enhance the picture quality by eliminating shrinkage of images and unnatural appearance of the joints.

Figure 39:
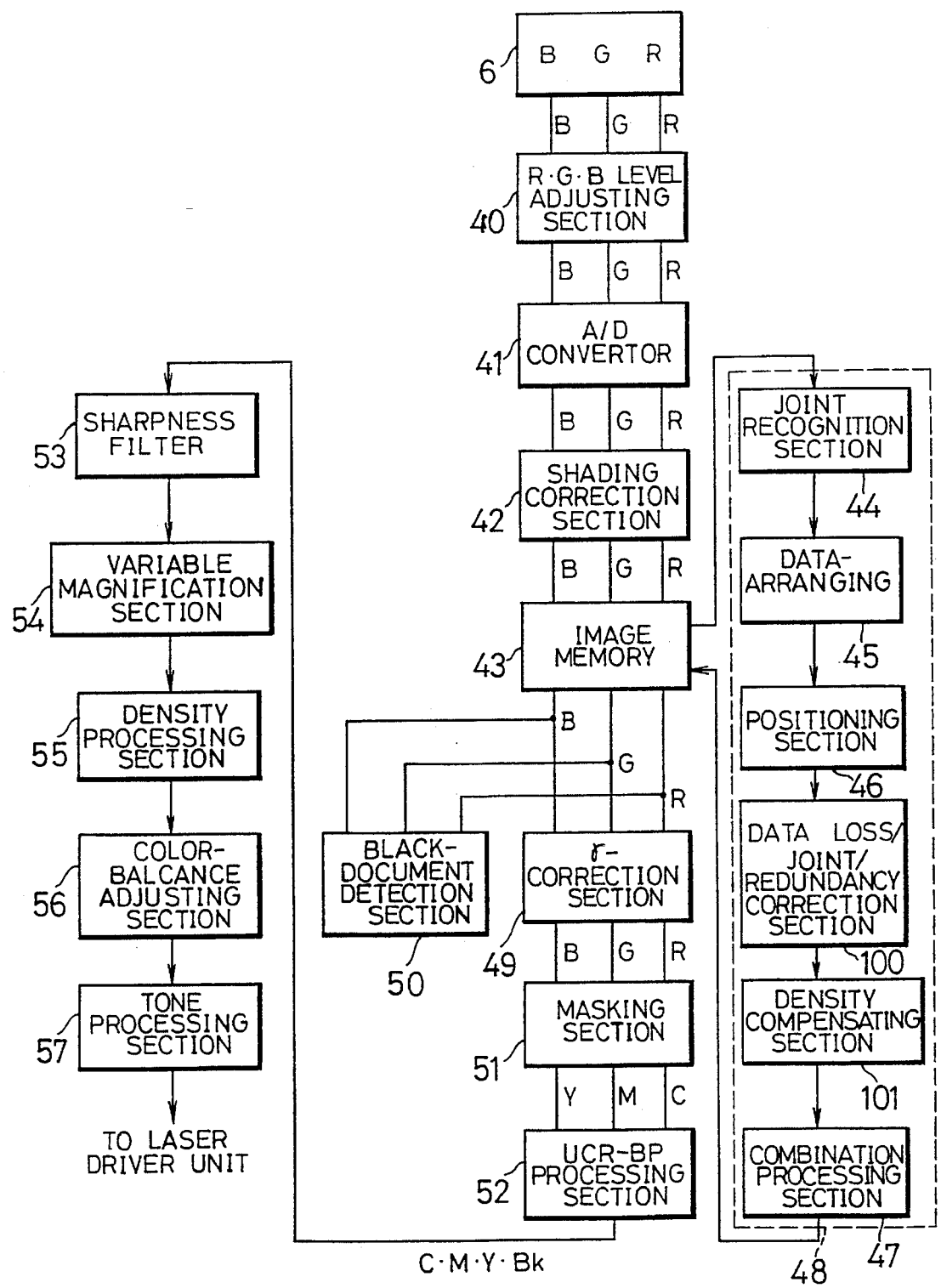
FIG. 39 is a block diagram showing a construction of an image processing device that is installed in a digital copying machine of the present invention.
Figure 40:
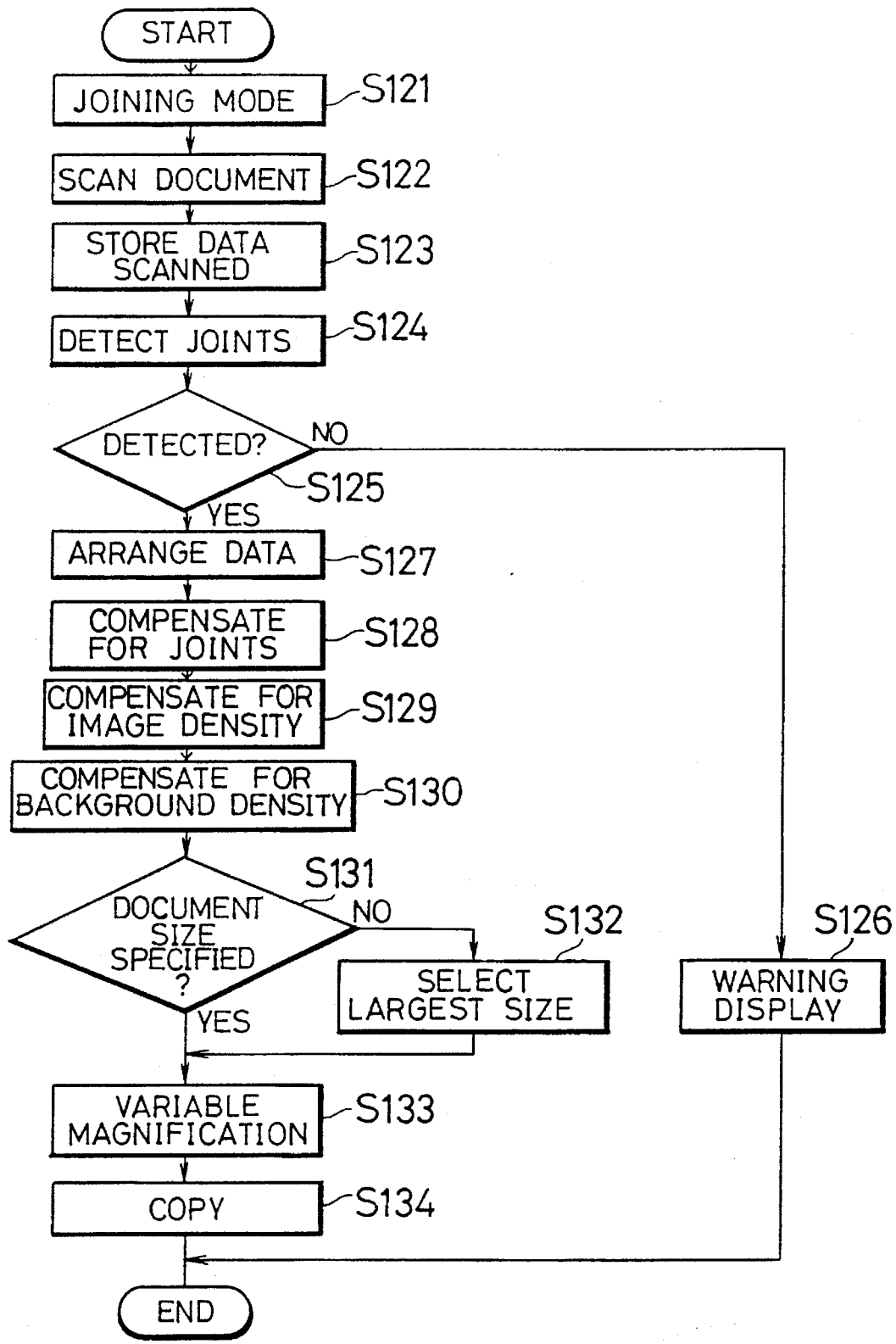
FIG. 40 is a flow chart showing a sequence of processes that are carried out when a compensating operation for densities of images is conducted.

Referring to FIG. 2 as well as FIGS. 39 through 41, the following description will discuss another embodiment of the present invention. Here, for convenience of explanation, those members that have the same functions and that are described in Embodiment 1 as well as Embodiment 2 are indicated by the same reference numerals and the description thereof is omitted. Further, as with the digital copying machine described in Embodiment 1 as well as Embodiment 2, a digital copying machine of the present embodiment has a structure shown in FIG. 2, and an image processing section, which is installed in the digital copying machine, has a construction as shown in FIG. 39.

In the above-mentioned digital copying machine, if a document which is larger than the maximum size of copy sheets available is used for copying operation, the following procedures are required: first, the document is divided into portions, and reduced copying operations are conducted on the respective portions; then, a combined document is made by trimming and sticking together the reduced portions; and the combined document is again copied.

However, the density of each reduced copy varies depending on the density distribution of the document during the reduced copying operations. Consequently, after the reduced copies have been combined together, the single combined document has different densities on its respective portions. This results in unnatural appearance in the joint portions.

Further, in the case when a book having a considerable thickness, such as a bound book composed of, for example, annual issues of a scientific magazine, is opened and placed on the document platen, and when a single document is made by copying some pages of the book, the copied pages tend to be tilted depending on the pages, because the bound portion of the book is separated from the document platen, or due to the distortion of the opened book. Moreover, in the case when a number of documents such as consecutive maps are read out and then combined together, upon reading out the documents forming respective portions, there is a possibility that some documents might be placed on the document platen in a tilted manner, for example, in the wrong orientation of 90° or in the completely opposite orientation of 180°, and might be read out as they are.

In the case where such pages and documents are scanned for copying and the copied portions are then combined together, there arises a problem that their joined portions might not fit well. The joint-portion processing in the positioning section 46 of the aforementioned embodiments has failed to solve the problem.

Therefore, as illustrated in FIG. 39, in addition to the joint-portion processing section 48 shown in FIG. 1, the image processing section of the present embodiment is provided with: a data-loss/joint/redundancy correction section (rotative movement means) 100 to which signals from the positioning section 46 are inputted; and a density compensation section (adjusting means) 101 for receiving signals from the data-loss/joint/redundancy correction section 100 and for releasing signals to the combination-processing section 47.

In the data-loss/joint/redundancy correction section 100, a positioning of two portions of document data is carried out by rotating one portion of the document data around a predetermined position, such as a central position when seen after printing the document data, a center position of the bound portion of a book, or an end of the bound portion, that is, the corner of a joint of the document data.

Further, as with the positioning section 46 of the aforementioned embodiments, the data-loss/joint/redundancy correction section 100 conducts correcting operations on loss of data and redundant portions of the joints.

More specifically, after making a rotative movement as described above, if any loss of data or redundant portion is detected, one portion of the document data is further shifted in the direction parallel or vertical to the joint, or in the main scanning direction or in the sub scanning direction so that the image data on the portions of the document data become virtually consistent. Then, the loss of data at the joint can be compensated for and the redundant portion can be eliminated.

In the density compensation section 101, the density data of the image and the background in the portions of the document data, which are released from the data-loss/joint/redundancy correction section 100, are compared with one another, and the density data are converted so that density variations between the portions of the document data at the joint, when seen after printing, can be reduced to a minimum.

Referring to FIGS. 2 and 39, an explanation will be given on the sequence of the joint processing operations on the document data that are carried out by using the above-mentioned image processing section, in accordance with a flow chart of FIG. 40.

Firstly, the joining mode is selected through an operation panel, not shown, (S121), and when a few pages of divided documents are scanned (S122), data read through the scanner unit 22 are stored in the image memory 43 (S123).

Successively, joints in the respective images of read data of the documents are detected by the joint-recognition section (S124). In other words, the position of data of each document is first recognized, and the edges of data of each document is then recognized. Thereafter, each edge is examined so as to identify which edge has data by retrieving local data corresponding to predetermined lines from the edge of data of each document. As to the presence or absence of image data, judgement is made based on whether or not the value of data (the value of density in each color) is zero.

Then, at S125, a judgement is made as to the presence or absence of detection of joints. If no joint is detected, that is, if there is no edge portion having image data in the data of a document in question, for example, if no joint is detected after making a search by rotating the document data from 0° to 180° clockwise as well as counterclockwise, a warning display indicating "NO" is given to inform that no joining process is operable (S126), thereby stopping the operation.

In contrast, if there is a detection of joints at S125, the judgement is made as "YES", and the data of the documents are arranged by the data-arranging section 45 so that corresponding edge portions having image data are aligned face to face with each other (S127).

Next, a positioning is carried out in the positioning section 46 as follows: A position where the image data in the portions of the document data become consistent within a predetermined range is found while shifting the second document data, that is, the data of one document, in the main scanning direction or in the sub scanning direction as well as in the direction parallel to the joint or in the direction vertical to the joint, with the first document data, that is, the data of the other document maintained in a fixed state. In other words, the best-suited position where the joints are connected to each other most smoothly is found by detecting a position where the image data in the portions of the document data are consistently connected within a predetermined range (S128).

Successively, a positioning is carried out in the data-loss/joint/redundancy correction section 100 as follows: A position where the image data in the portions of the document data become consistent within a predetermined range is found while rotating the second document data clockwise or counterclockwise around a predetermined position, with the first document data maintained in a fixed state. In other words, the best-suited position where the joints are connected to each other most smoothly is found by detecting a position where the image data in the portions of the document data are consistently connected within a predetermined range (S128).

Additionally, at S128, if no consistency is detected within the predetermined range, the rotative movement is made so that the offsets of the distances on the image data between the portions of the document data become equivalent to each other. Then, as with S113 through S116 in the aforementioned embodiment, the portions of the document data are shifted, and correcting and compensating operations for loss of data as well as eliminating operation for redundant portions are conducted at their joints.

Thereafter, the density of the second document data is converted by the density compensation section 101 so that the density of the image of the second document data becomes coincident with the density of the image that is located on a side having image data of the first document data (S129). Further, the density of the background of the second document data is also converted by the density compensation section 101 in accordance with the density of the background of the first document data so that besides the images, both of the densities of the backgrounds become coincident to each other (S130). Then, the portions of the document data are combined to form combined document data to be copied on a single sheet.

Next, at S131, a judgement is made as to whether or not the size of copy sheets for use in printing the combined document data is specified. If the size of the copy sheets is not specified, the judgement is made as "NO", thereby selecting copy sheets having the largest size among the copy sheets that are set in the digital copying machine (S132), and a variable magnification operation, that is, enlargement, reduction, etc., is conducted on the combined document data in accordance with copy sheets having the largest size (S133).

In contrast, if the size of the copy sheets is specified, the judgement is made as "YES" at S131, and a variable magnification operation is carried out in accordance with the size of copy sheets that has been specified (S133). Further, according to the longitudinal feeding or the lateral feeding of the copy sheets, conversion of the coordinates is executed on the combined document data that have been subjected to the variable magnification operation, if necessary, and the subsequent data are released to the laser driver unit 7, thereby carrying out copying operations of the processed image on copy sheets (S134).

Figure 41A:
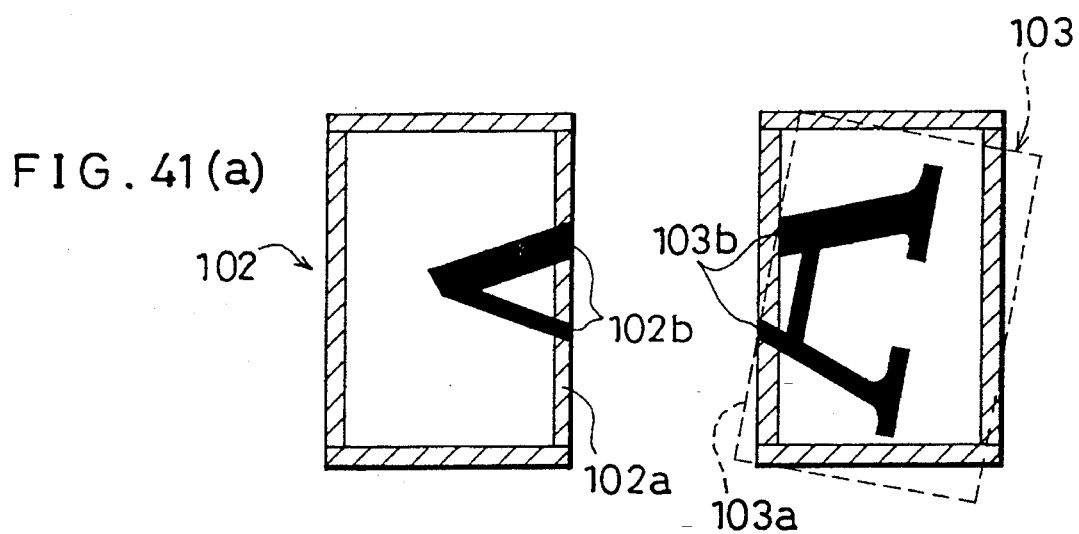
FIG. 41(a), FIG. 41(b) and FIG. 41(c) are explanatory drawings that show a joining operation of images at respective joints.

Referring to FIG. 41, an explanation of the above processing is given in detail hereinbelow. In the case when two portions of document data 102 and 103 are respectively stored in the image memory 43, as is shown-in FIG. 41(a), data corresponding to predetermined lines from the edge of of each portion of document data 102, 103, which is representative of a side when printed, are retrieved so as to detect the presence or absence of image data, and sides 102a and 103a having image data 102b and 103b are thus detected.

If the sides 102a and 103a having the image data 102b and 103b of the document data are not adjacent to each other, the document data 102 and 103 are arranged so that the sides 102a and 103a having the image data 102b and 103b are aligned face to face with each other. In this case, for example, the document data 103 is successively rotated from 0° to 180° clockwise as well as counterclockwise with a predetermined interval. Then, concerning sides that are brought adjacent to each other when rotated, detection is made as to the presence or absence of consistent sides 102a and 103a as well as consistent image data 102b and 103b, and at the position where those consistencies are seen, the document data 103 are arranged.

Figure 41B:
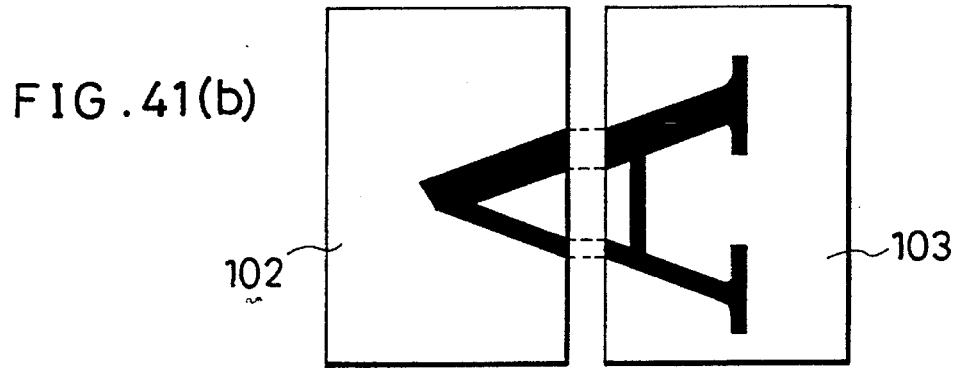

Then, as illustrated in FIG. 41(b), with one of the portions of the document data 102 maintained in a fixed state, the best-suited position of the image data where the image data 102b and 103b are suitably joined together is found by checking the consistency of the data in a predetermined range while rotating the other portion of the document data 103 around a predetermined position clockwise as well as counterclockwise little by little. Thus, the portions of the image are combined together to form document data to be copied on one sheet.

Figure 41C:
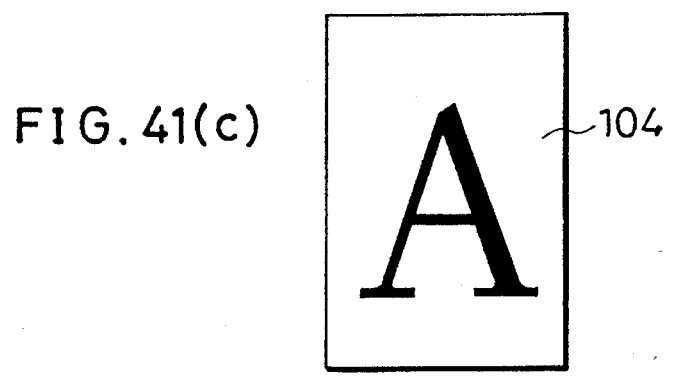

If no consistencies are detected, correcting and compensating operations for loss of data as well as eliminating operation for redundant portions are conducted, as described earlier, and the image data 102b and 103b are combined to form combined document data to be copied on one sheet. Thereafter, the combined document data are subject to a variable magnification processing in accordance with the size of copy sheets to be used, and conversion of the coordinates is executed, if necessary, thereby producing a reduced copied image 104, as shown in FIG. 41(c).

As described above, in the digital copying machine of the present embodiment, density adjustments can be conducted so that the densities of image and background between respective document data to be joined are made coincident to each other. Thus, variations of density between a joint can be reduced to a minimum, thereby making it possible to ensure high-quality in the subsequent combined images. Additionally, the above-mentioned density adjusting process can he applied to the aforementioned embodiments.

Furthermore, the above-mentioned arrangement makes it possible to compensate for inconsistency of image that is caused by tilt of an image due to separation of a document surface from the document platen, which often occurs upon copying a thick book, or other reasons, and that is also caused by wrong orientation of a placed document. Therefore, it is possible to reduce distortion of image that occurs between joined document data; this leads to reduction of distortion of copied image that are joined, thereby ensuring copies with better sharpness. Additionally, the above-mentioned positioning process for positioning document data while rotating the document data as described above, can be applied to the aforementioned embodiments.

Referring to FIG. 2 as well as FIGS. 42 through 50, the following description will discuss another embodiment of the present invention. Here, for convenience of explanation, those members that have the same functions and that are described in the aforementioned embodiments are indicated by the same reference numerals and the description thereof is omitted.

Figure 42:
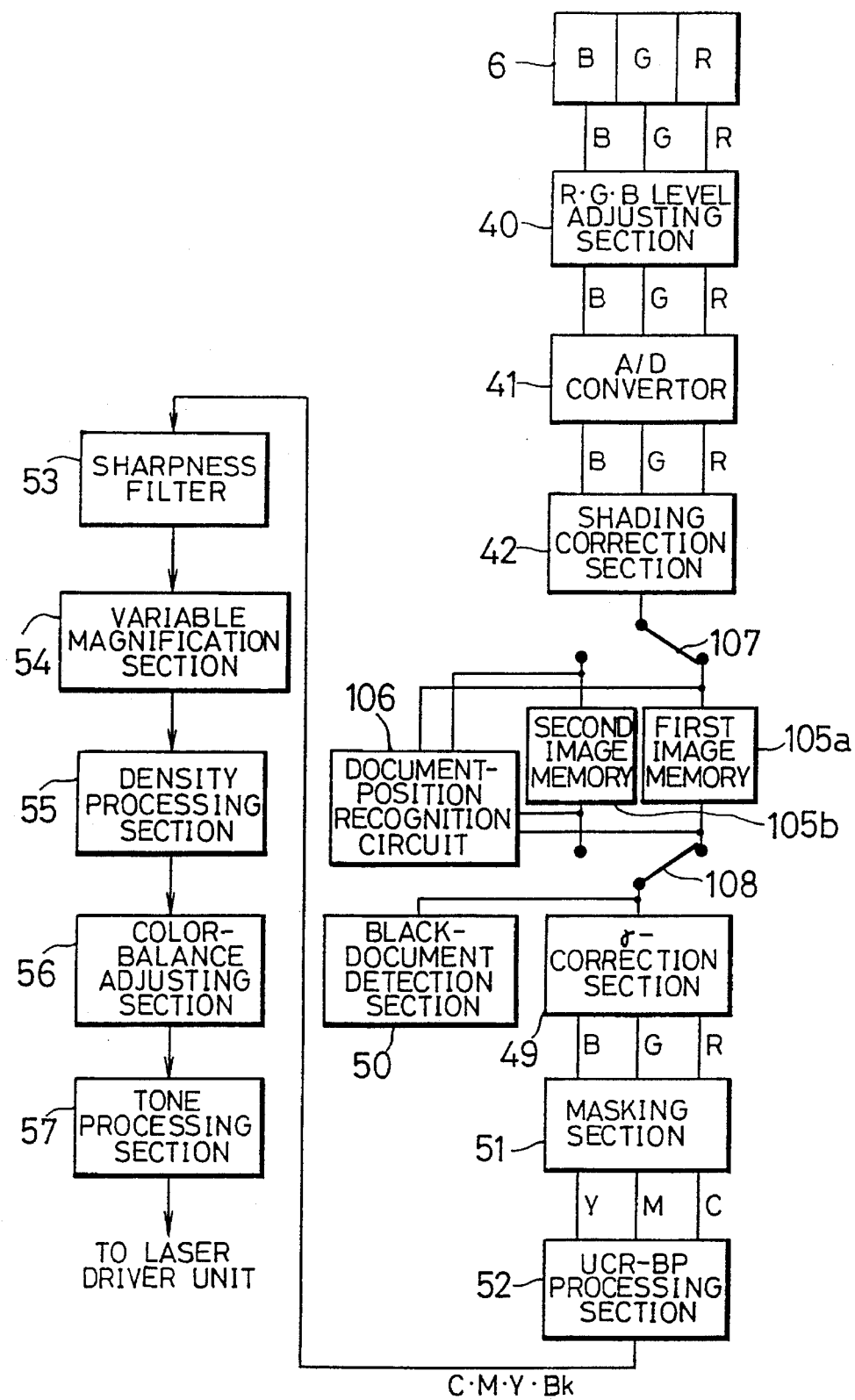
FIG. 42 is a block diagram showing a construction of an image processing system that is installed in a digital copying machine of the present invention.
Figure 43:
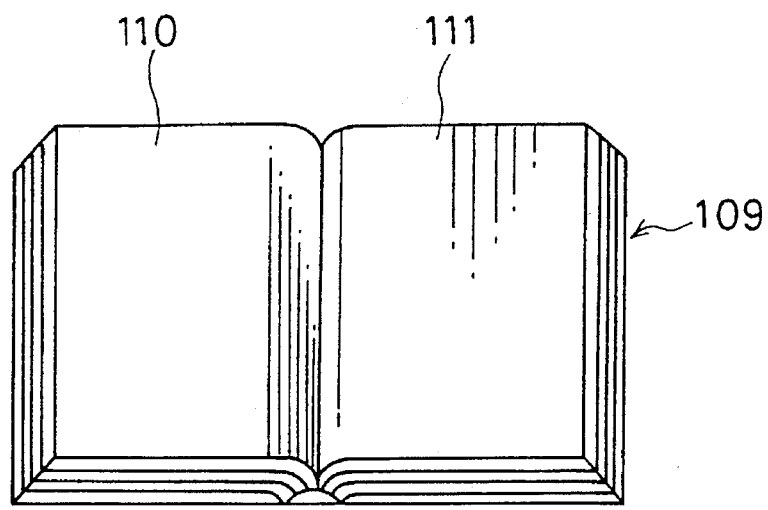
FIG. 43(a) is a perspective view of a book of maps that is used as a document in a joining operation by the use of the image processing system of FIG. 42.
FIGS. 43(b) and 43(c) are explanatory drawings that show a state of the image memory wherein document data are stored from the book of maps shown in FIG. 43(a).
Figure 43:
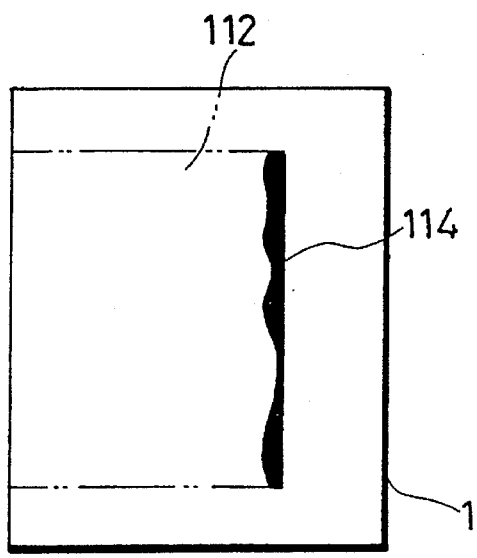
Figure 43:
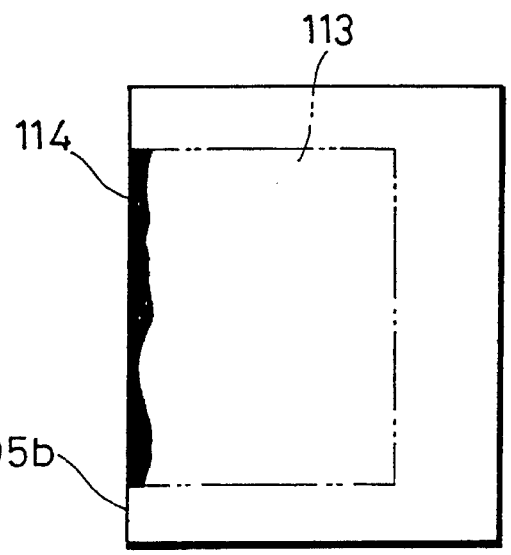
Figure 44:
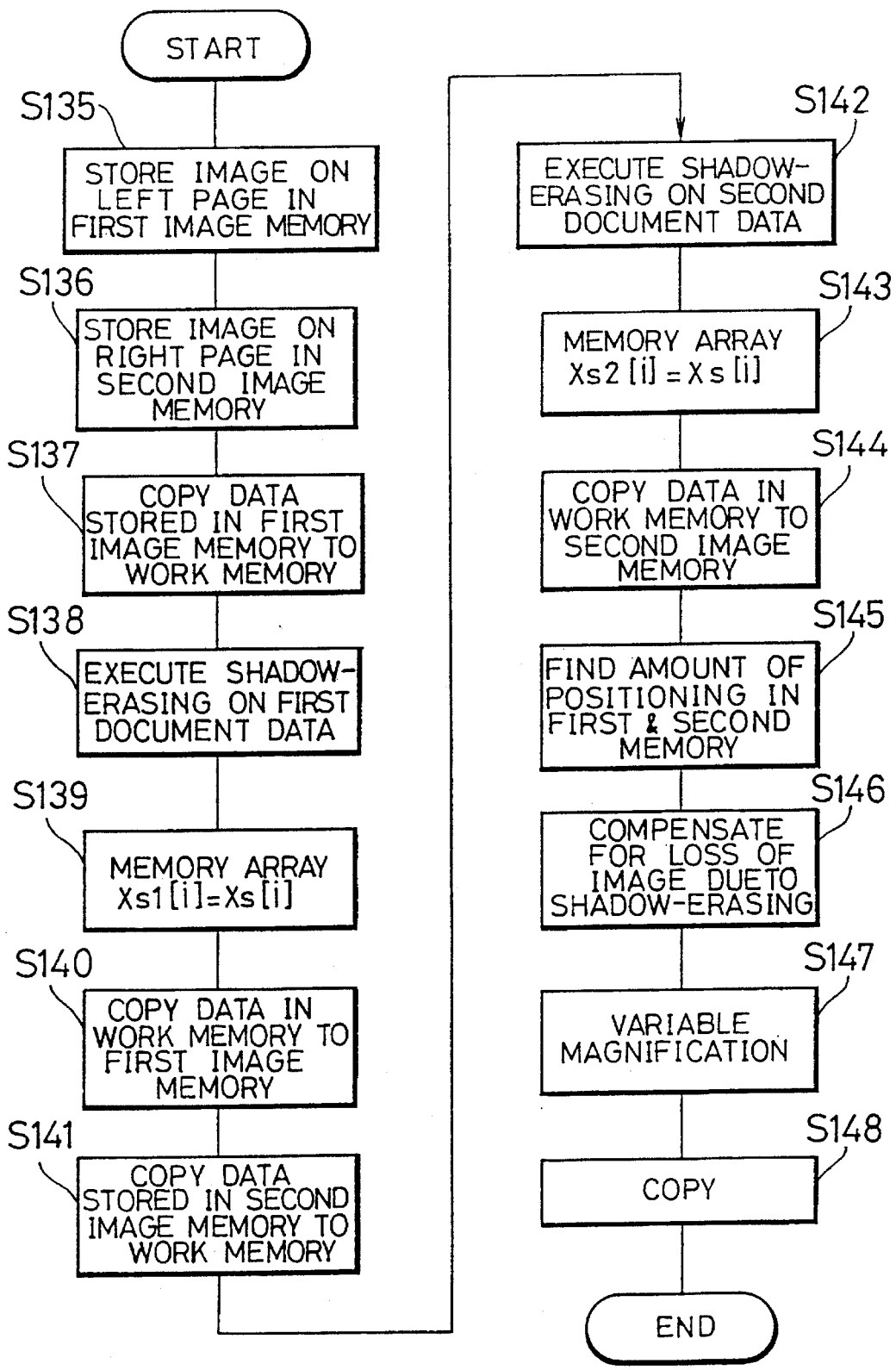
FIG. 44 is a flow chart showing a sequence of processes that are carried out during a joining operation.

As with the digital copying machine described in the aforementioned embodiments, a digital copying machine of the present embodiment, as one example of image forming apparatuses, has a structure shown in FIG. 2. Further, the digital copying machine is provided with an image processing section, which has a construction as shown in FIG. 42. The image processing section is provided with the first and second image memories (storage means) 105a and 105b, and different document data read by the CCD sensor 6 are respectively stored in the first and second image memories 105a and 105b through a switch 107. Here, those image memories are not limited to the above construction, and any construction may be employed as long as it is capable of storing two or more portions of document data.

The first and second image memories 105a and 105b are connected to a document-position recognition circuit (joint-portion processing means) 106 which conducts predetermined processing such as a shadow erasing operation and a positioning positioning, which will be described later, on the document data stored. The document data, which have been subjected to the predetermined processing in the document-position recognition circuit 106, are successively released from the first and second image memories 105a and 105b to a γ-correction section 49 through the switch 108. Here, the other constructions except for the above-mentioned construction are the same as those of the image processing section that is provided in the digital copying machine of the aforementioned embodiments.

When a copy is made from a book or the like having a considerable thickness, shadows are sometimes made because the bound portion of the book tends to separate from the document platen 27 (see FIG. 2) due to its thickness. The shadows form black portions in the copied image, thereby reducing the resolution of the image. Further, the occurrence of those shadow portions gives an adverse effect on the joining processing of a plurality of documents as described in the aforementioned embodiments.

Conventionally, in order to erase shadow portions that are caused by the separation of a document from the document platen 27 as described above, coping machines which have a "shadow-erasing" function for erasing one portion of a document image in a uniform manner have been suggested. However, such a shadow-erasing processing causes other problems that shadow portions would not be completely erased and images that are not shadow portions might be erased; therefore, it is difficult to execute accurate joining processing.

Therefore, the digital copying machine of the present embodiment is provided with a function for accurately conducting the above-mentioned shadow-erasing processing as well as for compensating loss of data that is caused by the shadow-erasing processing.

There are two methods for storing images carried on two opened pages of a book or the like in the image memories 105a and 105b: one is to store the document data in the different memories for the respective pages by scanning the pages of the document one by one; and the other is to read the images of the two opened pages through one scanning, and after scanning, the resulting document data are divided into two portions on the image memory basis in accordance with detection results of the document size, etc. In this embodiment, assuming that the former method is used, an explanation will be given by exemplifying a case where two opened pages of a map 109 in the form of a book of B5-size as is shown in FIG. 43(a), by reference to the flow chart of FIG. 44.

When a copying operation is carried out-with the joining mode selected, a document image on a left page 110 is read out, and stored in the first image memory 105a (S131). Successively, a document image on a right page 111 is read out, and stored in the second image memory 105b (S136). Thus, by reading out the left and right pages 110 and 111 of the opened pages of the map 109 through the individual scanning, the image on the left page 110 is stored in the first image memory 105a as the first document data 112, as shown in FIG. 43(b), while the image of the right page 111 is stored in the second image memory 105b as the second document image 113 as shown in FIG. 43(c).

In this case, along areas of image ends corresponding to the bound portion of the map 109 in the respective document data 112 and 113, shadows 114 are formed respectively due to the thickness of the map. Next, before carrying out erasing operations of the shadows 114, the document data 112 and 113 are temporarily stored in a work memory so that the shadow-erasing operation to the first image memory 105a and the shadow-erasing operation to the second image memory 105b are executed in a common manner. Additionally, the work memory is included in the aforementioned document-position recognition circuit 106 (see FIG. 42).

Figure 45:
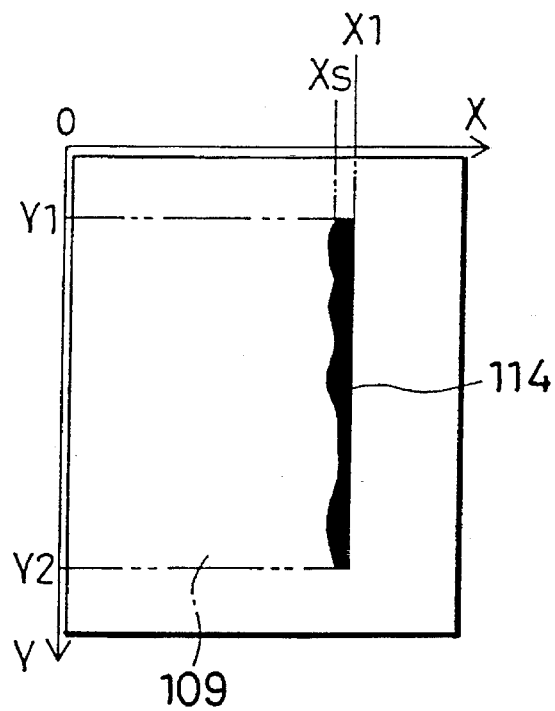
FIG. 45 is an explanatory drawing that shows setting of coordinates on the image memory.

When the first document data 112 stored in the first image memory 105a are copied to the work memory (S137), the shadow-erasing operation is executed on the first document data (S138). Here, if the coordinates on the image memories 105a and 105b are set as shown in FIG. 45, an effective image area (an area corresponding to the size of one page) on the first image memory 105a is indicated by 0 to X1 in the X-coordinate and by Y1 to Y2 in the Y-coordinate. Moreover, the X-coordinate of an image end adjacent to the shadow 114 is indicated by Xs. When the shadow-erasing operation is conducted, the coordinate Xs is stored in the memory array of Xs1 (S139). After completion of the shadow-erasing operation, the first document data 112 are copied from the work memory to the first image memory 105a (S140).

Next, the second document data 113 stored in the second image memory 105b are copied to the work memory in the same arrangement as the first document data 112 (S141), and the shadow-erasing operation is executed on the second document data 113 (S142). Moreover, the X-coordinate, Xs, of an image end adjacent to the shadow 114 in the second document data 113 is stored in the memory array of Xs2 (S143). After completion of the shadow-erasing operation, the second document data 113 are copied from the work memory to the second image memory 105b (S144). Here, the X-coordinates indicating the image ends stored in the memory arrays Xs1 and Xs2 are used upon conducting a positioning operation and a compensating operation for a loss of image due to the shadow-erasing operation, which will be discussed later.

Figure 46A:
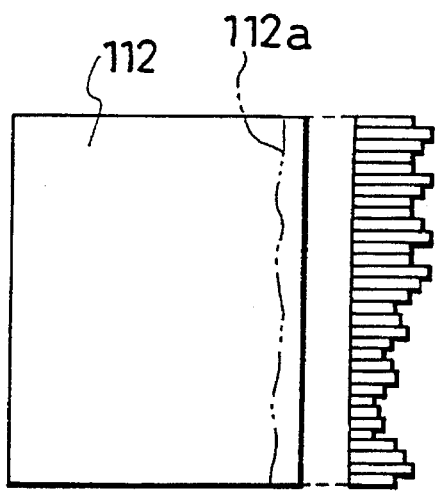
FIGS. 46(a) and 46(b) are explanatory drawings that show density distributions at image ends of the document data.
Figure 46B:
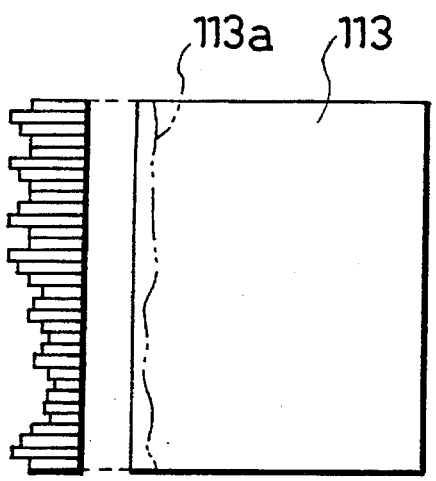

After completion of the shadow-erasing operations, density distributions are found on the connecting portions 112a and 113a of the first and second document data 112 and 113 as shown in FIGS. 46(a) and 46(b), and correlation coefficients, which will be discussed later, are calculated, thereby providing the amounts of offset between the respective portions, that is, the amounts of positioning (S145). Successively, as to the portion from which the shadows 114 have been erased, the compensating operation is carried out because the document image has also been erased from the portion (S146). In this operation, the colors and densities of the corresponding portions between the first and second document data 112 and 113 are detected so that both of the data 112 and 113 are joined to each other smoothly.

Thereafter, the data thus joined to each other are subject to the variable magnification operation in accordance with the size of copy sheets specified (S147), and the data stored in the first and second image memories 105a and 105b are successively sent to the laser driver unit 7 with reference to the positioning amounts, thereby executing a copying operation as was described in the aforementioned embodiments (S148).

Figure 47:
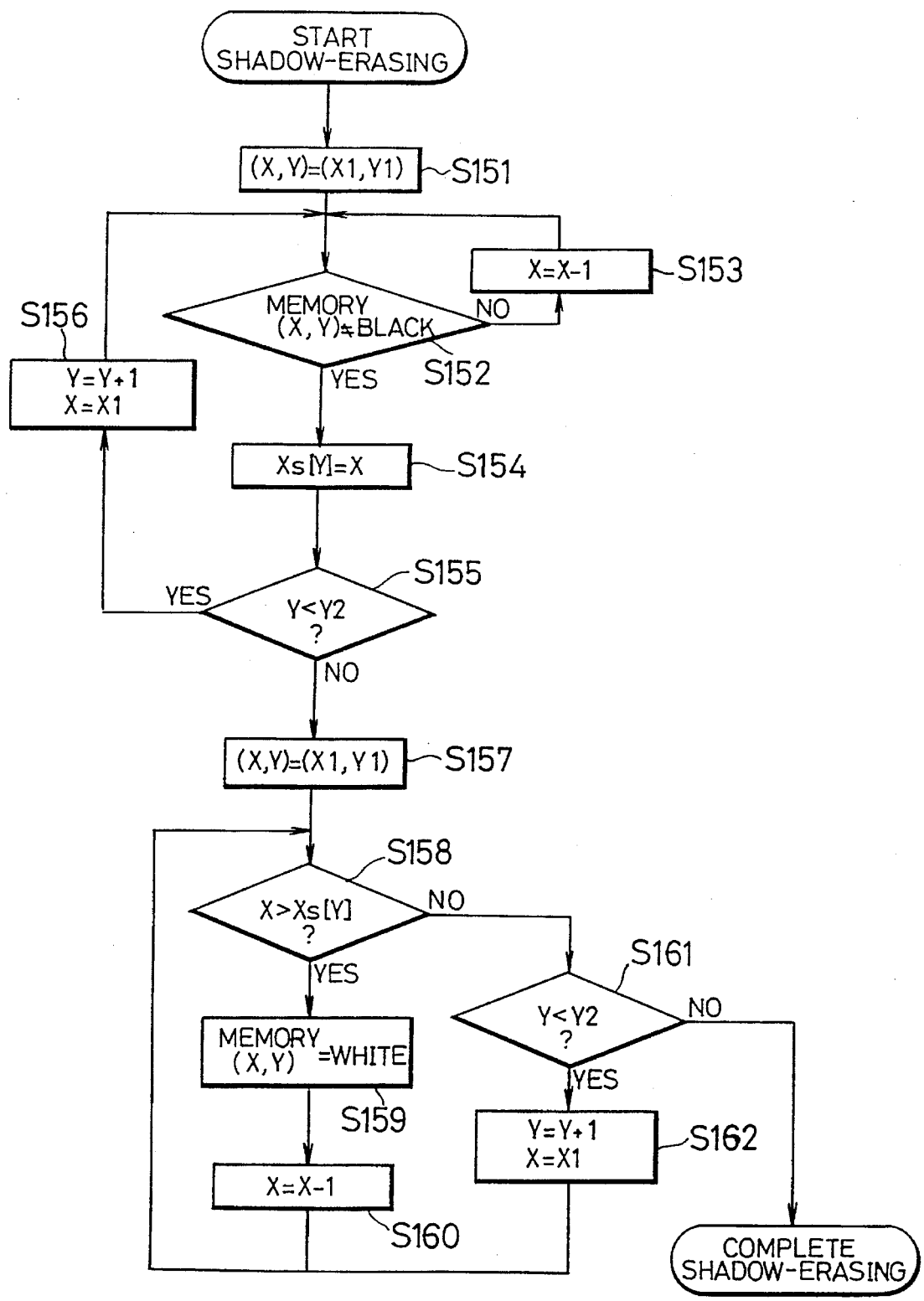
FIG. 47 is a flow chart showing the sequence of processes that are carried out during a shadow-erasing operation for the document data.

Next, referring to a flow chart in FIG. 47, an explanation of the shadow-erasing operation will be given in detail.

Firstly, ranges of shadow are detected within the effective image ranges of the image memories 105a and 105b. For example, in the case of the image memory 105a, assuming that the coordinates from which the detection is initiated correspond to the coordinates (X1, Y1) of the end of the effective range of shadow (S151), a judgement is made as to whether or not these coordinates fall on a black picture element (S152). If it is determined that the coordinates fall on a black picture element, the X-coordinate is shifted to X−1 by one line (S153), and the step S152 is repeated. At the time when a non-black picture element is found at S152, it is determined that the range of shadow has been finished at line Y1, thereby storing the subsequent coordinate Xs [Y] in the memory array (S154). Thus, the position at which the shadow has been finished at Y1 of the Y-coordinate is stored with respect to the X-coordinate.

Thereafter, a judgement is made as to whether the Y-coordinate has reached Y2 (S155), and if it has not reached Y2, the Y-coordinate is shifted to Y+1 by one line (S156), the detection of non-black picture element is again carried out by scanning the image successively in the X-direction from X1 (S152 and S153), thereby storing in the memory array the subsequent X-coordinate at which the shadow has been finished at line Y+1 (S154). The above process is repeated until the Y-coordinate has reached Y2, that is, until it has been determined that Y Y2 is negative. Thus, the range of shadow is successively detected from Y1 to Y2 line by line with respect to the Y-coordinate.

Additionally, the coordinate Xs [Y] indicating the detection of non-black picture element is stored in the memory array of Xs1 when the shadow-erasing operation is carried out with respect to the first document data 112, while it is stored in the memory array of Xs2 when the shadow-erasing operation is carried out with respect to the second document data 113.

Next, the shadow-erasing is executed by replacing the picture elements located within the range of shadow that has been detected as such with white picture elements. In other words, beginning from the end (X1, Y1) of the effective image range (S157), the corresponding coordinate is replaced with a white picture element as long as X>Xs [Y] is positive at S158, that is, until the corresponding X-coordinate has reached Xs [Y] (S159) while repeating the process of shifting the X-coordinate to X−1 by one line (S160). With this process, the picture elements that have been determined as shadow are replaced with while picture elements in relation to line Y1, thereby permitting the shadow to be erased.

When the X-coordinate has reached Xs [Y], that is, upon having determined that X>Xs [Y] is negative at S158, the process wherein the corresponding picture element determined as shadow is successively replaced with a white picture element is repeated line by line with respect to the Y-coordinate (S158–S160). The process is executed while repeating the process of shifting the Y-coordinate to Y+1 by one line (S162) as long as Y<Y2 is positive at S161, that is, until the corresponding Y-coordinate has reached Y2 (S162). Then, when the replacement to the white picture element is completed at Y2 of the Y-coordinate, that is, upon having determined that Y<Y2 is negative at S161, the replacing process to the white picture element that has started from the coordinates (X1, Y1) is completed, thereby finishing the shadow-erasing operation.

Figure 48:
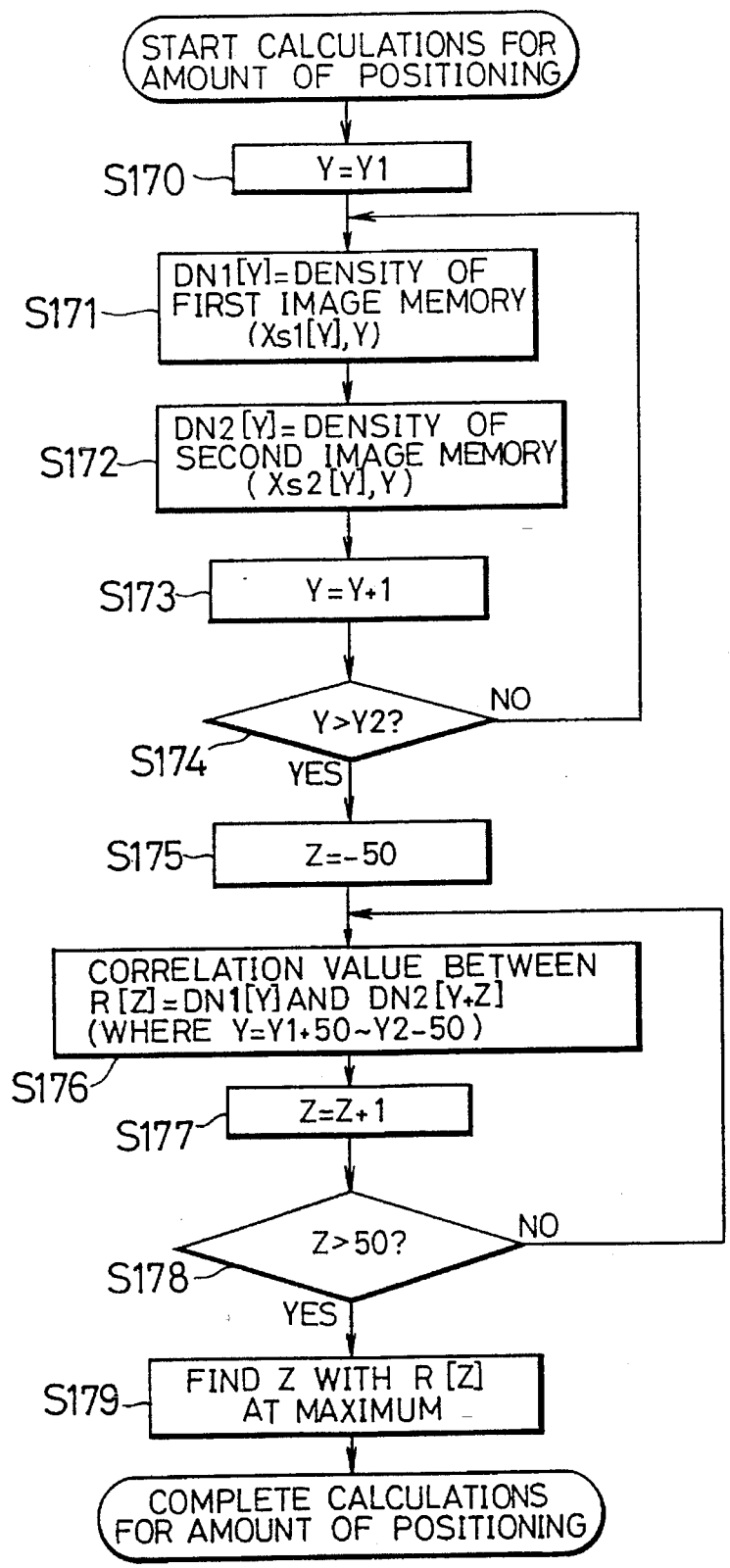
FIG. 48 is a flow chart showing the sequence of processes that are carried out when the amount of positioning is set so as to conduct the joining operation.

Next, referring to the flow chart of FIG. 48, an explanation of the procedure for finding the amounts of positioning of the first and second document data 112 and 113 stored in the first and second image memories 105a and 105b will be given hereinbelow. Here, in this explanation, in order to distinguish the coordinate Xs [Y] that has been stored in the memory array during the shadow-erasing operation depending on the first image memory 105a and the second image memory 105b, the Xs [Y] of the first image memory 105a is indicated by Xs1 [Y], and the Xs [Y] of the second image memory 105b is indicated by Xs2 [Y].

The Y-coordinate is first set to Y1 (S170), and while referring to the coordinate Xs1 [Y] of the image end that have been stored in the memory array of the first image memory 105a, the density of the coordinates of an image end that have not been subject to the shadow-erasing operation is stored in DN1 [Y] (S171). Next, while referring to the coordinate Xs2 [Y] of the image end that have been stored in the memory array of the second image memory 105b, the density of the coordinates of an image end that have not been subject to the shadow-erasing operation is stored in DN2 [Y] (S172). Next, the steps S171 through S173 are repeated by shifting the Y-coordinate to Y+1 line by line (S173) until the Y-coordinate exceeds Y2, that is, until it has been determined that Y>Y2 is positive at 64. Thus, density distributions in the Y-direction of the image ends that have not been subject to the shadow-erasing operation are formed in DN1 and DN2 respectively in the document data 112 and 113 stored in the first and second image memories 105a and 105b.

When it is determined that Y>Y2 is positive at S174, the amount of positioning Z is first set to −50 (S175), and the correlation coefficient of DN1 [Y] and DN2 [Y+Z] is calculated, and stored in R [Z] (S176). Successively, while shifting is made line by line using Z =Z+1 (S177), the steps S176 and S177 are repeated until Z reaches 50, that is, until it has been determined that Z> 50 is positive at S178. If it has been determined that Z>50 is positive at S178, the value of Z that is the maximum among values of R [Z] obtained within the range from Z=−50 to 50 is found (S179), thereby completing the calculations of the amounts of positioning.

Figure 49:
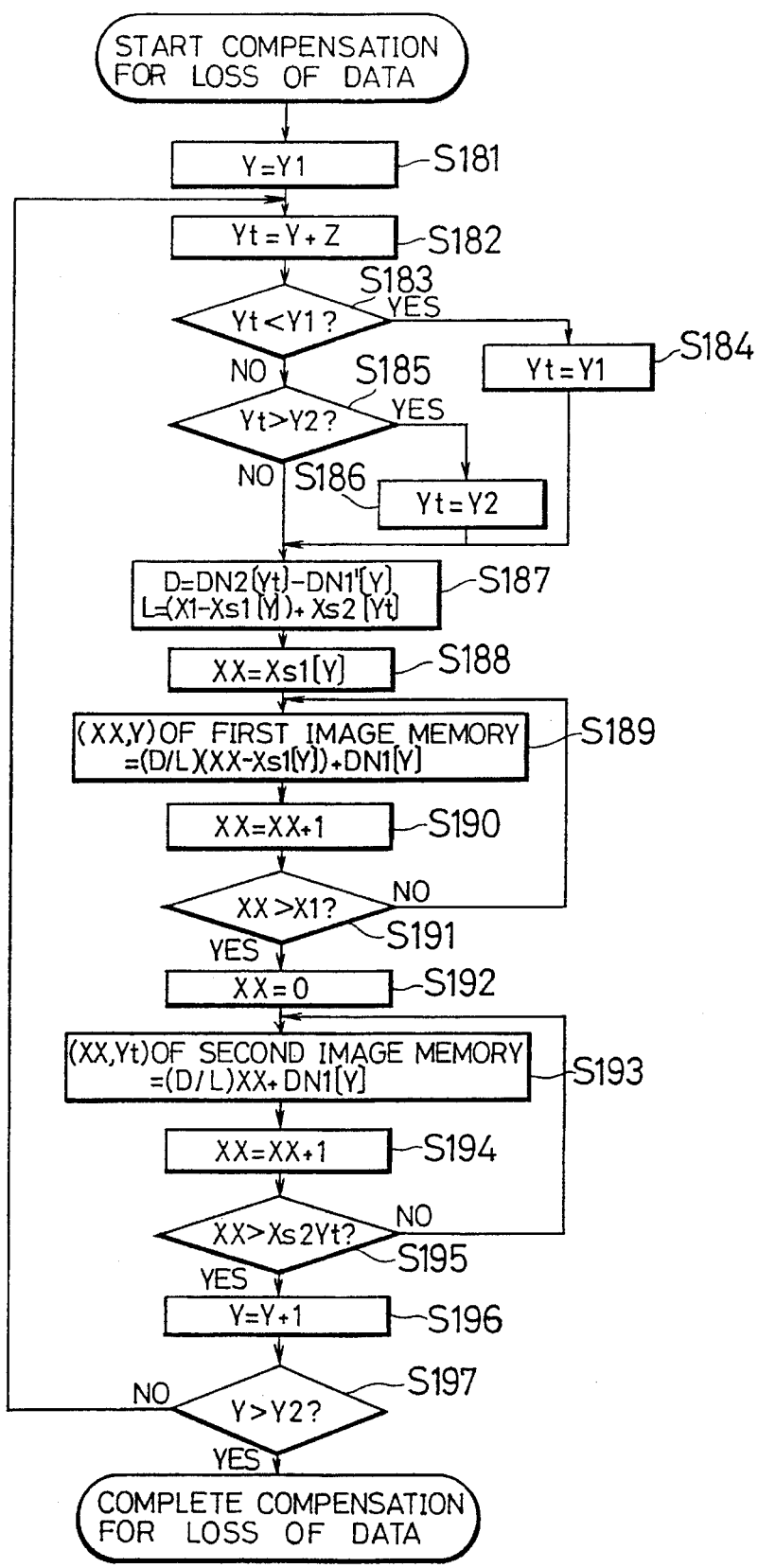
FIG. 49 is a flow chart showing the sequence of processes that are carried out when compensating for the loss of data that occurred by the joining operation.

Next, referring to the flow chart of FIG. 49, an explanation of the procedure for compensating for a loss of image that is caused by the shadow-erasing operation is given hereinbelow. Here, in FIG. 49, in order to distinguish the coordinates Y in the first image memory 105a and the second image memory 105b, the Y-coordinate of the first image memory 105a is indicated by Y, and the Y-coordinate of the second image memory 105b is indicated by Yt.

Firstly, it is set that Y=Y1 (S181), and since Yt has an offset corresponding to the amount of positioning, Z, from Y, Yt of the second image memory 105b that is to be joined to Y1 of the first image memory 105a is found by setting Yt=Y+Z (S182). A judgement is made as to whether the subsequent Yt has exceeded the effective image range (Y1 to Y2), and if the Yt has exceeded the effective image range, the following limiting process is carried out. In other words, if it is determined that Yt is smaller than Y1 at S183, it is set that Yt=Y1 (S184), while if it is determined that Yt is greater than Y2 at S185, it is set that Yt=Y2 (S186).

After completion of the above limiting process that has been carried out in accordance with the judgement whether or not the value of Yt is included within the effective image range, the difference D between the density DN2 [Yt] of image end in the second image memory 105b and the density DN1 [Y] of image end in the first image memory 105a is found by reference to Xs1 [Y] and Xs2 [Yt] that have been stored in the memory arrays. Further, the distance L between the ends is found by using the equation: (X1−Xs1 [Y])+Xs2 [Yt] (S187). First, it is set that XX=Xs1 [Y] (S188), the density of the coordinates (XX, Y) on the first image memory 105a is found by using the equation: (D/L)(XX−Xs1 [Y])+DN1 [Y] (S189).

Thereafter, while shifting is made line by line with respect to the X-coordinate using the equation XX=XX+1 (S190), the steps S189 and S190 are repeated until XX exceeds X1, that is, until it has been determined that XX> X1 is positive at S191. With this operation, the densities from Xs1 [Y] to X1 (the loss of data caused by the shadow-erasing operation) are estimated in a linear manner with respect to line Y of the first image memory 105a, and the compensation for loss of data is thus carried out in accordance with the estimated densities.

Next, in order to make a compensation with respect to line Yt in the second image memory 105b, it is set that XX= 0 (S192), the density of the coordinates (XX, Yt) on the second image memory 105b is found by using the equation: (D/L)XX+DN1 [Y] (S193). Thereafter, while shifting is made line by line with respect to XX (S194), the steps S193 and S194 are repeated until XX exceeds Xs2 [Yt], that is, until it has been determined that XX>Xs2 [Yt] is positive at S194. With this operation, the densities from 0 to Xs2 [Yt] of XX are estimated in a linear manner with respect to line Yt of the second image memory 105*b*, and the compensation for loss of data is thus carried out in accordance with the estimated densities.

Thereafter, while shifting is made line by line with respect to the Y-coordinate using the equation Y=y+1 (S196), the steps S182 through S196 are repeated until the Y-coordinate exceeds Y2, that is, until it has been determined that Y>Y2 is positive at S197. Thus, the densities in the XX-coordinate corresponding to the area that has been subject to the shadow-erasing operation are estimated in a linear manner with respect to line Y (or Yt) of the first and second image memories 105*a* and 105*b*, and the compensation for loss of data is carried out in accordance with the estimated densities. When it is determined that Y>Y2 is positive at S197, the compensating operation for the loss of data is completed.

Figure 50:
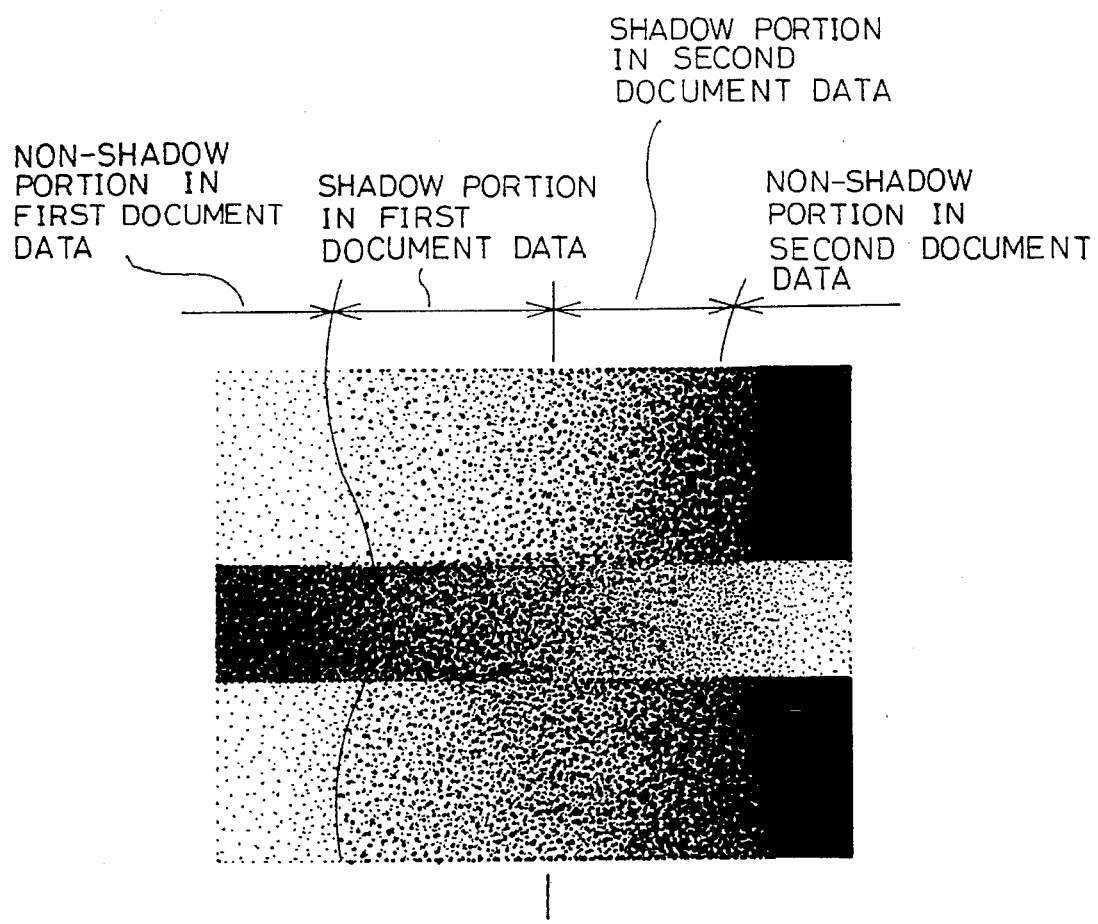
FIG. 50 is an explanatory drawing that shows a state of image that is obtained after the compensating operation for the loss of data.

Even if there are differences in the colors and densities of the corresponding portions of images located on left and right pages as shown, for example, in FIG. 50, both of the pages can be joined to each other smoothly by determining the densities of the data-loss areas through the above-mentioned compensating operation for the loss of data.

As described above, upon copying a book or the like having a considerable thickness, even if shadows are formed in the document data stored in the image memory due to the separation of the bound portion of the book from the document platen, the digital copying machine of the present embodiment carries out the compensating operation through the following steps of: executing the shadow-erasing operation by recognizing the ranges of the shadows accurately; calculating the amounts of positioning on the document data stored in the separate memories in accordance with the density distributions of the respective ends of the images; estimating the densities of the data-loss area of the image caused by the shadow erasing operation in accordance with the colors and densities of the corresponding ends of the images; and executing the compensation for the loss of data in accordance with the estimated densities so that no unnatural appearance occurs on the jointed portion. Further, as with the digital copying machine described in the aforementioned embodiments, the variable magnification operation is automatically carried out in response to a specified size of copy sheets, and the joined image can be formed on desired copy sheets or other materials.

Therefore, even in the case of using a document such as a book or the like having a considerable thickness, the joining operation can be carried out accurately, and since troublesome and time consuming jobs, such as trimming and sticking together copy sheets copied separately to form one sheet of document, are no longer required, the efficiency of work can be improved. Further, since it is no longer necessary to make unnecessary copies for use in trimming and sticking together to obtain one sheet of document, wasteful use of toner and copy sheets can be prevented. Moreover, shadows caused by the separation of the document from the document platen can be completely erased, and the disadvantage that necessary images are erased due to the shadow-erasing operation can be avoided. Therefore, it is possible to ensure high-quality in the copied images.

Referring to FIG. 2 as well as FIGS. 51 through 54, the following description will discuss another embodiment of the present invention. Here, for convenience of explanation, those members that have the same functions and that are described in embodiment 1 are indicated by the same reference numerals and the description thereof is omitted.

Figure 51:
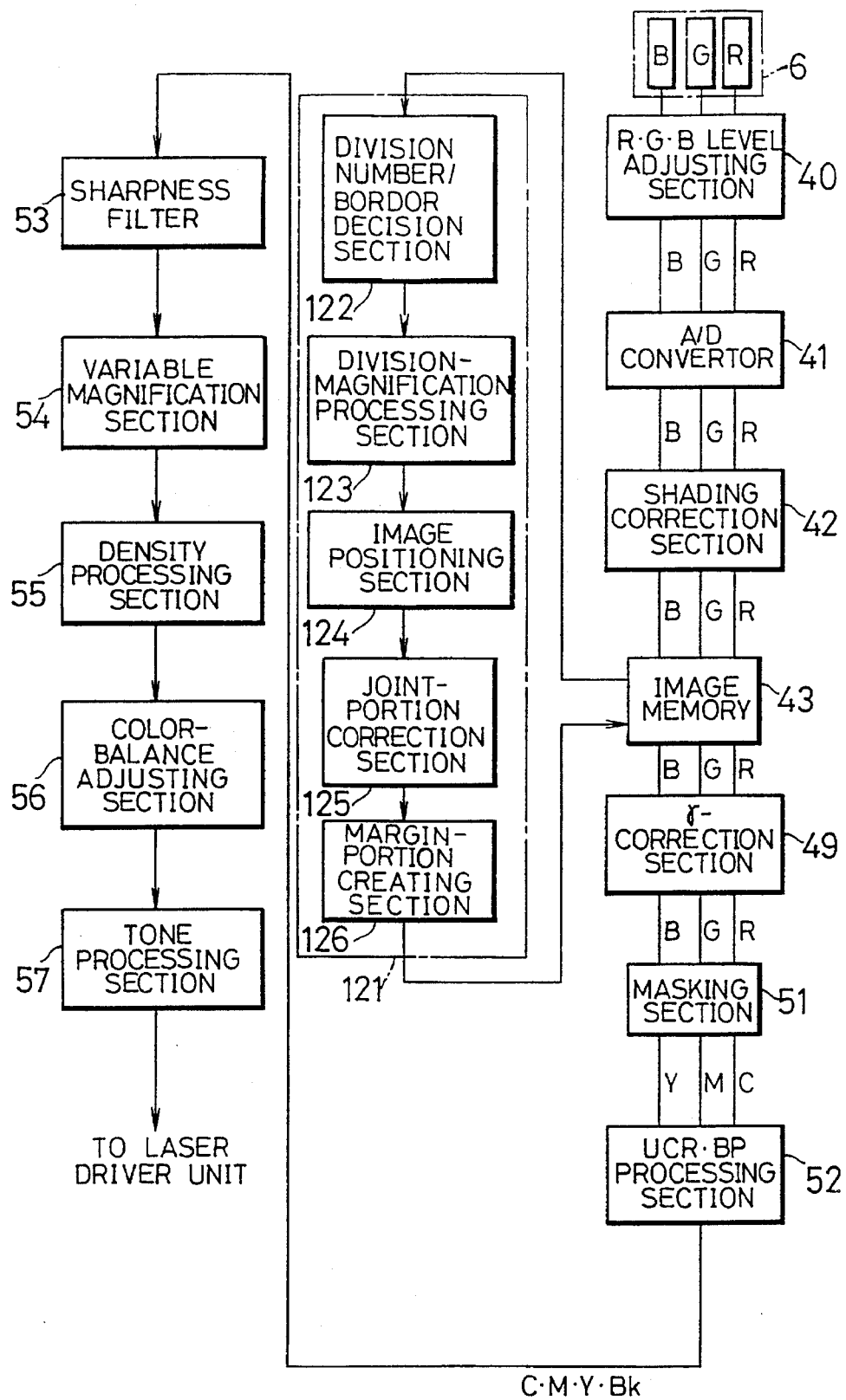
FIG. 51 is a block diagram showing a construction of an image processing section that is installed in the digital copying machine.

Further, as with the digital copying machine described in the aforementioned embodiments, a digital copying machine of the present embodiment has a-structure shown in FIG. 2, and an image processing section, which is installed in the digital copying machine, has a construction as shown in FIG. 51.

The following description will discuss the construction, functions, etc. of the image processing section for suitably processing the image data and for releasing the data to the laser driver unit 7.

As shown in FIG. 51, the image processing section is constituted of a RGB level-adjusting section 40, an A/D conversion section 41, a shading correction section 42, an image memory 43, a division-enlargement processing section 121, a γ correction section 49, a masking section 51, a UCR(Under Color Removal)-BP(Black Print) processing section 52, a sharpness filter 53, a variable magnification section 54, a density processing section 55, a color-balance adjusting section 56, and tone processing section 57.

After having been subject to the corresponding processing in the RGB level-adjusting section 40, the A/D conversion section 41, and the shading correction section 42, image data of R, G, B obtained from the CCD sensor 6 are temporarily stored in the image memory 43 as described earlier. The image memory 43 has a storage capacity equivalent to at least two document pages of image data, and data of the next document are stored in the same manner.

Here, if the division-enlargement mode has been specified, the image data stored in the image memory 43 are sent to the division-enlargement processing section 121. In the division-enlargement processing section 121, two types of processing are carried out: processing for dividing the image data of the document and corrective processing for allowing ends of the divided image data to be smoothly connected to other ends of the divided image data.

The division-enlargement processing section 121 is provided with a division-number/border decision section 122, a division-magnification processing section 123, an image positioning section 124, a joint-portion correction section 125, and a margin-portion creating section 126.

The division-number/border decision section 122 recognizes the position of the document and the ends of the document, thereby recognizing the size of the image data. Then, taking account of the size of the image data and an enlargement ratio or a size of copy sheet that has been specified, the decision-number/border decision section 122 calculates the size of copy sheet or the enlargement ratio that is required, and judges whether or not the corresponding size of copy sheet or the corresponding enlargement ratio is available. In other words, it decides whether or not the division processing is possible. If the division processing is possible, it decides the number of divided image data, that is, the number of copy sheets that are required to copy the divided image data, and also decides borders by which the image data are divided.

In the division-magnification processing section 123, the image data are divided according to the number of division and the borders that are determined in the division-number/border decision section 122, and a magnification processing is carried out on each divided image. Then, each of the divided images is formed into a separated image to be copied on one copy sheet. Further, if necessary, conversion of the coordinates is carried out so that the lengthwise direction of the image coincides with the lengthwise direction of the copy sheet.

In the image positioning section 124, data corresponding to necessary, predetermined lines are read from each border of the divided images, that is, each portion forming a joint between the divided images, and positioning is carried out by arranging the image data of the document so that edges having consistent data are joined. Then, the consistency of the data is confirmed, and, if necessary, the best-suited position of the image data is found by shifting the positions of the image data. These operations are executed in order to prevent occurrences of visible differences along the borders of the divided images. More specifically, the resolution is lowered due to the enlargement processing in the division-magnification processing section 123, and this causes fewer image data per area; therefore, it is quite possible that visible differences appear along the borders of the divided images that are released from the present copying machine. To counteract this, the consistency of the images between the joint portions is confirmed in the image positioning section 124.

In the joint-portion correction section 125, corrections such as compensation for lack of data and elimination of excess data between the joint portions are carried out so that the consistency of the data between the joint portions is suitably maintained.

In the margin-portion creating section 126, a margin portion is formed along one of the joint portions of the images that are to be joined. The margin portion is determined by adding data that impart a color thereto when it is copied on a copy sheet. The image data thus treated in the margin-portion creating section 126 are again stored in the image memory 43.

Figure 53:
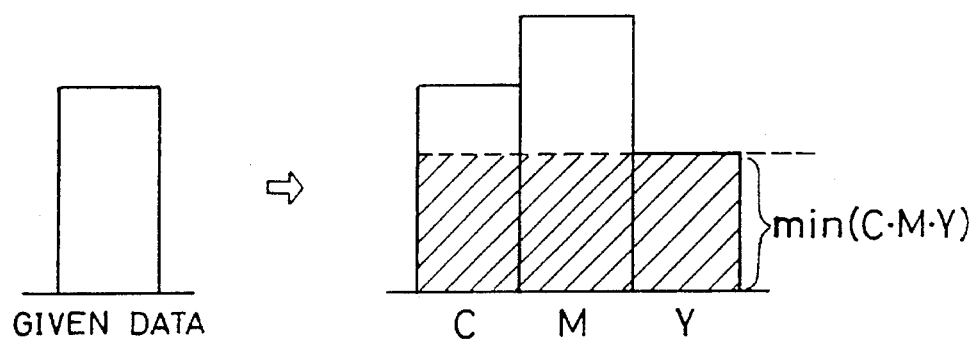
FIG. 53 is an explanatory drawing that shows the processing operations of a UCR·BP processing section shown in FIG. 3.

As shown in FIG. 53, assuming that the superimposed portion of C, M, Y is min (C, M, Y) in given data, the following equations hold in the relationship between the amounts of respective toners C, M, Y before the processing and the amounts of respective toners C', M', Y' and the amount of black toner $B_K$ after the processing.

$$B_K = \alpha \cdot \min(C \cdot M \cdot Y)$$

$$C' = C - \beta \cdot \min(C \cdot M \cdot Y)$$

$$M' = M - \beta \cdot \min(C \cdot M \cdot Y)$$

$$Y' = Y - \beta \cdot \min(C \cdot M \cdot Y)$$

where $\alpha$ represents ink rate ($0 \leq \alpha \leq 1$) and $\beta$ represents UCR (%).

Figure 52:
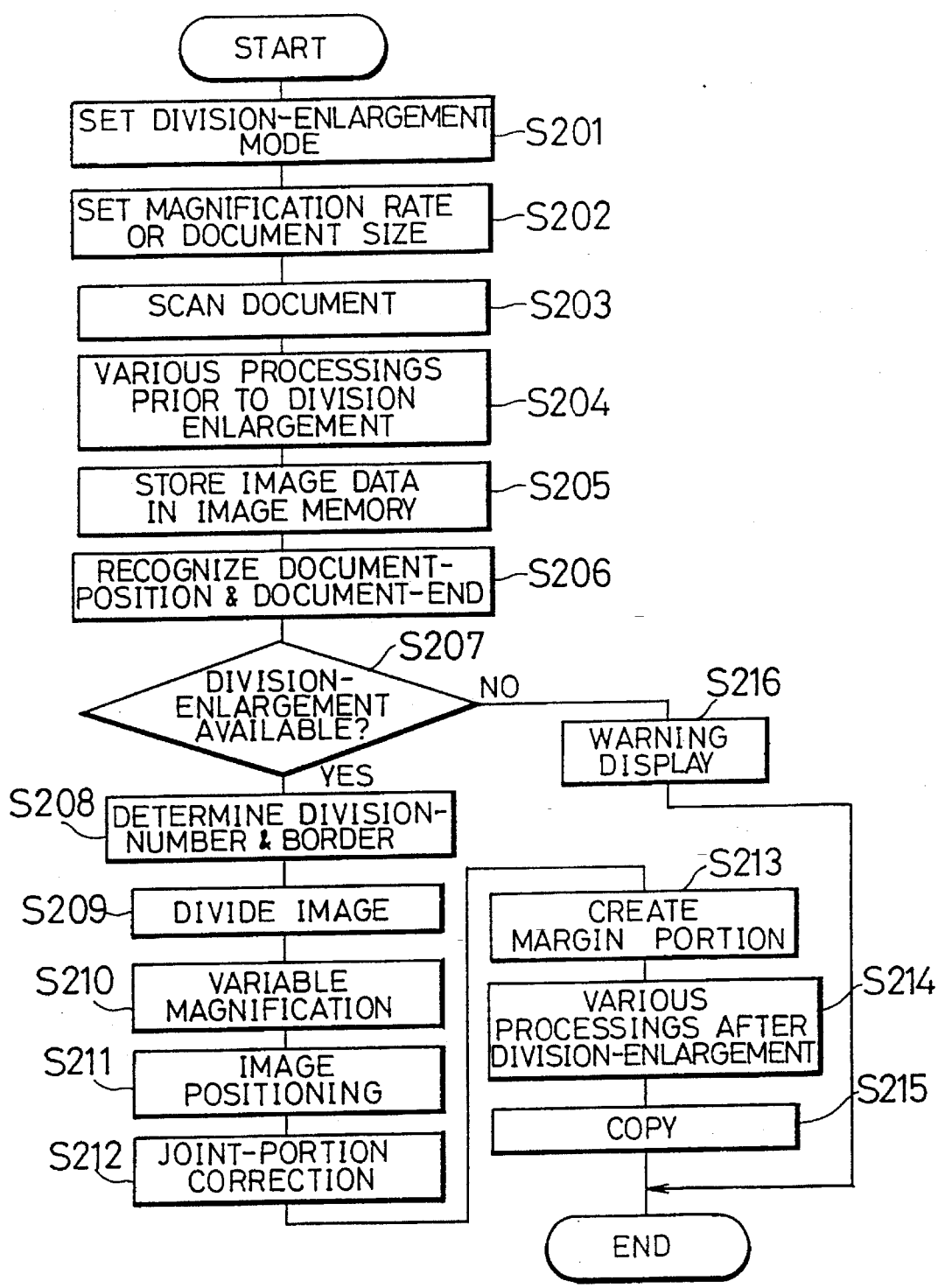
FIG. 52 is a flow chart showing a sequence of processes that are carried out in a division-enlargement processing section of the digital copying machine.

Referring to the flow chart of FIG. 52, an explanation will be given on the operation of the copying machine of the present embodiment wherein the division-enlargement mode is specified.

Figure 54A:
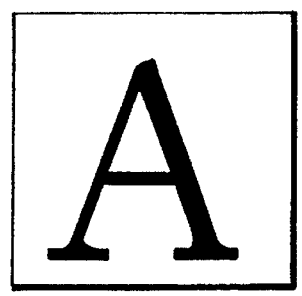
FIG. 54(a) is a front view showing an original that is to be divided and enlarged by the copying machine.

For example, in the case of executing a division-enlargement processing on a document shown in FIG. 54(a), a division-enlargement mode is specified through an operation on an operation panel, not shown, with the document placed on the document platen 27 (S201), and the enlargement ratio of the document or the size of copy sheet whereon the document is copied in a divided manner is specified (S202).

After the above specifying operations, a scanning is conducted on the document by the scanner unit 22 (S203). Then, the image data obtained from the CCD sensor 6 through the scanning are subject to the aforementioned various types of processing through the RGB level-adjusting section 40, the A/D conversion section 41 and the shading correction section 42 (S204), and the subsequent image data are stored in the image memory 43 (S205).

Next, the division-number/border decision section 122 in the division-enlargement processing section 121 recognizes the position of the document and the ends of the document (S206). Thus, the size of the image data is recognized, and the size or the enlargement ratio of a necessary copy sheet is calculated based on the size of the image data and the enlargement ratio or the size of copy sheet that has been specified at S202, and then judgement is made as to whether or not the corresponding size or enlargement ratio of copy paper is available. In other words, judgement is made as to whether or not the division-enlargement processing is possible by determining whether or not the necessary copy sheets are provided to be fed or whether or not the necessary enlargement ratio is selectable in the copying machine (S207). If the judgement is made as "NO" at S207, a warning display is given on the display section of the operation panel (S216), thereby completing the operation.

Conversely, if the judgement is made as "YES" at S207, the number of divided image data, that is, the number of copy sheets that are required to copy the divided image data, is determined, and borders by which the image data are divided are determined (S208).

Next, in the division-magnification processing section 123, the image is divided according to the borders that have been determined at S208 (S209), and a magnification processing is conducted on each divided image (S210). Each of the divided images is formed into a separated image to be copied on one copy sheet. Further, if necessary, conversion of the coordinates is carried out so that the lengthwise direction of the image coincides with the lengthwise direction of the copy sheet.

Figure 54B:
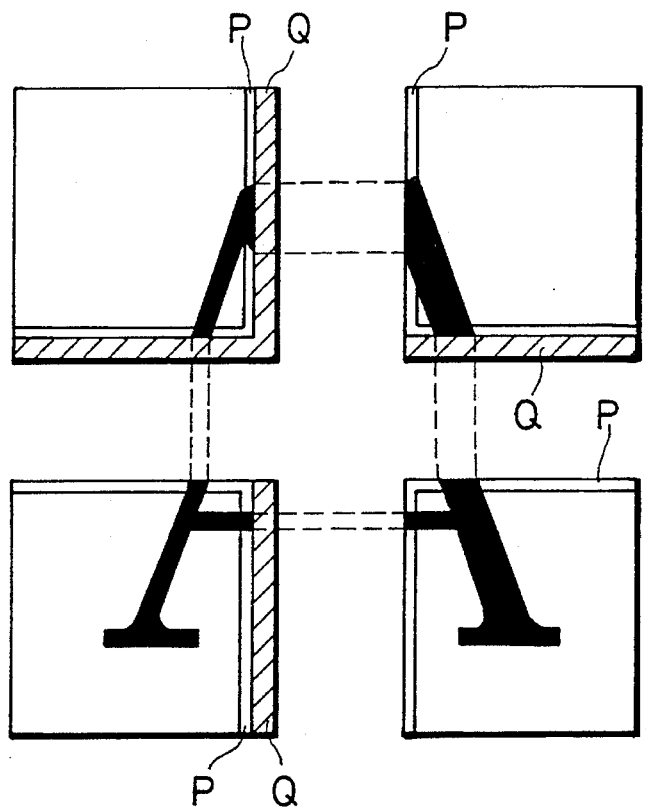
FIG. 54(b) is an explanatory drawing that shows individual image data after the image of the original is divided and enlarged.

In the image positioning section 124, data corresponding to several tens of lines from each border of the divided images forming a joint between the divided images, that is, data located within a retrieving area P shown in FIG. 54(b), are read, and positioning is carried out by arranging the respective image data so that edges having consistent data are joined, and then the consistency of the data is confirmed (S211).

During this operation, if necessary, the best-suited position of the image data is found by checking the consistency of the data while shifting the image data of one side in the main scanning direction or in the sub scanning direction with the image data of the other side maintained in a fixed state. Further, the judgement on the consistency of the image data is made, for example, as follows: First, features of respective image data are extracted by recognizing peculiar lines or characters included in the image data or by recognizing the arrays, features of patterns, colors, etc. of the data, and the features thus extracted are digitized and stored. Then, these features are compared with one another to make the judgement.

Next, in the joint-portion correction section 125, corrections such as compensation for lack of data and elimination of excess data between the joint portions are carried out so that the joint portions of the respective images are smoothly joined to each other (S212). In this operation, the edges of corresponding joint portions are connected to hypothetical lines, and by recognizing the connected lines and the edges of the respective images, the whole image are connected by smooth straight lines.

In the margin-portion creating section 126, a margin portion Q is formed along one of the joint portions of the images that are to be joined as illustrated in FIG. 54(b) (S213). The margin portion is determined by adding data that impart a color thereto when it is copied on a copy sheet.

After completion of the processing in the division-enlargement processing section 121, respective image data are separately stored in the image memory 43 as independent image data.

Thereafter, the aforementioned various types processing are conducted on the respective image data through the γ-correction section 49, the masking section 51, the UCR-BP processing section 52, the sharpness filter 53, the variable magnification section 54, the density processing section 55, the color-balance adjusting section 56 and the tone processing section 57 (S214), and the subsequent image data are copied on separated copy sheets respectively (S215).

With this arrangement in the present embodiment, an image shown in FIG. 54(a) is divided into, for example, four portions as is shown in FIG. 54(b), and copied onto individual copy sheets. Further, a colored margin portion Q is formed along one of the joint portions of the copied images that are to be joined. By applying paste, etc. to the margin portions Q, the copied images are joined to one another to form one complete copied image that is enlarged to a great degree, and this joining work is easily conducted.

Additionally, in the present embodiment the margin portions are colored so that they are clearly distinguished; yet, any treatment may be adopted instead of the above arrangement as long as it clearly identifies the margin portions. For example, those treatments include: dividing the margin portions from the images by lines with low density; and applying slanting lines with low density to the margin portions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus comprising:

input means for reading an image of an original document;

storage means for storing a plurality of partial images as partial document data upon the image being read by the input means in a divided manner, each of the plurality of partial images being individually stored as partial document data; and joint-portion processing means for recognizing corresponding areas between the partial document data stored in the storage means, and for joining the partial document data in accordance with the recognized corresponding areas, said joint-portion processing means including a combination-processing section for discriminating a data-loss area of the image, upon data loss occurring during image reading by the input means, in accordance with a positional relationship between the partial document data and for creating compensating data which compensates for lost data in the data-loss area in accordance with images at edges of the partial document data that are to be joined together.

2. The image processing apparatus as defined in claim 1, further comprising:

variable magnification means for conducting a variable magnification operation on combined document data in accordance with a size of recording medium whereon an image corresponding to the combined document data is formed.

3. The image processing apparatus as defined in claim 2, wherein the variable magnification means comprises:

a variable magnification section which, in a case where a size of recording medium whereon the image is formed is not specified, selects recording medium having the largest size among the recording medium available in the image processing apparatus, and conducts a variable magnification operation on the combined document data in accordance with the largest size of recording medium.

4. An image processing apparatus comprising:

input means for reading an image of an original document;

storage means for storing a plurality of partial images as partial document data upon the image being read by the input means in a divided manner, each of the plurality of partial images being individually stored as partial document data; and joint-portion processing means for recognizing corresponding areas between the partial document data stored in the storage means, and for joining the partial document data in accordance with the recognized corresponding areas, said joint-portion processing means including, a joint-portion processing section for, upon an edge of an original document being read as a linear data element by the input means and being stored in the storage means as partial document data together with an image of the original document, deleting data corresponding to the stored linear data element.

5. An image processing apparatus, comprising:

input means for reading an image of an original document;

storage means for storing a plurality of partial images as partial document data upon the image being read by the input means in a divided manner, each of the plurality of partial images being individually stored as partial document data; and joint-portion processing means for recognizing corresponding areas between the partial document data stored in the storage means, and for joining the partial document data in accordance with the recognized corresponding areas, wherein the partial images are obtained from torn pieces of an original document and the joint-portion processing means includes, a joint-portion processing section for positioning the respective partial document data to join partial document data, including corresponding torn pieces of the original document, together by recognizing corresponding shapes of the torn pieces from the partial document data stored in the storage means, and for deleting data corresponding to shadows detected at adjoining areas of the partial document data.

6. An image process apparatus comprising:

input means for reading an image of an original document;

storage means for storing a plurality of partial images as partial document data upon the image being read by the input means in a divided manner, each of the plurality of partial images being individually stored as partial document data; and joint-portion processing means for recognizing corresponding areas between the partial document data stored in the storage means, and for joining the partial document data in accordance with the recognized corresponding areas, wherein the input means reads an image of an original document by scanning the original document in a predetermined direction and the joint-portion processing means includes, a joint-portion processing section for, upon first and a second portions of an original document, arranged in the scanning direction of the input means, being scanned and stored in the storage means as respective first and second partial document data, positioning the first and second partial document data so that the first and second portions are joined together by recognizing shapes of a rear edge of the first piece and a leading edge of the second piece from stored document data corresponding to the rear edge of the first piece that has been scanned by the input means relatively earlier and from stored document data corresponding to the leading edge of the second piece that has been scanned by the input means relatively later, and for deleting data corresponding to shadows detected at adjoining areas of the first and second partial document data.

7. An image processing apparatus comprising:

input means for reading an image of an original document;

storage means for storing a plurality of partial images as partial document data upon the image being read by the input means in a divided manner, each of the plurality of partial images being individually stored as partial document data; and joint-portion processing means for recognizing corresponding areas between the partial document data stored in the storage means, and for joining the partial document data in accordance with the recognized corresponding areas, said joint-portion processing means including, a joint-portion processing section, to join together first and second portions of an original document, arranged in a scanning direction of the input means such that edges thereof to be joined are aligned with each other, for detecting data corresponding to a shadow at adjoining first partial document data and second partial document data, respectively corresponding to the first piece and second pieces of the original document, stored in the storage means, for recognizing data located on both sides of the data corresponding to the shadow, in a direction orthogonal to the scanning direction, as document data corresponding to edges of the first and second pieces of the original document, for recognizing shapes of the respective edges of the first and second pieces of the original document from the document data corresponding to the edges, for positioning the document data so that the first and second pieces of the original document are joined together, and for deleting data corresponding the shadow.

8. An image processing apparatus comprising:

input means for reading an image of an original document;

storage means for storing a plurality of partial images as partial document data upon the image being read by the input means in a divided manner, each of the plurality of partial images being individually stored as partial document data; and joint-portion processing means for recognizing corresponding areas between the partial document data stored in the storage means, and for joining the partial document data in accordance with the recognized corresponding areas, said joint-portion processing means including, a joint-portion processing section for, upon a first and a second partial document data being located opposite each other with a joint in between, determining that an area, between a position on the first partial document data that is recognized as a joint and an end of the second partial document data, is an overlapped portion of images, and for positioning with the overlapping portion being deleted.

9. An image processing apparatus comprising:

input means for reading an image of an original document;

storage means for storing a plurality of partial images as partial document data upon the image being read by the input means in a divided manner, each of the plurality of partial images being individually stored as partial document data; and joint-portion processing means for recognizing corresponding areas between the partial document data stored in the storage means, and for joining the partial document data in accordance with the recognized corresponding areas, said joint-portion processing means including, a joint-portion processing section for recognizing a joint by retrieving respective partial document data in accordance with a sequence of the partial document data stored in the storage means and an alignment of the partial document data determined by an instruction, entered by a specific document inserted and read between portions of the original document, and for conducting a positioning operation.

10. The image processing apparatus as defined in claim 9, wherein the specific document is a sheet of white paper.

* * * * *